United States Patent
Karumbaiah et al.

(10) Patent No.: US 12,502,672 B2
(45) Date of Patent: Dec. 23, 2025

(54) VASCULAR FLOW-BASED MICROFLUIDIC PLATFORM

(71) Applicant: UNIVERSITY OF GEORGIA RESEARCH FOUNDATION, INC., Athens, GA (US)

(72) Inventors: Lohitash Karumbaiah, Bogart, GA (US); Meghan T. Logun, Marietta, GA (US); Leidong Mao, Watkinsville, GA (US); Wujun Zhao, Waunakee, WI (US); Yang Liu, Bogart, GA (US); Chaitanya Tondepu, San Francisco, CA (US)

(73) Assignee: UNIVERSITY OF GEORGIA RESEARCH FOUNDATION, INC., Athens, GA (US)

( * ) Notice: Subject to any disclaimer, the term of this patent is extended or adjusted under 35 U.S.C. 154(b) by 1079 days.

(21) Appl. No.: 17/601,745

(22) PCT Filed: Apr. 8, 2020

(86) PCT No.: PCT/US2020/027181
§ 371 (c)(1),
(2) Date: Oct. 6, 2021

(87) PCT Pub. No.: WO2020/210296
PCT Pub. Date: Oct. 15, 2020

(65) Prior Publication Data
US 2022/0193676 A1 Jun. 23, 2022

Related U.S. Application Data

(60) Provisional application No. 62/981,713, filed on Feb. 26, 2020, provisional application No. 62/830,955, filed on Apr. 8, 2019.

(51) Int. Cl.
*B01L 3/00* (2006.01)
*G01N 33/50* (2006.01)

(52) U.S. Cl.
CPC ... *B01L 3/502761* (2013.01); *B01L 3/502746* (2013.01); *G01N 33/5091* (2013.01);
(Continued)

(58) Field of Classification Search
CPC .................................................. C12M 23/16
See application file for complete search history.

(56) References Cited

U.S. PATENT DOCUMENTS

| 2012/0211373 A1* | 8/2012 | El-Sayed | G01N 33/4836 204/403.01 |
| 2013/0059322 A1* | 3/2013 | Hung | C12M 25/14 435/29 |

(Continued)

FOREIGN PATENT DOCUMENTS

| WO | WO-2012016136 A2 * | 2/2012 | ........ B01L 3/502707 |
| WO | WO-2014127250 A1 * | 8/2014 | ........... B01L 3/5025 |
| WO | WO-2018026784 A1 * | 2/2018 | ........... A61K 31/726 |

OTHER PUBLICATIONS

International Search Report and Written Opinion for International Application No. PCT/US2020/027181, mailed Jun. 15, 2020; 8 pages.

(Continued)

*Primary Examiner* — Elizabeth A Robinson
*Assistant Examiner* — Jonathan E Lepage
(74) *Attorney, Agent, or Firm* — Mueting Raasch Group

(57) ABSTRACT

Described herein is a microfluidic assay device that mimics in vitro the in vivo biological environment, supporting endothelization, allowing for perfusive flow similar to in vivo blood flow conditions, and providing for realistic interactions between T-cells and solid tumor cells, such as (Continued)

glioblastoma multiforme tumor cells. Also described herein are methods of using this microfluidic assay device for the study of interactions of immune cells with tumor cells, such as glioblastoma multiforme tumor cells, and the development of improved immunotherapeutic approaches against cancers, such as glioblastoma multiforme.

27 Claims, 42 Drawing Sheets

(52) U.S. Cl.
CPC ... *B01L 2200/0652* (2013.01); *B01L 2300/12* (2013.01); *B01L 2400/086* (2013.01)

(56) References Cited

U.S. PATENT DOCUMENTS

| | | |
|---|---|---|
| 2014/0057311 A1 | 2/2014 | Kamm et al. |
| 2017/0080424 A1 | 3/2017 | Di Fabrizio et al. |
| 2018/0026784 A1 | 1/2018 | Ward et al. |

OTHER PUBLICATIONS

International Preliminary Report on Patentability for International Application No. PCT/US2020/027181, mailed Oct. 21, 2021; 6 pages.
Abou-Ghazal et al., The incidence, correlation with tumor-infiltrating inflammation, and prognosis of phosphorylated STAT3 expression in human gliomas. *Clin Cancer Res* 14, 8228-8235 (2008).
Betancur et al., Chondroitin Sulfate Glycosaminoglycan Matrices Promote Neural Stem Cell Maintenance and Neuroprotection Post-Traumatic Brain Injury. *ACS Biomater Sci Eng* 3, 420-430 (2017).
Birks et al., Targeting the GD3 acetylation pathway selectively induces apoptosis in glioblastoma. *Neuro Oncol* 13, 950-960 (2011).
Borghaei et al., Nivolumab versus Docetaxel in Advanced Nonsquamous Non-Small-Cell Lung Cancer. *N Engl J Med* 373, 1627-1639 (2015).
Chekenya et al., The NG2 chondroitin sulfate proteoglycan: role in malignant progression of human brain tumours. *Int J Dev Neurosci* 17, 421-435 (1999).
Chou et al., Galectin-1 is a poor prognostic factor in patients with glioblastoma multiforme after radiotherapy. *BMC Cancer* 18, 105 (2018).
Chowell et al., Patient HLA class I genotype influences cancer response to checkpoint blockade immunotherapy. *Science* 359, 582-587 (2018).
Crane et al., Soluble factors secreted by glioblastoma cell lines facilitate recruitment, survival, and expansion of regulatory T cells: implications for immunotherapy. *Neuro Oncol* 14, 584-595 (2012).
Damon et al., Heparin potentiates the action of acidic fibroblast growth factor by prolonging its biological half-life. *J Cell Physiol* 138, 221-226 (1989).
Davila et al., Efficacy and toxicity management of 19-28z CAR T cell therapy in B cell acute lymphoblastic leukemia. *Sci Transl Med* 6, 224ra225 (2014).
Dong et al., Tumor-associated B7-H1 promotes T-cell apoptosis: a potential mechanism of immune evasion. *Nat Med* 8, 793-800 (2002).
Dwarshuis et al., Functionalized microcarriers improve T cell manufacturing by facilitating migratory memory T cell production and increasing CD4/CD8 ratio. *bioRxiv* (Preprint) May 23, 2019; available online: <biorxiv.org/content/10.1101/646760v1.full> (25 pages).
Eramo et al., Chemotherapy resistance of glioblastoma stem cells. *Cell Death Differ* 13, 1238-1241 (2006).
Fesnak et al., Engineered T cells: the promise and challenges of cancer immunotherapy. *Nat Rev Cancer* 16, 566-581 (2016).

Fontana et al., Glioblastoma cells release interleukin 1 and factors inhibiting interleukin 2-mediated effects. *J Immunol* 132, 1837-1844 (1984).
Frei et al., Transforming growth factor-beta pathway activity in glioblastoma. *Oncotarget* 6, 5963-5977 (2015).
Friedmann-Morvinski et al., Identification of therapeutic targets for glioblastoma by network analysis. *Oncogene* 35, 608-620 (2016).
Goldbrunner et al., Cell-extracellular matrix interaction in glioma invasion. *Acta Neurochir* (Wien) 141, 295-305; discussion 304-295 (1999).
Happold et al., Transcriptional control of O(6)-methylguanine DNA methyltransferase expression and temozolomide resistance in glioblastoma. *J Neurochem* 144, 780-790 (2018).
Hishii et al., Human glioma-derived interleukin-10 inhibits antitumor immune responses in vitro. *Neurosurgery* 37, 1160-1166; discussion 1166-1167 (1995).
Ivanov et al., Blood flow velocity in capillaries of brain and muscles and its physiological significance. *Microvasc Res* 22, 143-155 (1981).
Jaime-Ramirez et al., Humanized chondroitinase ABC sensitizes glioblastoma cells to temozolomide. *J Gene Med* 19, (2017).
Johannessen et al., Molecular mechanisms of temozolomide resistance in glioblastoma multiforme. *Expert Rev Anticancer Ther* 12, 635-642 (2012).
Karumbaiah et al., Targeted downregulation of N-acetylgalactosamine 4-sulfate 6-O-sulfotransferase significantly mitigates chondroitin sulfate proteoglycan-mediated inhibition. *Glia* 59, 981-996 (2011).
Karumbaiah et al., Relationship between intracortical electrode design and chronic recording function. *Biomaterials* 34, 8061-8074 (2013).
Karumbaiah et al., Chondroitin Sulfate Glycosaminoglycan Hydrogels Create Endogenous Niches for Neural Stem Cells. *Bioconjug Chem* 26, 2336-2349 (2015).
Kobayashi et al., Role of GalNAc4S-6ST in astrocytic tumor progression. *PLoS One* 8, e54278 (2013).
Kuppner et al., Influence of PGE2- and cAMP-modulating agents on human glioblastoma cell killing by interleukin-2-activated lymphocytes. *J Neurosurg* 72, 619-625 (1990).
Larkin et al., Combined Nivolumab and Ipilimumab or Monotherapy in Untreated Melanoma. *N Engl J Med* 373, 23-34 (2015).
Latchoumane et al., Chronic Electrical Stimulation Promotes the Excitability and Plasticity of ESC-derived Neurons following Glutamate-induced Inhibition In vitro. *Sci Rep* 8, 10957 (2018).
Le Mercier et al., Galectins and gliomas. *Brain Pathol* 20, 17-27 (2010).
Lee, Temozolomide resistance in glioblastoma multiforme. *Genes Dis* 3, 198-210 (2016).
Liu et al., Analysis of gene expression and chemoresistance of CD133+ cancer stem cells in glioblastoma. *Mol Cancer* 5, 67 (2006).
Logun et al., Glioma Cell Invasion is Significantly Enhanced in Composite Hydrogel Matrices Composed of Chondroitin 4- and 4,6-Sulfated Glycosaminoglycans. *J Mater Chem B* 4, 6052-6064 (2016).
Logun et al., Microfluidics in Malignant Glioma Research and Precision Medicine. *Adv Biosyst* 2, (2018).
Maude et al., Chimeric antigen receptor T cells for sustained remissions in leukemia. *N Engl J Med* 371, 1507-1517 (2014).
Nduom et al., Glioblastoma cancer stem-like cells: implications for pathogenesis and treatment. *Cancer J* 18, 100-106 (2012).
Nduom et al., Immunosuppressive mechanisms in glioblastoma. *Neuro Oncol* 17 Suppl 7, vii9-vii14 (2015).
Nelson et al., A Multi-Niche Microvascularized Human Bone-Marrow-on-a-Chip. *bioRxiv* (Preprint) Dec. 24, 2019; available online: <biorxiv.org/content/10.1101/2019.12.15.876813v2> (23 pages).
Newick et al., Chimeric antigen receptor T-cell therapy for solid tumors. *Mol Ther Oncolytics* 3, 16006 (2016).
Nitta et al., Selective expression of interleukin-10 gene within glioblastoma multiforme. *Brain Res* 649, 122-128 (1994).
O'Rourke et al., A single dose of peripherally infused EGFRvIII-directed CAR T cells mediates antigen loss and induces adaptive resistance in patients with recurrent glioblastoma. *Sci Transl Med* 9, (2017).

(56) References Cited

OTHER PUBLICATIONS

Ostrom et al., Adult Glioma Incidence and Survival by Race or Ethnicity in the United States From 2000 to 2014. *JAMA Oncol* 4, 1254-1262 (2018).

Parsa et al., Loss of tumor suppressor PTEN function increases B7-H1 expression and immunoresistance in glioma. *Nat Med* 13, 84-88 (2007).

Patsoukis et al., PD-1 alters T-cell metabolic reprogramming by inhibiting glycolysis and promoting lipolysis and fatty acid oxidation. *Nat Commun* 6, 6692 (2015).

Pellegatta et al., Constitutive and TNFalpha-inducible expression of chondroitin sulfate proteoglycan 4 in glioblastoma and neurospheres: Implications for CAR-T cell therapy. *Sci Transl Med* 10, (2018).

Perillo et al., Apoptosis of T cells mediated by galectin-1. *Nature* 378, 736-739 (1995).

Reardon et al., OS10.3 Randomized Phase 3 Study Evaluating the Efficacy and Safety of Nivolumab vs Bevacizumab in Patients With Recurrent Glioblastoma: CheckMate 143. Neuro Oncol. May 2017;19(Suppl 3):iii21.

Reinhard et al., The extracellular matrix niche microenvironment of neural and cancer stem cells in the brain. *Int J Biochem Cell Biol* 81, 174-183 (2016).

Rodriguez et al., The tumour glyco-code as a novel immune checkpoint for immunotherapy. *Nat Rev Immunol* 18, 204-211 (2018).

Roth et al., Malignant glioma cells counteract antitumor immune responses through expression of lectin-like transcript-1. *Cancer Res* 67, 3540-3544 (2007).

Schuksz et al., Surfen, a small molecule antagonist of heparan sulfate. Proc Natl Acad Sci U S A 105, 13075-13080 (2008).

Shen et al., Radiosensitisation of human glioma cells by inhibition of beta1,6-GlcNAc branched N-glycans. *Tumour Biol* 37, 4909-4918 (2016).

Sim et al., Reduced expression of the hyaluronan and proteoglycan link proteins in malignant gliomas. *J Biol Chem* 284, 26547-26556 (2009).

Stupp et al., Effects of radiotherapy with concomitant and adjuvant temozolomide versus radiotherapy alone on survival in glioblastoma in a randomised phase III study: 5-year analysis of the EORTC-NCIC trial. *Lancet Oncol* 10, 459-466 (2009).

Svendsen et al., Expression of the progenitor marker NG2/CSPG4 predicts poor survival and resistance to ionising radiation in glioblastoma. *Acta Neuropathol* 122, 495-510 (2011).

Swamy et al., Glucose and glutamine fuel protein O-GlcNAcylation to control T cell self-renewal and malignancy. Nat Immunol 17, 712-720 (2016).

Tamimi and Juweid, "Epidemiology and Outcome of Glioblastoma," in *Glioblastoma*. De Vleeschhouwer (Ed.) Codon Publications: Brisbane, AU; Sep. 27, 2017. Cover page, publisher's page, Table of Contents, and pp. 143-153 (18 pages).

Uyttenhove et al., Evidence for a tumoral immune resistance mechanism based on tryptophan degradation by indoleamine 2,3-dioxygenase. *Nat Med* 9, 1269-1274 (2003).

Van Woensel et al., Sensitization of glioblastoma tumor microenvironment to chemo- and immunotherapy by Galectin-1 intranasal knock-down strategy. *Sci Rep* 7, 1217 (2017).

Viapiano et al., Novel tumor-specific isoforms of BEHAB/brevican identified in human malignant gliomas. *Cancer Res* 65, 6726-6733 (2005).

Walsh et al., Classification of T-cell activation via autofluorescence lifetime imaging. Nat Biomed Eng 5, 77-88 (2021).

Warmuth et al., Quantification of blood flow in brain tumors: comparison of arterial spin labeling and dynamic susceptibility-weighted contrast-enhanced MR imaging. *Radiology* 228, 523-532 (2003).

Weber et al., Nivolumab versus chemotherapy in patients with advanced melanoma who progressed after anti-CTLA-4 treatment (CheckMate 037): a randomised, controlled, open-label, phase 3 trial. *Lancet Oncol* 16, 375-384 (2015).

Weller et al., (1997). CD95-Dependent T-Cell Killing by Glioma Cells Expressing CD95 Ligand: More on Tumor Immune Escape, the CD95 Counterattack, and the Immune Privilege of the Brain. Cellular Physiology and Biochemistry, 7, 282-288.

Wintterle et al., Expression of the B7-related molecule B7-H1 by glioma cells: a potential mechanism of immune paralysis. *Cancer Res* 63, 7462-7467 (2003).

Wirtz et al., The physics of cancer: the role of physical interactions and mechanical forces in metastasis. *Nat Rev Cancer* 11, 512-522 (2011).

Wolfe et al., "Novel Flow-based Microfluidic Platform and Endothelialization" Poster. 2019 CURO Symposium, University of Georgia, Center for Undergraduate Research Opportunities. Athens, GA, presented Apr. 8, 2019. 1 page.

Wrann et al., T cell suppressor factor from human glioblastoma cells is a 12.5-kd protein closely related to transforming growth factor-beta. *EMBO J* 6, 1633-1636 (1987).

Yan et al., FGL2 as a Multimodality Regulator of Tumor-Mediated Immune Suppression and Therapeutic Target in Gliomas. *J Natl Cancer Inst* 107, (2015).

Yeh et al., Oncogenic mutations in the FBXW7 gene of adult T-cell leukemia patients. *Proc Natl Acad Sci U S A* 113, 6731-6736 (2016).

\* cited by examiner

FIG. 7A

| Parameters | Value |
|---|---|
| 3% methacrylated chondroitin sulfate Gel in reservoirs | Porosity – 40um<br>Elastic Modulus (Stiffness) – 100Pa<br>Density – 1.12 g/mL<br>Geometry – diameter: 4mm; height: 150um |
| PDMS | Elastic Modulus (Stiffness) – 3MPa<br>Density – 965 kg/m$^3$<br>Poisson's Ratio (stretch) – 0.5<br>Geometry – width: 1000um; Height: 150um |
| HUVEC Layer | Elastic Modulus (stiffness) – ~15kPa<br>Cell Thickness – ~9.5um<br>Cell length – 3um, Gap = 1um<br>Poisson's Ratio – 0.25<br>Assume no pores |
| EGM-2 Media | Viscosity – 0.0075 dyn/cm$^2$<br>Density – 1.0 g/ml |

| NEUROSPHERE ID | EGFR AMPLIFICATION | PTEN DELETION | MGMT METHYLATION | IDH1 MUTATION |
|---|---|---|---|---|
| N12-115 | NEGATIVE | POSITIVE | UNKNOWN | UNKNOWN |
| N08-30 | POSITIVE | UNKNOWN | UNKNOWN | UNKNOWN |
| N12-159 | NEGATIVE | POSITIVE | UNMETHYLATED | NEGATIVE |

IMAGING CYTROMETRY QUANTIFICATION OF CAR ANTIGENS ON PATIENT-DERIVED GSCs

VASCULAR FLOW-BASED MICROFLUIDIC PLATFORM

CONTINUING APPLICATION DATA

This application is the § 371 U.S. National Stage of International Application No. PCT/US2020/027181, filed Apr. 8, 2020, which claims the benefit of U.S. Provisional Application Ser. No. 62/830,955, filed Apr. 8, 2019, and U.S. Provisional Application Ser. No. 62/981,713, filed Feb. 26, 2020, each of which is incorporated by reference herein.

GOVERNMENT FUNDING

This invention was made with government support under Grant No. R01NS099596, awarded by National Institutes of Health and Grant No. EEC CMAT 1648035, awarded by National Science Foundation Engineering Research Center for Cell Manufacturing Technologies. The government has certain rights in the invention.

BACKGROUND

Glioblastoma multiforme (GBM) is an aggressive primary central nervous system tumor with a very poor prognosis, accounting for 50% of all malignant brain tumors in adults. The majority of patients diagnosed with GBM have a prognosis of only 12-15 months and treatment consists of surgery, chemotherapy and radiotherapy with little to no success. Immunotherapeutic approaches have been developed as promising solutions to many cancers, but there has been minimal success with treating GBM with these approaches. Thus, there is a need for in vitro platforms that provide for the development of improved immunotherapies for GBM.

SUMMARY OF THE INVENTION

The present invention includes a microfluidic assay device, the device having a flow channel configured to receive a monolayer of endothelial cells; the flow channel comprising an inlet and outlet; one or more reservoirs distributed along the flow channel, each reservoir in fluid communication with the flow channel along an interface; and a plurality of barriers arranged along the interface of the flow channel with each reservoir; the plurality of barriers configured to provide a semipermeable interface and/or to provide for cell migration across the interface.

In some aspects of the microfluidic assay device, the inlet and outlet of the flow channel are positioned on the same side of the device.

In some aspects of the microfluidic assay device, the one or more reservoirs are configured to receive a hydrogel.

In some aspects of the microfluidic assay device, the length of the flow channel is about 7 centimeters (cm).

In some aspects of the microfluidic assay device, the width of the flow channel is about 1000 micrometers (1000 µm).

In some aspects of the microfluidic assay device, the height of the flow channel is about 150 micrometers (150 µm).

In some aspects of the microfluidic assay device, the diameter of the inlet and/or outlet of the flow channel is about 1 millimeter (1 mm).

In some aspects of the microfluidic assay device, the diameter of the one or more reservoirs is about 5 millimeters (5 mm).

In some aspects, the microfluidic assay includes six reservoirs evenly spaced along the flow channel.

In some aspects of the microfluidic assay device, the plurality of barriers arranged along the interface of the flow channel with each reservoir have a trapezoidal shape.

In some aspects of the microfluidic assay device, the interface of the flow channel with each reservoir comprises 22 trapezoidal barriers, each trapezoidal barrier about 100 micrometers (µm) in width, about 150 µm in length of the longest base, and about 50 µm in length of the shortest base, and wherein each of the trapezoidal barriers is spaced about 7 micrometers (7 µm) from a nearest other trapezoidal barrier.

In some aspects of the microfluidic assay device, the inlet and outlet of the flow channel are positioned on the same side of the device; wherein the flow channel has a length of about 7 centimeters (cm); the flow channel has a width of about 1000 micrometers (µm); the flow channel has a height of about 150 micrometers (µm); the inlet and/or outlet of the flow channel have a diameter of about 1 millimeter (1 mm); the one or more reservoirs have a diameter of about 5 millimeters (mm); the plurality of barriers arranged along the interface of the flow channel with each reservoir have a trapezoidal shape; the interface of the flow channel with each reservoir includes 22 trapezoidal barriers, each trapezoidal barrier about 100 micrometers (µm) in width, about 150 µm in length of the longest base, and about 50 µm in length of the shortest bases; and wherein each of the trapezoidal barriers is spaced about 7 micrometers (µm) from a nearest other trapezoidal barrier. In some aspects, the microfluidic assay device has six reservoirs evenly spaced along the flow channel.

In some aspects, the microfluidic assay device of the present invention is of poly-di-methyl-siloxane (PDMS).

In some aspects of the microfluidic assay device, the flow channel, one or more reservoirs, and/or plurality of barriers are coated with fibronectin.

In some aspects, the microfluidic assay device is sterilized.

In some aspects of the microfluidic assay device, the flow channel includes endothelial cells. In some aspects, the endothelial cells comprise human umbilical vein endothelial cells (HUVEC).

In some aspects of the microfluidic assay device, the flow channel includes a confluent monolayer of endothelial cells. In some aspects, the endothelial cells comprise human umbilical vein endothelial cells (HUVEC).

In some aspects of the microfluidic assay device, the one or more reservoirs include a glioblastoma multiforme (GBM) biopsy sample or a GBM spheroid. In some aspects, the glioblastoma multiforme (GBM) biopsy sample or a GBM spheroid within the one or more reservoirs is encapsulated within hydrogel.

In some aspects, a microfluidic assay device is for evaluating the interaction between tumor cells and immune cells cell.

The present invention also includes a method of evaluating interaction between tumor cells and immune cells, the method including providing a confluent monolayer of endothelial cells within the flow channel of a microfluidic assay device as described herein; placing a suspension of tumor cells in one or more of the reservoirs of said microfluidic assay device; incubating to allow cell-cell interaction; and assaying the interaction between tumor cells and immune cells. In some aspects, the tumor cells include glioblastoma multiforme (GBM) tumor cells. In some aspects, the immune cells comprise T cells or CAR-T cells.

In some aspects, assaying the interaction between tumor cells and immune cells includes assaying T-call activation. In some aspects, assaying T cell activation is assayed by optical metabolic imaging.

The term "and/or" means one or all of the listed elements or a combination of any two or more of the listed elements.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

Also herein, the recitations of numerical ranges by endpoints include all numbers subsumed within that range (e.g., 1 to 5 includes 1, 1.5, 2, 2.75, 3, 3.80, 4, 5, etc.).

For any method disclosed herein that includes discrete steps, the steps may be conducted in any feasible order. And, as appropriate, any combination of two or more steps may be conducted simultaneously.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

The description of the present invention provided herein is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

FIG. 2A is an image of an empty microfluidic device before use. In FIG. 2B, food coloring-stained PBS seeded in the flow channel demonstrates flow channel utility when reservoirs are filled with hydrogel to mimic the solid tumor microenvironment around blood vessels.

FIG. 4A shows device design in AutoCAD software, with 5000 um diameter tumor reservoirs, 7 cm long central channel, and indicated inlets and outlets. Channel dimensions are 1000 um in width and 50 um depth. Barriers are 100 um in height with 150/50 um post width, and 7 um gap sizes. FIG. 4B shows PDMS device assembly post-fabrication (top) and PDMS device with 4 mm (diameter) cored reservoirs and 1 mm (diameter) cored inlet/outlet for media and cell access (bottom). Glass coverslip (24×40 mm) that is plasma bonded to the bottom of the PDMS device. FIG. 4C shows graphical and real image of final device after assembly with compartments distinguished by colors for visualization.

FIG. 5A presents a growth curve of patient-derived GBM spheroids consisting of different glioma stem cell (GSC) densities in 96-well ultra-low adherence plates over 96 hours (left). n=3 spheroids, error bars represent standard deviation against mean diameter of each spheroid. FIG. 5B is a representative brightfield (BF) image of 100 um (diameter) spheroid (right). FIG. 5C is an example of live/dead (Calcein Green, Ethidium Homodimer) staining of spheroids showing necrotic tumor core and healthy tumor periphery (bottom). FIG. 5D is graphical representation of spheroid loading into the device. Spheroids are encapsulated in pre-crosslinked hydrogel mixture and added to device reservoirs. Mixture gels after exposure to UV light at 365 nm for 30-60 sec.

FIG. 6A presents fluorescent images at reservoir/channel interface of Phalloidin- and DAPI-stained human vascular endothelial cells (HUVECs) seeded in the flow-channel and imaged using Zeiss LSM 710 microscope. FIGS. 6B-6E show automated quantification pipeline using phalloidin images and MATLAB code providing binarized output that calculates percent endothelialization based on area indicated by DAPI over total area of image. FIG. 6B shows the device with locations in MATLAB output marked. FIG. 6C shows a phalloidin image of the device for MATLAB. FIG. 6D shows MATLAB binarized output. FIG. 6E is a chart of endothelialization in the device. Graph of percent endothelialization throughout device at 15 specified locations (n=5, error bars represent standard deviation from mean). FIG. 6F is a graphical representation of blood-tumor barrier functionality analyzed using permeability assessments across reservoir/channel barrier using fluorescent dextrans. Green spheres represent dextrans. Green and purple rectangles represent areas of gel and channel that will be calculated in permeability coefficient formula $A_{gel}$=area of reservoir that is of interest. $W_{monolayer}$=width of monolayer. $I_{lumen}$=fluorescence intensity in channel at t=0. dI/dt=slope of fluorescence intensity over time in hydrogel.

FIGS. 7A to 7C. Fluid Perfusion. FIG. 7A is a table of COMSOL parameters used to create device simulation. FIG. 7B is an image of mesh used for COMSOL simulation, with smallest mesh size being 0.1 um. Mesh surrounding barrier posts and HUVECs were important for accurate simulation of media flow direction and effect on cells. FIG. 7C is a COMSOL simulation of velocity profile showing direction of media flow through reservoir and relative velocity with flow rate at 125 ul/min (left), a COMSOL simulation at reservoir using flow rate of media at 125 ul/min showing relative shear stress at barrier with heat map (middle) and real-time flow profile assessment at reservoir/channel interface using 15 um fluorescent beads at 125 ul/min flow rate in fixed device (right).

FIG. 8A shows open-loop setup of flow route of media through device from media reservoir through inlet, withdrawn from outlet into syringe situated on syringe pump (top) and real-time flow assessment of device using open-loop setup on microscope stand (bottom). FIG. 8B is analysis of T cell potency with confocal imaging for T cell ingress into hydrogel, and overall GBM growth using Z-stacks. Flow cytometry is used to quantify changes in cell phenotype overtime.

FIG. 9A is a schematic overview of device functionality. FIG. 9B is an expanded view of red dashed circle in FIG. 1A, detailing rectangular flow-channel dimensions. FIG. 9C is an expanded view of dashed green circle in FIG. 9A, detailing the location and spacing of interfacial trapezoidal barriers that separate flow-channel from GBM organoid reservoir.

FIG. 10A demonstrates regioselective sulfonation of CS-A results in enhanced binding and retention of CXCL12 using sandwich ELISA assays. FIG. 10B is a schematic depicting the presentation of sulfated and unsulfated matrix choices to eGFP expressing human U87MG glioma cells using a microfluidic device. FIG. 10C provides representative images (obtained from blue dotted boxes in FIG. 10B) demonstrating the infiltration of U87MG cells into agarose (AG), hyaluronic acid (HA), CS-A, and Composite (COMP) CS consisting of 85% CS-A and 15% CS-E matrices. FIG. 10D, FIG. 10E, and FIG. 10F show quantification of percentage of seeded cells invading into the different matrix pairs. The area of quantification is represented by the blue boxed area depicted in FIG. 10A. Each assay was repeated eight times and data are represented as mean±SD. Statistical significance as determined by a t-test is represented by '*' indicating $p<0.05$.

FIG. 11A is imaging cytometry analysis of apoptosis and proliferation status of CD3+ activated T cells. Activated T-cells co-cultured with GSCs in a 10:1 ratio demonstrate significantly greater apoptosis (FIG. 11B) and reduced proliferation (FIG. 11C) when compared to NSC controls 72 h and 96 h post-seeding. Significant differences determined by t-test are represented by '*' indicating $p<0.05$. Error bars represent mean±SD.

FIG. 12A presents a velocity 2D heat map of the device, a simulation of velocity (m/s) at a flow rate of 500 µl/min (a physiologically relevant blood flow rate). FIG. 12B presents a shear stress 3d heat map of the device, a simulation of shear stress (Pa) at a flow rate of 500 µl/min. High and low velocity and shear stress are indicated in hotter and cooler colors on the heat map respectively in FIG. 12A and FIG. 12B. Viscosity of blood is assumed to be 4 centipoise in the simulation (based on empirical determinations). FIG. 12C presents preliminary results of channel endothelialization using a HUVEC density of $1 \times 10^6$ cells/ml, 24 h post seeding. Scale bar=200 µgm. Bright field images taken at different channel locations indicated by colored boxes in FIG. 12A. DAPI and Phal-loidin staining of cells on top and bottom of device and Z-stack imaging of cells at 72 h post-seeding. Z-stack scale=150 µgm.

FIG. 13A shows synthesis of oversulfated CS-E from monosulfated CS-A. FIG. 13B shows photo crosslinking of monosulfated CS-A or oversulfated CS-E containing CS-GAG matrices consisting of biodegradable ester and amide linkages.

FIG. 15A shows imaging cytometry quantification of CAR antigens on patient-derived GSCs. Included is the percent expression of the CAR specific antigens in a N08 patient-derived GBM isolate. FIG. 15B shows flow between central channel and reservoir. FIG. 15C presents binary mask and 3D volume reconstruction and shows GSCs exposed to activated T-cells are significantly smaller than untreated GSCs after 7 DIV.

FIG. 16A is a filament reconstruction conducted through Imaris software from z stacks of confocal (LSM 710) images to demonstrate differences in vesicular growth of HUVECs in 3D fibrin hydrogels. DAPI stains nuclei of all cells and CD31 stains endothelial cells and cellular processes. FIG. 16B graphs filament volume and length quantified from Imaris filament tracing analysis of confocal images of ROIs of HUVECs around a GBM spheroid, in the contralateral end of the well with the spheroid, and in a well containing only HUVECs in gel. Significance is measured using ANOVA on ranks and comparison is made with Dunn's method. FIG. 16C is a schematic of the GBM spheroid-initiated angiogenesis promoting tube formation from the flow-channel into the hydrogel-filled reservoir to facilitate T cell access to GBM spheroid.

DETAILED DESCRIPTION

Figure 1:
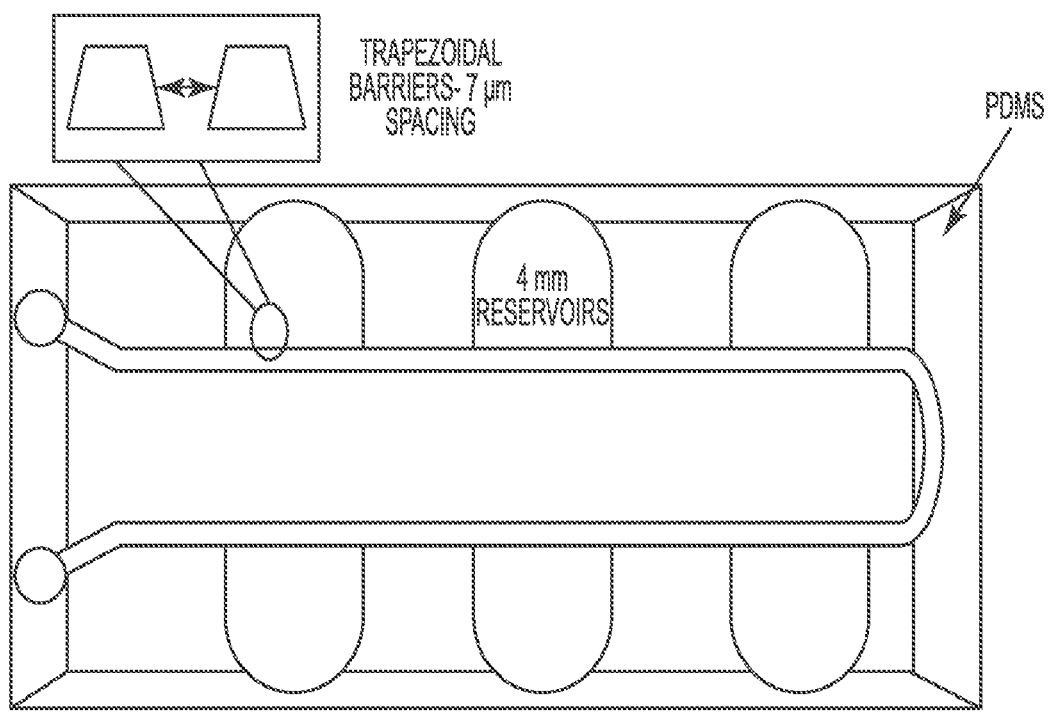
FIG. 1. Schematic of the silicon mold design used in fabricating the devices for in vitro experiments.

Glioblastoma multiforme (GBM) is an aggressive brain tumor that accounts for 50% of all malignant brain tumors in adults (Friedmann-Morvinski et al., 2016, *Oncogene;* 35(5):608-20). There are currently no effective treatments for GBM, with less than 5% of patients surviving longer than 36 months (Stupp et al., 2009, *Lancet Oncol;* 10(5): 459-466). Chimeric antigen receptor (CAR) T cells and immune checkpoint antibodies have been successful against blood, skin, and lung cancers (Weber et al., 2015, *Lancet Oncol;* 16:375-384; Larkin et al., 2015, *N Engl J Med;* 373:23-34; Borghaei et al., 2015, *N Engl J Med;* 373:1627-1639; Davila et al., 2014, *Transl Med;* 6(224):224ra25; and Maude et al., 2014, *N Engl J Med;* 371:1507-1517). These therapies have nevertheless been largely ineffective against GBM (Reardon et al., 2017, *Neuro-Oncology;* 19(Suppl 3):iii21), likely due to antigen heterogeneity and the onset of adaptive changes in the tumor microenvironment (Newick et al., 2016, *Mol Ther Oncolytics;* 3:16006; Rodriguez et al., 2018, *Nat Rev Immunol;* 18:204-211; Fesnak et al., 2016, *Nat Rev Cancer;* 16:566-581; and O'Rourke et al., 2017, *Sci Transl Med;* 9(399):pii:eaaa0984). A better understanding of these mechanisms will provide for the deployment of enhanced CAR T cell potency against GBM. However, the current lack of multi-functional in vitro platforms to conduct detailed investigations of drug and cellular immunotherapy induced adaptive changes in the GBM microenvironment hinders the development of these approaches.

The present invention provides a microfluidic device that mimics in vitro the biological environment, allowing for perfusive flow that is similar to in vivo blood flow conditions, and provides for realistic interactions between T-cells and solid GBM tumor cultures. This microfluidic platform provides a novel opportunity to study GBM-immune cell interactions, which can inform future immunotherapeutic approaches against GBM. Using a microfluidic device of the present invention, T-cells and/or CAR-T cells can be flowed through endothelial cell lined channels to observe T-cell targeting of GBM cells placed within the reservoirs and under different conditions to observe how GBM evade T-cell detection and targeting.

The GBM tumor microenvironment (TME) is complex and presents many obstacles to the successful translation of cellular immunotherapies. Chief among these are adaptive changes such as acquired resistance mechanisms (Uyttenhove et al., 2003, Nat Med; 9:1269-1274; Parsa et al., 2007, Nat Med; 13:84-88; and Liu et al., 2006, Mol Cancer; 5:67), antigen loss (O'Rourke et al., 2017, Sci Transl Med; 9(399): pii:eaaa0984; Parsa et al., 2007, Nat Med; 13:84-88; and Chowell et al., 2018, Science; 359:582-587), aberrant tumor ECM glycan expression and signaling (Chou et al., 2018, BMC Cancer; 18(1):105; Jaime-Ramirez et al., 2017, J Gene Med; 19(3); Kobayashi et al., 2013, PLoS One; 8:e54278; and Pellegatta et al., 2018, Sci Transl Med; 10(430): pii:eaao2731), and prevalence of a host of other cell-surface and secreted immunosuppressive molecules that GBM uses to avoid immune recognition (Nduom et al., 2015, Neuro Oncol; 17 Suppl 7:vii9-vii14). The microfluidic device of the present invention can be used to obtain a better understanding of these mechanisms, leading to more targeted therapies for GBM.

Suppression of T cell function is an important GBM adaptation. The direct immunosuppression of effector T-cells by GBM is broadly attributed to the enhanced expression of transcription factors and secreted factors that help create a tolerogenic microenvironment (Nduom et al., 2015, Neuro Oncol; 17 Suppl 7:vii9-vii14; Abou-Ghazal et al., 2008, Clin Cancer Res; 14:8228-8235; Crane et al., 2012, Neuro Oncol; 14:584-595; Fontana et al., 1984, J Immunol; 132:1837-1844; Frei et al., 2015, Oncotarget; 6(8):5963-5977; Hishii et al., 1995, Neurosurgery; 37:1160-6; discussion 1166-7; Kuppner et al., 1990, J Neurosurg; 72:619-625; Nitta et al., 1994, Brain Res; 649: 122-128; Wrann et al., 1987, EMBO J; 6:1633-1636; and Yan et al., 2015, J Natl Cancer Inst; 107(8):djv137). It has been previously demonstrated that selectively upregulated glycans in the GBM ECM can enhance soluble factor binding (International Application WO 2018/026784 (PCT/US2017/044845); Karumbaiah et al., 2015, Bioconjug Chem; 26:2336-2349; and Logun et al., 2016, J Mater Chem B; 4:6052-6064). In addition to secreted factors, the upregulation of CD95 and PD-L1 on the GBM cell surface is reported to inhibit T-cell activation and infiltration and induce T cell apoptosis (Weller et al., 1997, Cell Physiol Biochem; 7:282-288; Dong et al., 2002, Nat Med; 8:793-800; and Wintterle et al., 2003, Cancer Res; 63:7462-7467). The immunosuppressive response activated by GBM is mediated by expression of galectins and activation of mechanisms that impair T-cell metabolism (Le Mercier et al., 2010, Brain Pathol; 20:17-27; Patsoukis et al., 2015, Nat Commun; 6:6692; and Swamy et al., 2016, Nat Immunol; 17:712-720). Despite this evidence, the temporal effects of prolonged T-cell exposure on the induction of specific GBM adaptive changes responsible for T-cell immunosuppression have not been studied. The microfluidic device of the present invention provides for a closer investigation of spatiotemporal dynamics of T cell induced adaptive changes in GBM, leading to the development of targeted therapies that can enhance the efficacy of cytotoxic drugs and immunotherapies against GBM.

Tumor- and immune-cell specific alterations in glycan presentation and signaling have been implicated in the induction of immunosuppression in other solid tumors (Rodriguez et al., 2018, Nat Rev Immunol; 18:204-211; Kobayashi et al., 2013, PLoS One; 8:e54278; Pellegatta et al., 2018, Sci Transl Med; 10(430): pii:eaao2731; Birks et al., 2011, Neuro Oncol; 13:950-960; Roth et al., 2007, Cancer Res; 67:3540-3544; Shen et al., 2016, Tumour Blot; 37:4909-4918; Viapiano et al., 2005, Cancer Res; 65:6726-6733; Yeh et al., 2016, Proc Natl Acad Sci USA; 113:5592-5597; and Van Woensel et al., 2017, Sci Rep; 7:1217). Chondroitin sulfate proteoglycans (CSPGs) demonstrated that oversulfated CS-E matrices significantly enhanced binding of the chemotactic agent CXCL12 and GBM cell invasion when compared to other mono- and unsulfated GAGs32. The contextual and compositional relevance of oversulfated CS in regulating the maintenance and proliferation of resistant GBM stem cells (GSCs), and in promoting GBM progression has not been elucidated. The ability to engineer oversulfated such as the brain tumor specific CSPG4 (also called NG2) and their associated sulfated CS-GAGs are selectively upregulated in human GBM ECM and are prognostic indicators of enhanced invasiveness and poor survival (Jaime-Ramirez et al., 2017, J Gene Med; 19(3); Kobayashi et al., 2013, PLoS One; 8:e54278; Pellegatta et al., 2018, Sci Transl Med; 10(430): pii:eaao2731; Viapiano et al., 2005, Cancer Res; 65:6726-6733; Reinhard et al., 2016, Int J Biochem Cell Biol; 81:174-183; Sim et al., 2009, J Biol Chem; 284:26547-26556; Chekenya et al., 1999, Int J Dev Neurosci; 17:421-435; Goldbrunner et al., 1999, Acta Neurochir (Wien); 141, 295-305; discussion 304-295; and Svendsen et al., 2011, Acta Neuropathol; 122:495-510). However, little is known about the sulfated GAG composition of these and other GBM associated CSPGs. The microfluidic device of the present invention may be used as glioma-on-chip microfluidic devices, to further investigate tumor ECM specific sulfation.

The microfluidic assay device of the present invention provides an in vitro vascularized, flow-based microfluidic platform that mimics in vivo vasculature and 3D extracellular matrix conditions, providing realistic interactions between T-cells and solid GBM tumor cultures.

The microfluidic assay device of the present invention may also be referred to herein as a microfluidic device, an assay device, a device, or "CARTiFlo," or a "CARTiFlo" device.

A microfluidic assay device of the present invention includes a flow channel configured to receive a monolayer of endothelial cells, in which the flow channel has both an inlet and outlet. The inlet and outlet of the flow channel may be positioned on the same side of the device.

The flow channel may vary in length, for example, being about 1 centimeter (cm) to about 20 cm in length or about 5 cm to about 10 cm in length. It may be, for example, about 4 cm, about 5 cm, about 6 cm, about 7 cm, about 8 cm, about 9 cm, about 10 cm, or any range thereof in length. In some embodiments, the flow chamber is about 7 cm in length, including for example, about 71.5 mm in length.

The flow channel may vary in width, for example, from about 500 μm to about 2000 μm, or about 800 μm to about 1200 μm in width. It may be, for example, about 500 μm, 600 μm, 700 μm, 800 μm, 900 μm, 1000 μm, 1100 μm, 1200 μm, 1300 μm, 1400 μm, 1500 μm, 1600, 1700 μm, 1800 μm, 1900 μm, 2000 μm, or any range thereof in width. In some embodiments, the flow chamber is about 1000 μm in width.

The flow channel of the microfluidic assay device described herein may vary in height, for example, being from about 50 μm to about 250 μm. It may be, for example about 50 μm, about 100 μm, about 15 μm, about 200 μm, about 250 μm, or any range thereof. In some embodiments, the flow chamber has a height of about 150 μm.

The inlet and/or outlet of the flow channel of the microfluidic assay device described herein may vary in diameter, for example, from about 0.5 mm to about 2 mm. It may be, for example about 0.5 mm, about 1 mm, about 1.5 mm, about 2 mm, or any range thereof. In some embodiments, the inlet and/or outlet of the flow chamber has a diameter of about 1 mm.

A microfluidic assay device of the present invention includes one or more reservoirs distributed along the flow channel, each reservoir in fluid communication with the flow channel along an interface. The device may include any number of reservoirs, for example, one, two, three, four, five, six, seven, eight, nine, ten, eleven, twelve, or more reservoirs. These reservoirs may be evenly spaced along the flow channel.

A microfluidic assay device of the present invention includes a plurality of barriers arranged along the interface of the flow channel with each reservoir. The plurality of barriers may be configured to provide a semipermeable interface and/or to provide for cell migration across the interface. The barriers may be spaced, for example, about 2 μm to about 10 μm from a nearest other barrier, including, for example about 2 μm, about 3 μm, about 4 μm, about 5 μm, about 6 μm, about 7 μm, about 8 μm, about 9 μm, about 10 μm, or any range thereof from a nearest other barrier. In some embodiments, the barriers may be spaced about 7 μm from a nearest other barrier.

In some aspects, the plurality of barriers arranged along the interface of the flow channel with each reservoir are trapezoidal in shape. Each trapezoidal barrier may be about 75 μm to about 100 μm in width, about 100 μm to about 200 μm in length of the longest base, and about 25 μm to about 75 μm in length of the shortest base. In some embodiments, each trapezoidal barrier is about 100 μm in width, about 150 μm in length of the longest base, and about 50 μm in length of the shortest base. The trapezoidal barriers may be spaced, for example, about 2 μm to about 10 μm from a nearest other barrier, including, for example about 2 μm, about 3 μm, about 4 μm, about 5 μm, about 6 μm, about 7 μm, about 8 μm, about 9 μm, about 10 μm, or any range thereof from a nearest other barrier. In some embodiments, the trapezoidal barriers may be spaced about 7 μm from a nearest other barrier.

The interface of the flow channel with each reservoir may include about 5 to about 50 barriers, including, for example about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, or any range thereof of barriers.

In some embodiments, the interface of the flow channel with each reservoir includes about 22 barriers. These barriers may be trapezoidal in shape, about 100 micrometers (μm) in width, about 150 μm in length of the longest base, and about 50 μm in length of the shortest base, with each of the trapezoidal barriers spaced about 7 micrometers (7 μm) from a nearest other trapezoidal barrier.

Representative examples of the microfluidic assay devices of the present invention include any of those described in the examples included herein, including, but not limited to any of those shown, for example, in FIG. 1, FIGS. 2A and 2B, FIGS. 4A-4C, and FIGS. 9A-9C. In some embodiments, a microfluidic assay device of the present invention includes:

a flow channel of about 7 cm in length;
a flow channel with a width of about 1000 μm;
a flow channel of about 150 μm in height;
flow channel inlet and outlets positioned on the same side of the device;
flow channel inlet and outlet of a diameter of about 1 mm;
six reservoirs with a diameter of about 5 mm evenly spaced along the flow channel;
a plurality of barriers, trapezoidal in shape, arranged along the interface of the flow channel with each reservoir;
the interface of the flow channel with each reservoir having 22 trapezoidal barriers, each trapezoidal barrier about 100 micrometers (μm) in width, about 150 μm in length of the longest base, and about 50 μm in length of the shortest bases; and
each of the trapezoidal barriers spaced about 7 micrometers (μm) from the nearest other trapezoidal barrier.

A microfluidic assay device of the present invention mimics the biological environment, allowing for a perfusive flow that is similar to in vivo blood flow conditions.

The flow channel of the microfluidic assay device may support endothelialization, supporting the growth of endothelial cells. In some aspects, endothelial cells are growing as a confluent monolayer of endothelial cells. In some aspects, a confluent monolayer of endothelial cells provides a barrier mimicking or similar to the blood-tumor barrier or blood-brain barrier found in vivo. In some aspects, these endothelial cells may be human umbilical vein endothelial cells (HUVEC). In some aspects, the monolayer may include cells of a primary blood-brain barrier, such as for example, astrocytes, pericytes, and/or endothelial cells.

Figure 6A:
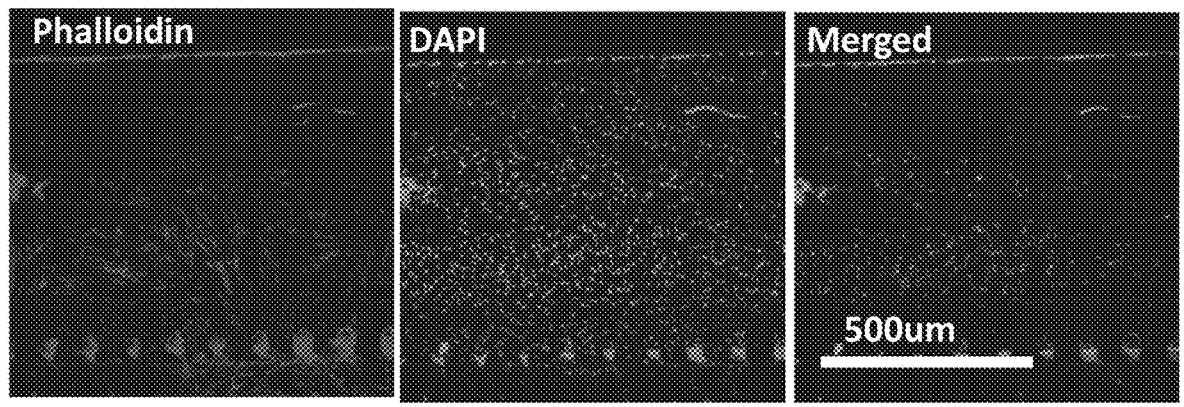
FIGS. 6A to 6F. Blood-brain Barrier.
Figure 6B:
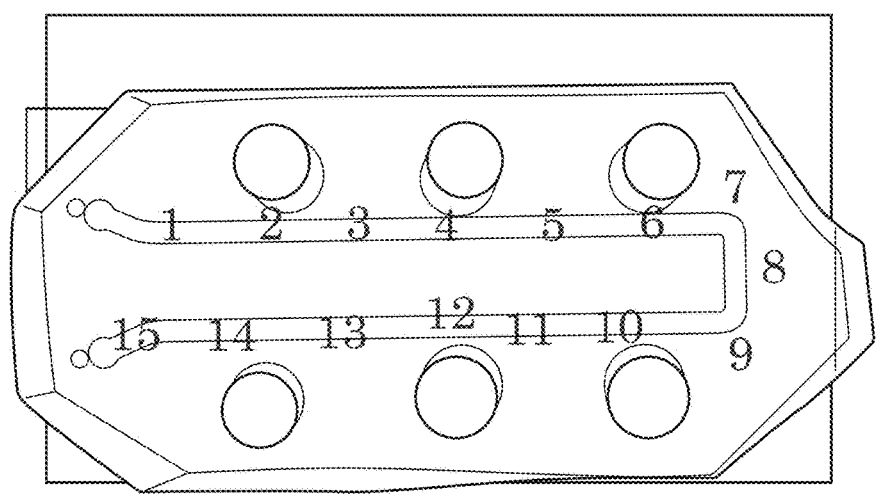
Figure 6C:
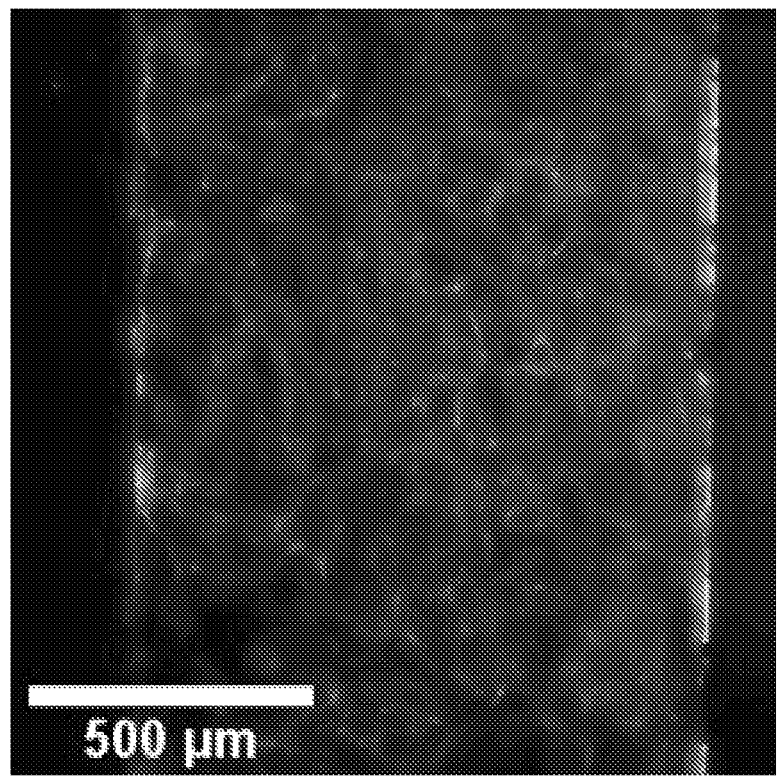
Figure 6D:
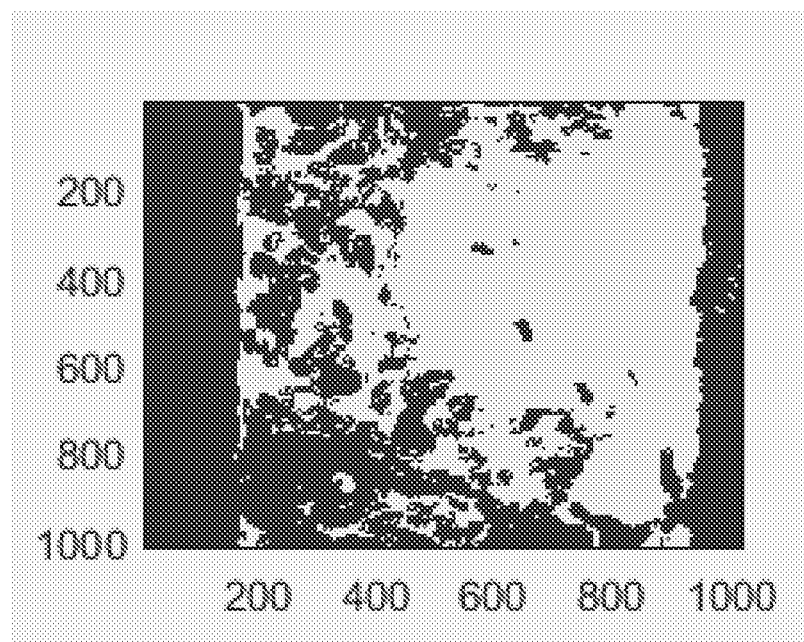
Figure 6E:
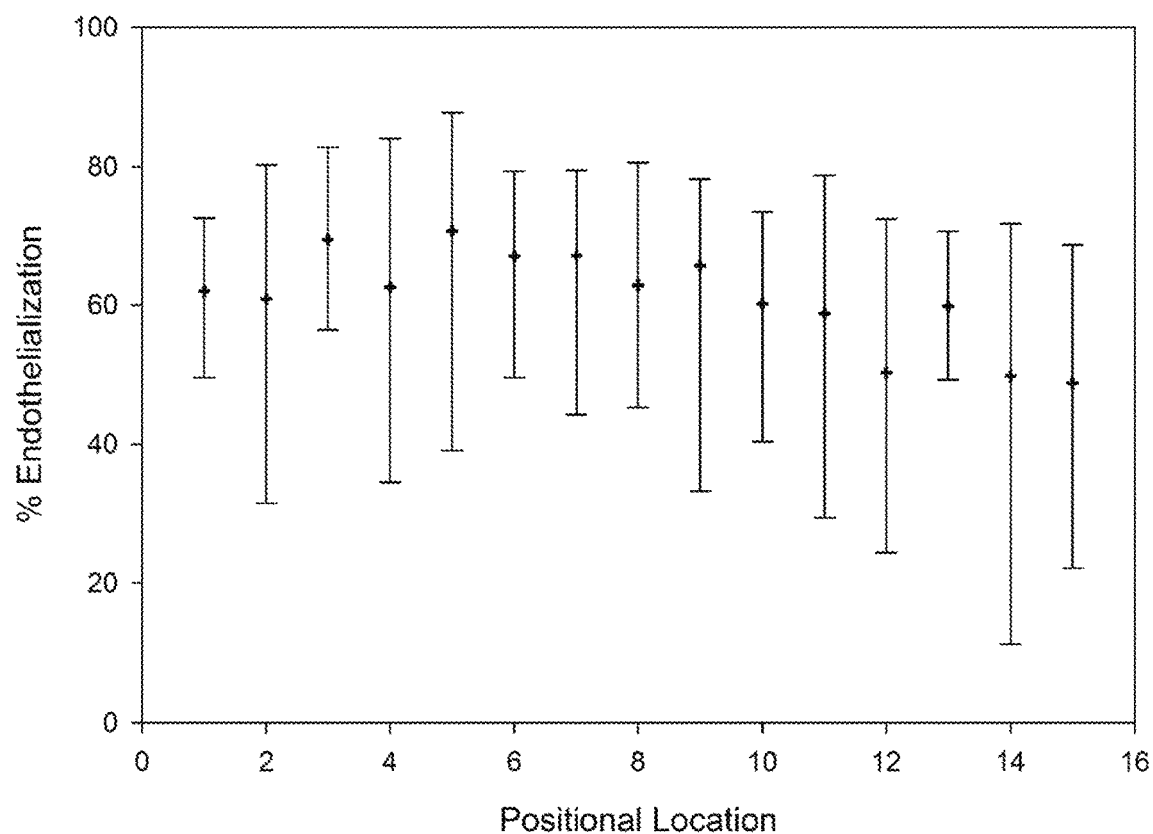
Figure 6F:
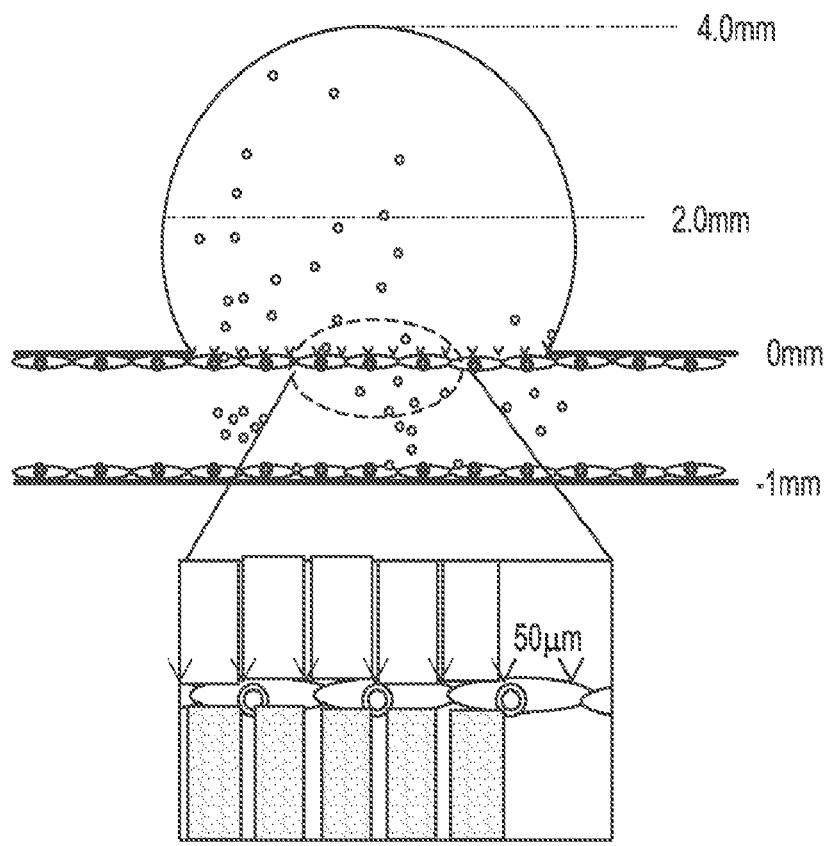

In some embodiments of endothelialization, as shown FIGS. 6A-6C, a flow-channel is coated with collagen I, for example, 100 μg/mL collagen I (Vitrocol), and incubated in 37° C. for 2 hours. Unpolymerized collagen I or residue id rinsed off with 1× sterile PBS and preconditioned with endothelial growth medium-2 (EGM-2) (Lonza). Human umbilical vascular endothelial cells (HUVECs; passage 3-6) are harvested with, for example, with 0.05% trypsin treatment, and resuspended to a concentration of $1.0 \times 10^7$ cells/mL in fresh medium, for example, EGM-2 medium. A 10 uL volume of the cell suspension is introduced into the flow channel through the inlet and outlet. The devices are subsequently flipped 90 degrees every 5 minutes to ensure proper cell adherence on all channel surfaces. The inlet and outlet are then filled with media, for example, EGM-2 media, and incubated at 37° C. and 5% $CO_2$ over 48 hours with daily media changes in order to form a stable endothelial cell monolayer, including, for example, a HUVEC monolayer.

Endothelialization may occur before or after the placement of cells or tissue sample, in the reservoirs.

The one or more reservoirs of a microfluidic assay device of the present invention may be configured to receive a cell or tissue sample. The one or more reservoirs of a microfluidic assay device of the present invention may be configured to receive a hydrogel. In some aspects, the cell sample or tissue sample are combined with or encapsulated within an extracellular matrix (ECM), such as a hydrogel or similar matrix supportive of cell growth in culture. In some aspects, the matrix may include a tolerogenic sulfated chondroitin sulfate glycosaminoglycan (CS-GAG), unsulfated hyaluronic acid (HA), a bio-inert poly-ethylene glycol (PEG) matrix, or a extracellular matrix hydrogel, such as for example, collagen, fibrin, or Matrigel. In some aspects, the cell sample or tissue sample is a glioblastoma multiforme (GBM) biopsy sample or a GBM spheroid. In some aspects, the glioblastoma multiforme (GBM) biopsy sample or a GBM spheroid within the one or more reservoirs is encapsulated within hydrogel.

The microfluidic assay device described herein may be fabricated by any of a variety of methods, including but not limited to, for example, being fabricated of poly-di-methyl-siloxane (PDMS), using soft lithography. After fabrication, a microfluidic assay device may be bonded to a support, such as, for example, a glass support, such as for example, a glass cover slip. Further, a microfluidic assay device may be covered with, for example, a glass or plastic cover slip.

Figure 4A:
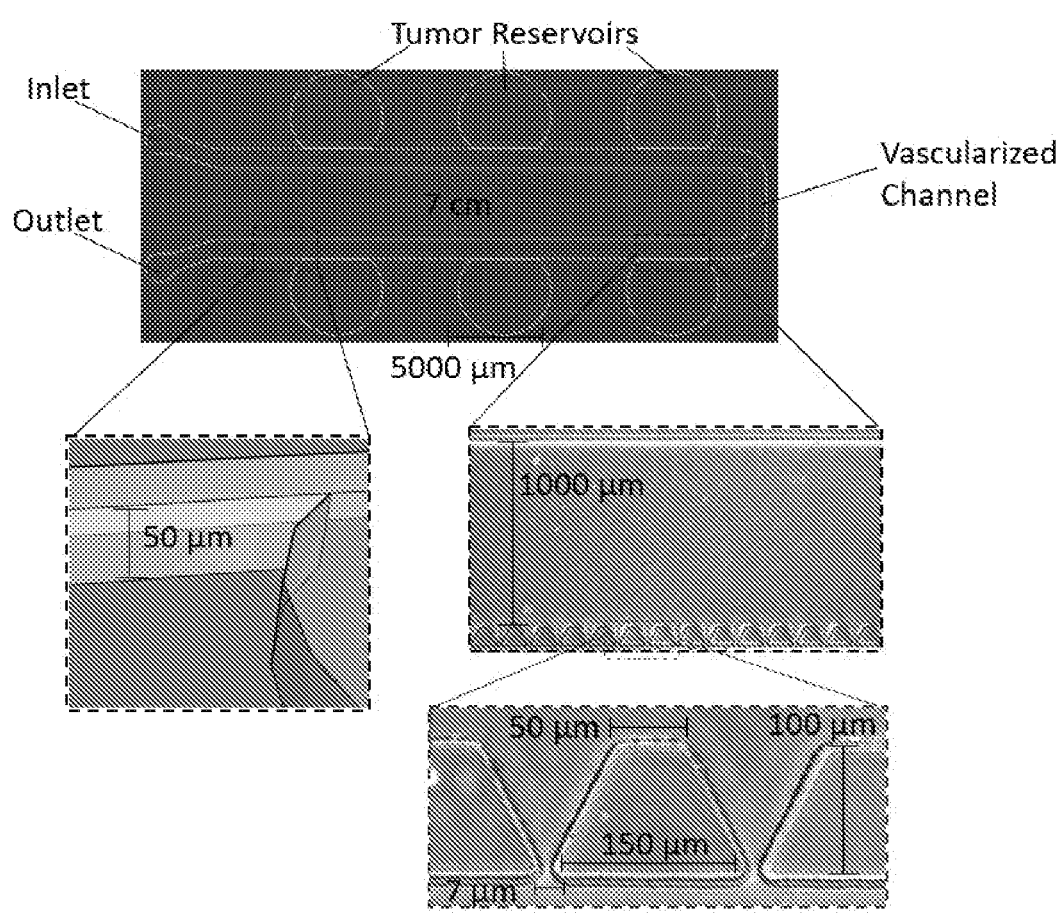
FIGS. 4A to 4C. Fabrication and Device Design.
Figure 4B:
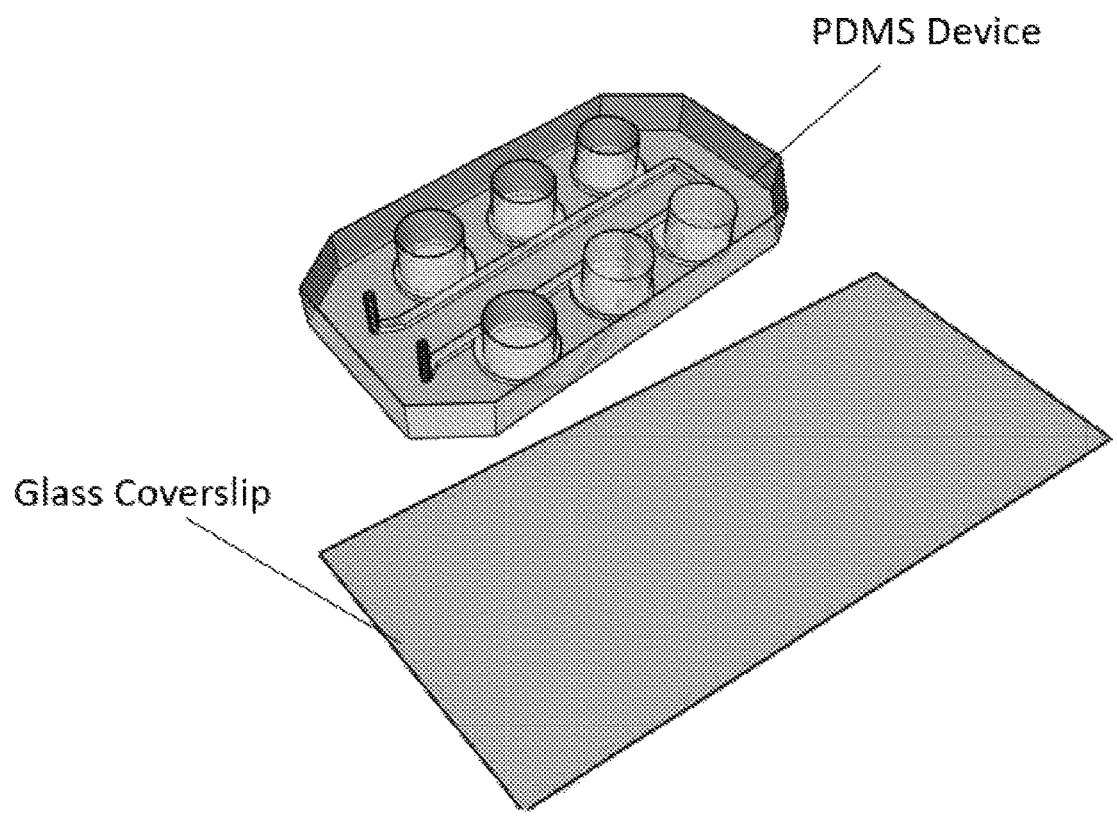
Figure 4C:
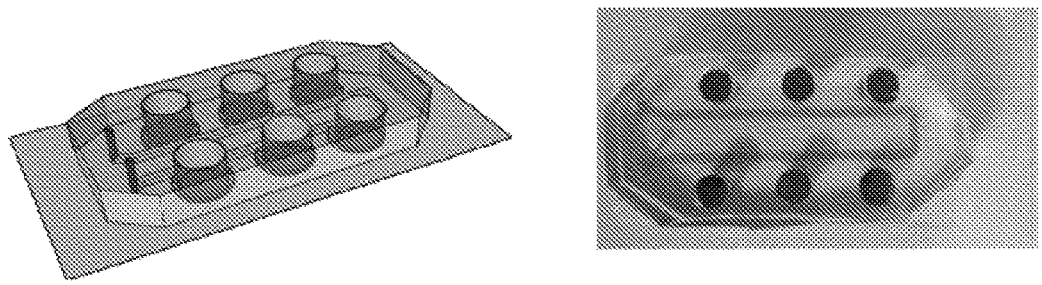
Figure 5A:
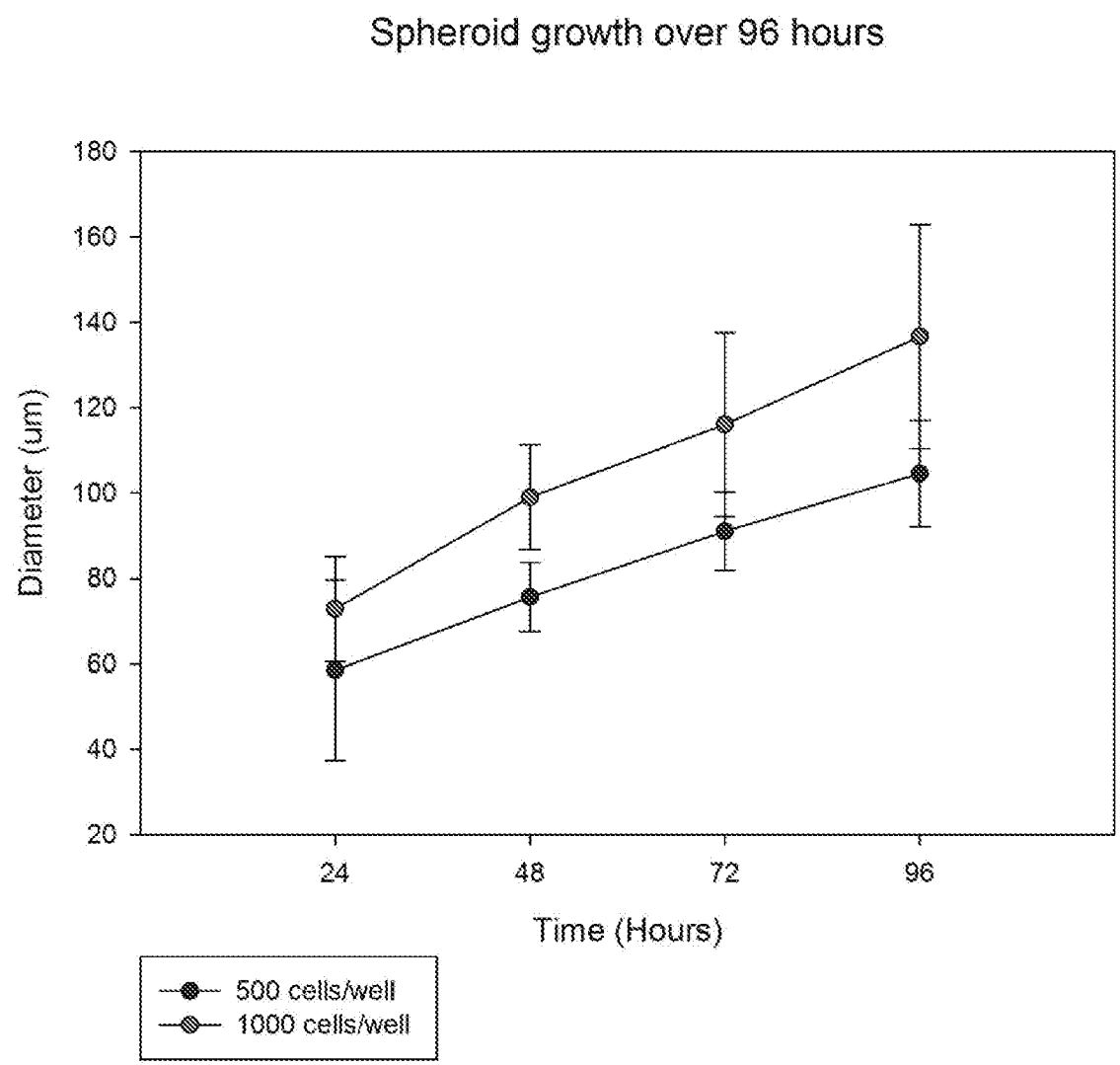
FIGS. 5A to 5D. Spheroid Culture in Reservoir.
Figure 5B:
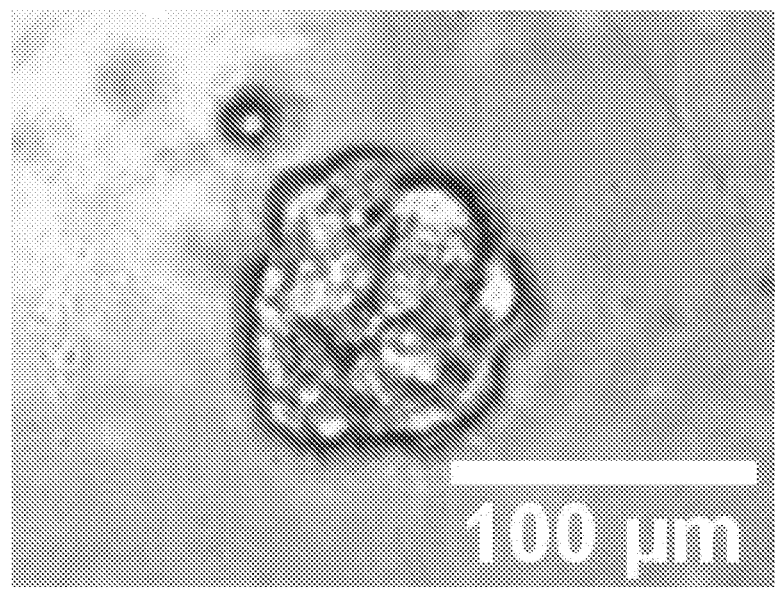
Figure 5C:
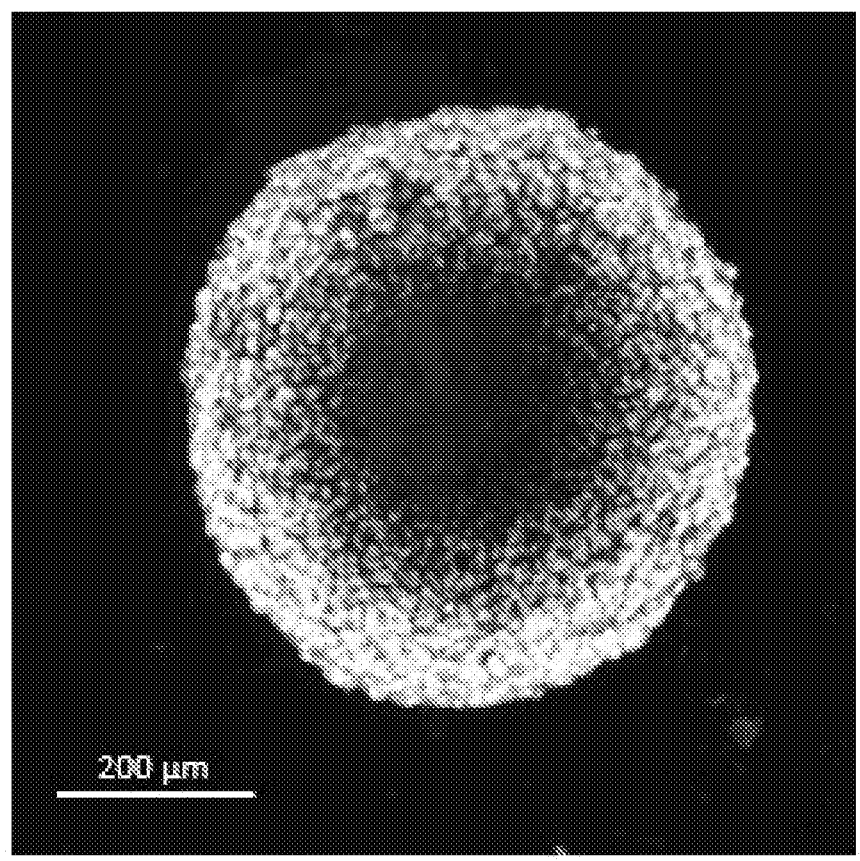
Figure 5D:
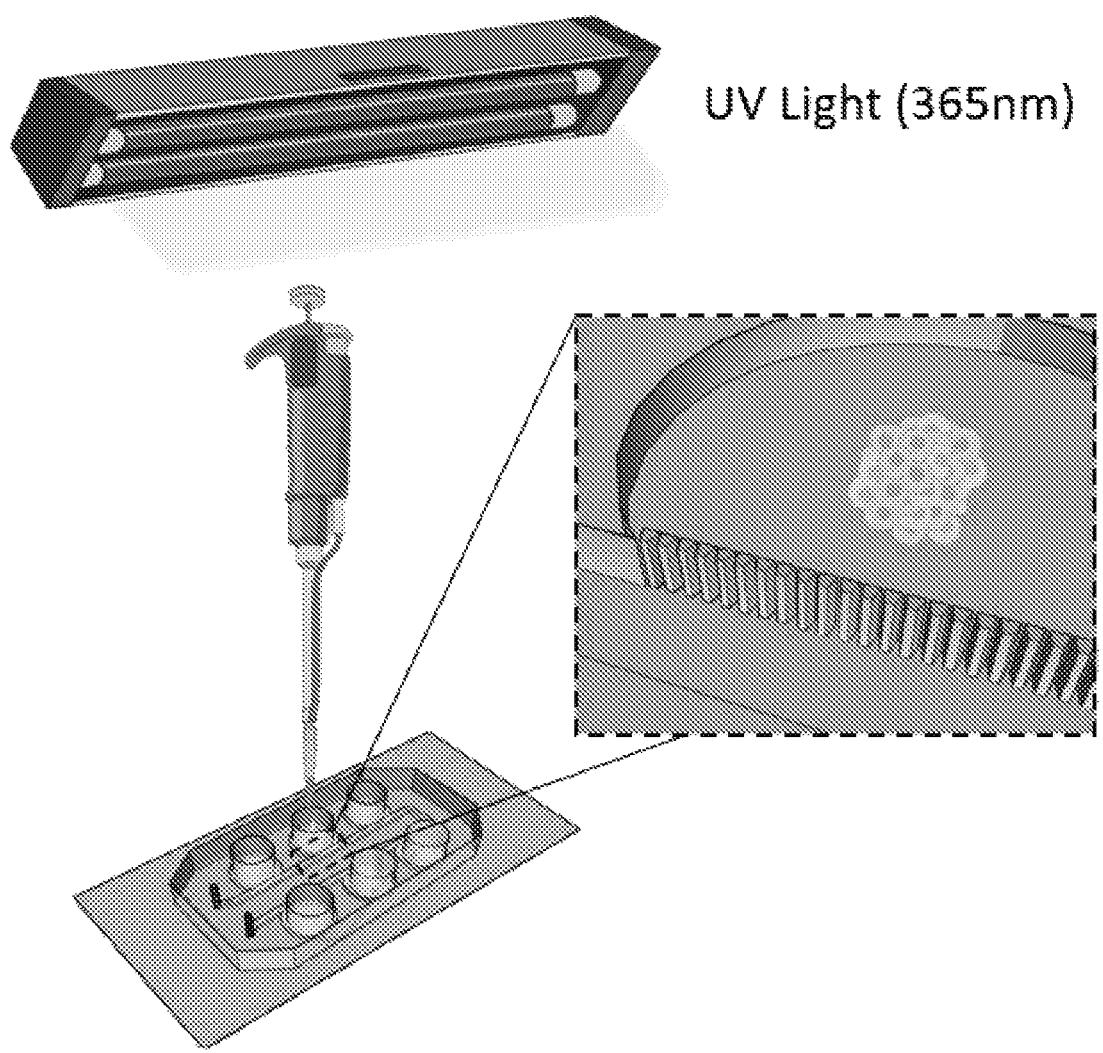

In some embodiments, as shown in FIGS. 4A-4C, for device fabrication, the microfluidic device may have one a flow channel with an inlet and an outlet for sample loading. The flow channel may have a length of 7 cm, a width of 1000 µm, and connect six 5 mm-diameter reservoirs for loading tumor tissue biopsies or tumor spheroids in 3D hydrogels. The channel and reservoirs may be separated by a semi-permeable interface made up of 22 trapezoidal barrier posts that are 100 µm in width, 150 µm/50 µm in length of the longest/shorted bases, each trapezoidal barrier separated by 7 µm gaps. The entire microfluidic chamber may have a uniform height of 50 µm. The microfluidic devices may be made of polydimethylsiloxane (PDMS) using standard soft lithography techniques using an SU8-2025 master mold patterned on a silicon wafer. Briefly, The PDMS elastomer base and curing agent is mixed with a ratio and 10:1, poured over the master mold, and incubated in the oven at 80° C. for 2 hours. The PDMS devices are carefully peeled off the master mold after curing and pretreated with plasma cleaner before bonding with glass. Prior to cell culture, the device reservoirs were coated with 100 µg/mL poly-d-lysine (PDL) for an hour and rinsed with three changes of sterile DI $H_2O$. This is followed by baking at 80° C. in the oven for 48 hours to return hydrophobicity to the device and to increase the contact angle in the reservoirs to prevent leakage of the gel into the channel.

A microfluidic assay device as described herein may be sterilized.

With a microfluidic device of the present invention, the flow channel, one or more reservoirs, and/or plurality of barriers may be coated with an agent that promotes cell adhesion and/or cell growth, such as, for example, poly-d-lysine (PDL), fibronectin, or collagen.

A microfluidic assay device as described herein mimics in vitro the in vivo biological environment, supporting endothelization, allowing for perfusive flow similar to in vivo blood flow conditions, and providing for realistic interactions between T-cells and solid tumor cells, such as glioblastoma multiforme tumor cells. A microfluidic assay device as described herein may be used for the study of interactions of immune cells with tumor cells, such as glioblastoma multiforme tumor cells, and the development of improved immunotherapeutic approaches against cancers, such as glioblastoma multiforme.

In some embodiments, tumor spheroid seeding is as shown in FIGS. 5A to 5D. Briefly, dimensionally-uniform 100 µm patient-derived, Glioblastoma (N08) spheroids are formed in ultra-low attachment 96-well round-bottom plates (Corning) by seeding 500 GBM cells in each well and collecting them after 4 days of culture in vitro at 37° C., 5% $CO_2$, and 99% relative humidity. Each spheroid is encapsulated in 50 µL of hydrogel pre-mixture and added to the PDL-coated and baked reservoirs. The hydrogel pre-mix containing spheroids in reservoirs are photo crosslinked to form a hydrogel by exposure to UV light at 365 nm for 30-60 seconds. The hydrogels are rinsed twice with sterile HBSS and topped off with an equal volume of fresh glioblastoma cell culture media. Media is changed daily for the duration of culturing.

A microfluidic assay device described herein may be used for evaluating the interaction between tumor cells and immune cells, including, but not limited to the evaluation of the interaction between glioblastoma multiforme tumor cells and immune cells cell. Such a method may include: providing a confluent monolayer of endothelial cells within the flow channel of a microfluidic assay device as described herein; placing a suspension of tumor cells in one or more of the reservoirs of the microfluidic assay device; incubating to allow cell-cell interaction; and assaying the interaction between tumor cells and immune cells.

Tumor cells may include any of a variety of cancerous tumor cells, including, but are not limited to, melanoma, basal cell carcinoma, colorectal cancer, pancreatic cancer, breast cancer, prostate cancer, lung cancer (including small-cell lung carcinoma and non-small-cell lung carcinoma), leukemia, lymphoma, sarcoma, ovarian cancer, Kaposi's sarcoma, Hodgkin's lymphoma, Non-Hodgkin's lymphoma, multiple myeloma, neuroblastoma, rhabdomyosarcoma, primary thrombocytosis, primary macroglobulinemia, small-cell lung tumors, primary brain tumors, stomach cancer, head and neck cancers, malignant pancreatic insulanoma, malignant carcinoid, urinary bladder cancer, premalignant skin lesions, testicular cancer, lymphomas, thyroid cancer, neuroblastoma, esophageal cancer, genitourinary tract cancer, malignant hypercalcemia, cervical cancer, kidney cancer, endometrial cancer, glioblastoma, mesothelioma, oral leukoplakia, Barrett's esophageal cancer, and adrenal cortical cancer. In some aspects, tumor cells are from a primary cancer. In some aspects, tumor cells are from a metastatic tumor, including, but not limited to a metastatic melanoma, metastatic breast cancer, or metastatic colorectal cancer. In some aspects, tumor cells are from a solid tumor. Tumor cells may be a cultured tumor cell line or a patient derived biopsy sample. Tumor cells may be combined with or encapsulated with the hydrogel, or an similar matrix supportive of cell growth in culture.

In some embodiments, tumor cells are glioblastoma multiforme (GBM) tumor cells, including cells obtained from primary human GBM biopsies, molecularly characterized GBM cells established in culture from neurosurgical human GBM resections, or GBM stem cells (GSC). GSC isolates may possess unique mutational differences, and include, but are not limited to GSC ID N12-115 (EGFR Gene amplification: negative; PTEN Deletion; positive; MGMT status: methylated), GSC ID N08-30 (EGFR Gene amplification: positive; PTEN Deletion; positive; MGMT status: methylated); and GSC ID N12-159 (EGFR Gene amplification:

negative; PTEN Deletion; positive; MGMT status: unmethylated). Additional patient derived GSCs may be isolated from high-grade tumors.

Immune cells include any of a variety of immune cells, including, but not limited to T cells or CAR-T cells. T cells include, for example, naive or activated human T-cells. Such T cells may be derived from a patient or obtained from cultured lines.

CAR-T cells are T cells transduced with a CAR (Chimeric antigen receptor) lentivirus construct. CAR-T cells can target different tumor antigens, such as, for example, CD19, CD133, Her-2, EGFR, VEGFR-2, pd-L1, and mesothelin. CAR-T cells are used in CAR T-cell therapy, a form of immunotherapy that uses these specially altered T cells to fight cancer. Briefly, a sample of a patient's T cells are collected from the blood, modified to produce an artificial receptor, called a "chimeric antigen receptor" (CAR) on their surface. The chimeric antigen receptor targets the modified T cells to the tumor antigen on the surface of tumor cells. When these CAR-T cells are reinfused into the patient's body through an IV, they begin multiplying, attacking and killing tumor cells. CAR-T cells may include, for example, CD133 and PD-L1 targeting CAR-T cells (ProMab, Inc.).

Assaying the interaction between tumor cells and immune cells may be by any of a variety of available methods. Phenotypic, apoptosis, proliferation and energy metabolism changes may be evaluated in T-cells and CAR-T cells, as well exposure dependent adaptive changes of cell surface markers using imaging cytometry and other molecular assessments.

Biomarker expression may be characterized using, for example, well characterized biomarkers used in imaging cytometry. Phenotypic markers for T-cells will include, for example, CD3, CD4, CD8, CD69, CD25, Foxp3, Ki67, CD57, PD-1, CTLA-4, Annexin V, and RL2. Phenotypic markers for GBM cells will include, for example, CD133/1, CD95, NG2, PD-L1, and Sox-1. Imaging cytometry combines the attributes of conventional flow cytometry and microscopy to yield a better phenotype characterization of the cell-surface and sub-cellular antigens. For example, an ImageStream (MKII, Millipore Sigma) imaging cytometry system may be used to conduct high-resolution analyses of T-effector cells (CD4+), cytotoxic T-lymphocytes (CD8+), T-regulatory cells (CD25+, CD4+, and FoxP3+), T-cell exhaustion and senescence (CD57+), and co-stimulatory receptors (PD-1, CTLA4). This technique may also be used to characterize GBM cell markers.

Gene and protein expression of biomarkers may also be used to assay immune interactions. Gene and protein expression of T-cell and GBM biomarkers in cells may be determined using qRT-PCR and immunoblotting methods previously described (Logun et al., 2016, *J Mater Chem B;* 4:6052-6064). Biomarkers for T-cells may include, for example, CD3, CD4, CD8, CD69, CD25, Foxp3, Ki67, CD57, PD-1, CTLA-4, Annexin V, and RL2. Biomarkers for GBM cells may include, for example, CD133/1, CD95, NG2, PD-L1, and Sox-1.

Assaying the interaction between tumor cells and immune cells may include assaying T-call activation. Assaying for T cell activation may be by any of a variety of available methods, including any of those described in the examples included herewith. In some embodiments, assaying for T cell activation includes optical metabolic imaging.

In some aspects, assaying for the interaction between tumor cells and immune cells includes assaying T-cell exposure induced activation of immunosuppression by GBM tumor cells.

EXEMPLARY EMBODIMENTS

1. A microfluidic assay device, the device comprising:
   a flow channel configured to receive a monolayer of endothelial cells;
   the flow channel comprising an inlet and outlet;
   one or more reservoirs distributed along the flow channel, each reservoir in fluid communication with the flow channel along an interface; and
   a plurality of barriers arranged along the interface of the flow channel with each reservoir;
   the plurality of barriers configured to provide a semipermeable interface and/or to provide for cell migration across the interface.

2. The microfluidic assay device of Embodiment 1, wherein the inlet and outlet of the flow channel are positioned on the same side of the device.

3. The microfluidic assay device of Embodiment 1 or 2, the one or more reservoirs configured to receive a hydrogel.

4. The microfluidic assay device of any of the preceding Embodiments, the flow channel comprising a length of about 7 centimeters (cm).

5. The microfluidic assay device of any of the preceding Embodiments, the flow channel comprising a width of about 1000 micrometers (1000 µm).

6. The microfluidic assay device of any of the preceding Embodiments, the flow channel comprising a height of about 150 micrometers (150 µm).

7. The microfluidic assay device of any of the preceding Embodiments, wherein the inlet and/or outlet of the flow channel comprise a diameter of about 1 millimeter (1 mm).

8. The microfluidic assay device of any of the preceding Embodiments, the one or more reservoirs comprising a diameter of about 5 millimeters (5 mm).

9. The microfluidic assay device of any of the preceding Embodiments, comprising six reservoirs evenly spaced along the flow channel.

10. The microfluidic assay device of any of the preceding Embodiments, wherein the plurality of barriers arranged along the interface of the flow channel with each reservoir comprise a trapezoidal shape.

11. The microfluidic assay device of any of the preceding Embodiments, wherein the interface of the flow channel with each reservoir comprises 22 trapezoidal barriers, each trapezoidal barrier about 100 micrometers (µm) in width, about 150 µm in length of the longest base, and about 50 µm in length of the shortest base, and wherein each of the trapezoidal barriers is spaced about 7 micrometers (7 µm) from a nearest other trapezoidal barrier.

12. The microfluidic assay device of any of the preceding Embodiments, wherein the inlet and outlet of the flow channel are positioned on the same side of the device; wherein the flow channel comprises a length of about 7 centimeters (cm); wherein the flow channel comprises a width of about 1000 micrometers (µm); wherein the flow channel comprises a height of about 150 micrometers (µm); wherein the inlet and/or outlet of the flow channel comprise a diameter of about 1 millimeter (1 mm); wherein the one or more reservoirs comprises a diameter of about 5 millimeters (mm); wherein the plurality of barriers arranged along the interface of the flow channel with each reservoir comprise a trapezoidal shape; wherein the interface of the flow channel with each reservoir comprises 22 trapezoidal barriers, each trapezoidal barrier about 100 micrometers (μm) in width, about 150 μm in length of the longest base, and about 50 μm in length of the shortest bases; and wherein each of the trapezoidal barriers is spaced about 7 micrometers (μm) from a nearest other trapezoidal barrier.

13. The microfluidic assay device of any of the preceding Embodiments, comprising six reservoirs evenly spaced along the flow channel.

14. The microfluidic assay device of any of the preceding Embodiments, wherein the microfluidic assay device comprises poly-di-methyl-siloxane (PDMS).

15. The microfluidic assay device of any of the preceding Embodiments, wherein the flow channel, one or more reservoirs, and/or plurality of barriers are coated with fibronectin.

16. The microfluidic assay device of any of the preceding Embodiments, wherein the device is sterilized.

17. The microfluidic assay device of any of the preceding Embodiments, wherein the flow channel comprises endothelial cells.

18. The microfluidic assay device of Embodiment 17, wherein the flow channel comprises a confluent monolayer of endothelial cells.

19. The microfluidic assay device of Embodiments 17 or 18, wherein the endothelial cells comprise human umbilical vein endothelial cells (HUVEC).

20. The microfluidic assay device of any of the preceding Embodiments, the one or more reservoirs comprising a glioblastoma multiforme (GBM) biopsy sample or a GBM spheroid.

21. The microfluidic assay device of Embodiment 20, wherein the glioblastoma multiforme (GBM) biopsy sample or a GBM spheroid within the one or more reservoirs is encapsulated within hydrogel.

22. The microfluidic assay device of any of the preceding Embodiments for evaluating the interaction between tumor cells and immune cells cell.

23. A method of evaluating interaction between tumor cells and immune cells, the method comprising:
providing a confluent monolayer of endothelial cells within the flow channel of the microfluidic assay device of any of the preceding Embodiments;
placing a suspension of tumor cells in one or more of the reservoirs of said microfluidic assay device;
incubating to allow cell-cell interaction; and assaying the interaction between tumor cells and immune cells.

24. The method of Embodiment 23, wherein the tumor cells comprise glioblastoma multiforme (GBM) tumor cells.

25. The method of Embodiment 23 or 24, wherein the immune cells comprise T cells or CAR-T cells.

26. The method of any one of Embodiments 23 to 25, wherein assaying the interaction between tumor cells and immune cells comprises assaying T-call activation.

27. Then method of Embodiment 26, wherein assaying T cell activation is assayed by optical metabolic imaging.

The present invention is illustrated by the following examples. It is to be understood that the particular examples, materials, amounts, and procedures are to be interpreted broadly in accordance with the scope and spirit of the invention as set forth herein.

EXAMPLES

Example 1

Flow-Based Microfluidic Platform Promoting Endothelialization

Microfluidic Device Design and Dimensions. FIG. 1 is a schematic of the silicon mold design used in fabricating the devices for in vitro experiments. The flow channel is 1000 μm wide and 150 μm tall with an inlet and outlet on the same side of the device, each 1 mm in diameter. Six reservoirs are evenly distributed along the channel, each measuring 4 mm in diameter and separated from the flow channel via small triangular barriers. These barriers will retain solid hydrogel in the reservoirs without moving into the flow channel to allow for the culture of cells in a 3D microenvironment alongside the flow channel. The dimensions chosen for the size and spacing of these barriers allow for cell migration between the channel and reservoir.

Figure 2A:
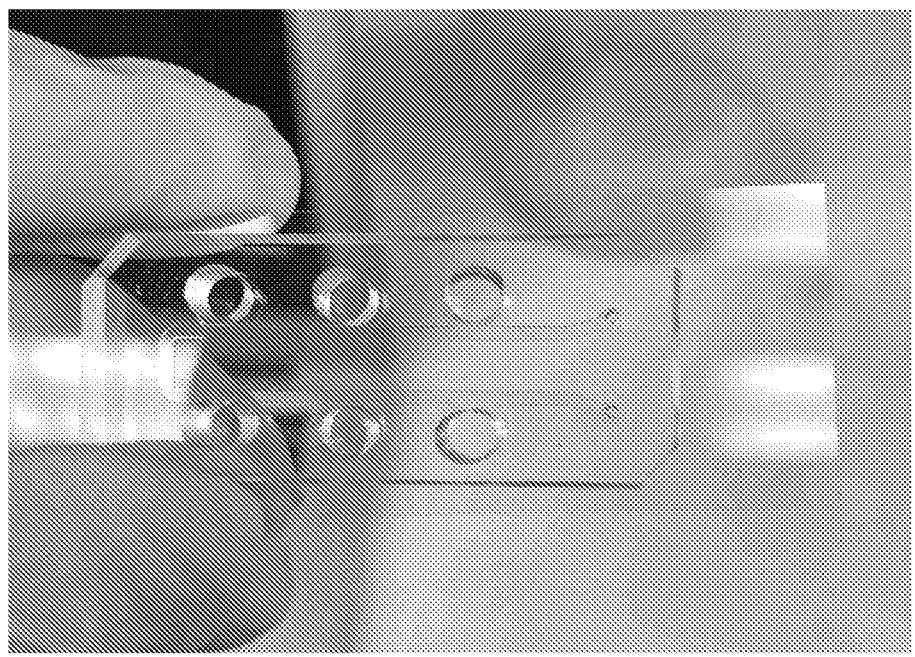
FIGS. 2A and 2B.
Figure 2B:
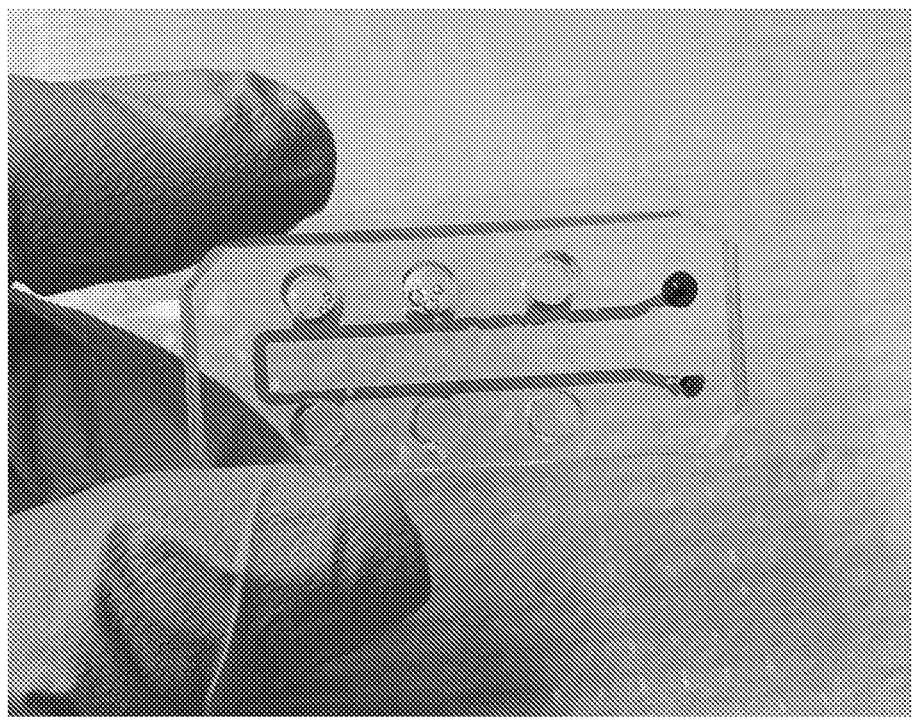

PDMS Microfluidic Device Fabrication. PDMS microfluidic devices are fabricated using soft lithography in silicone molds. In preparation for cell culture experiments, the device is sterilized with a 70% ethanol wash twice and coated with PDL to enhance cell adhesion. To restore hydrophobicity in the channels, the device is baked for 48 hours in 80° C. FIG. 2A is an image of empty device before use. In FIG. 2B, food coloring-stained PBS seeded in the flow channel demonstrates flow channel utility when reservoirs are filled with hydrogel to mimic the solid tumor microenvironment around blood vessels.

Endothelial Cell Monolayers can be observed after 72 h. Briefly, 20× brightfield images of HUVECs (p7) within the fibronectin coated device were taken 24 hours after seeding. Cells were seeded at a density of 10 μl/mL with daily media changes using pipetting. A confluent monolayer is obtained.

Figure 3:
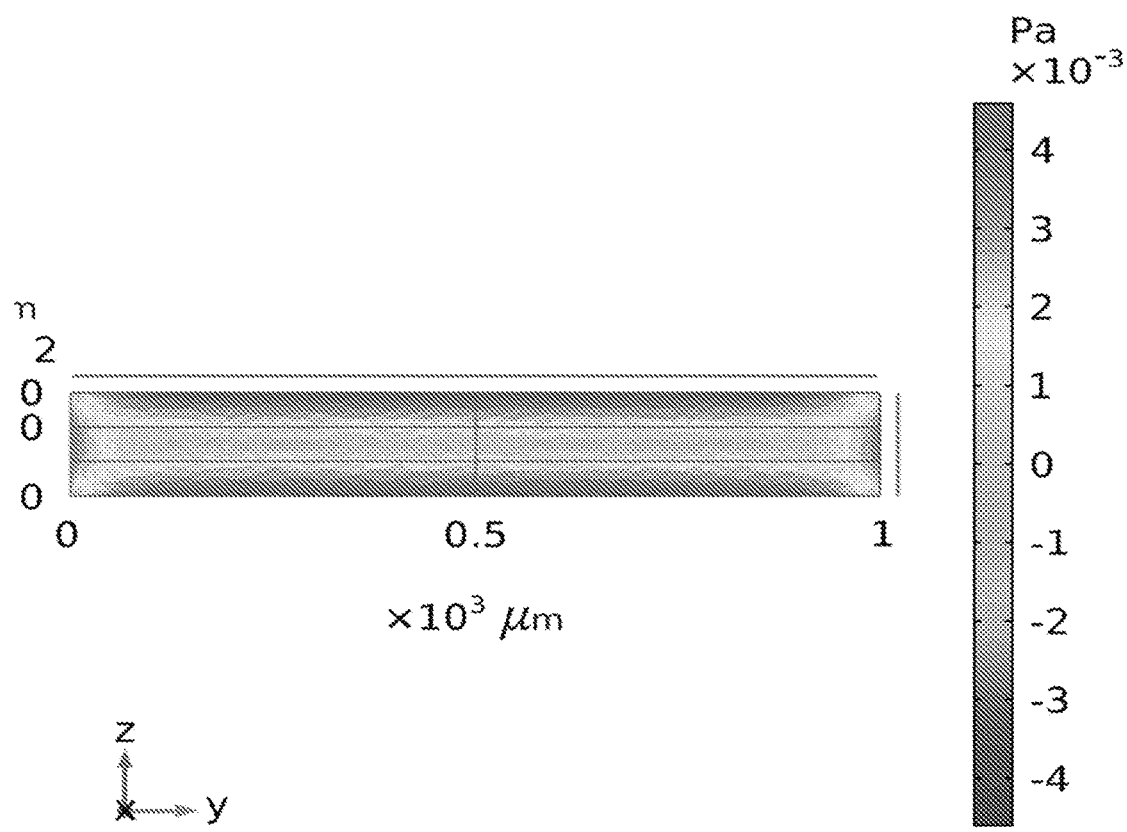
FIG. 3. MATLAB-generated schematic showing the estimated shear stress of the flow channel given a flow rate of 1 uL/min.

Shear Strain/Stress with Flow Rate. FIG. 3 is a MATLAB-generated schematic showing the estimated shear stress of the flow channel given a flow rate of 1 uL/min. Visualization shows cross-section of the flow channel in z and y-planes. Once HUVEC cells have endothelialized within the device, future experiments will seek to flow T-cells throughout that channel to mimic T-cell movement and extravasation.

Phalloidin Staining of HUVECs Demonstrates Extent of Endothelialization in Culture. Extensive endothelialization of HUVEC cells can be observed after 72 h in culture. To promote endothelial cell growth across the entirety of the device channel, devices were inverted in culture 24 h after seeding. At 72 h devices were fixed and stained for DAPI (cell nuclei), and Phalloidin Texas Red (actin), and preserved in fluoromount for imaging. 20× images of top and bottom of flow channels within devices show confluent growth of HUVECs in outlined areas. Representative image showing endothelialization of device flow channel "bend." 10× tiled image demonstrates extent of endothelialization within a large area of the channel.

In future experiments, T-cells and CAR-T cells will be flowed through these endothelial cell-lined channels, to observe T-cell targeting of GBM cells and to determine how GBM evade T cell detection using imaging cytometry on collected T-cells. As immunotherapy approaches have not yet proven effective in treating GBM, the present invention will result in better targeting of GBM cells by T-cell therapies.

Example 2

CARTiFlo Functionality

Device Fabrication, design, and cell culture are shown in FIGS. 4A to 4C. For device fabrication, the microfluidic device consists of one a flow channel with an inlet and an outlet for sample loading. The flow channel has a length of 7 cm and a width of 1000 µm, and connects six, 5 mm-diameter reservoirs for loading tumor tissue biopsies or tumor spheroids in 3D hydrogels. The channel and reservoirs are separated by a semi-permeable interface made up of 22 trapezoidal barrier posts that are 100 µm in width, 150 µm/50 µm in length of the longest/shorted bases and separated by 7 µm gaps. The entire microfluidic chamber has a uniform height of 50 µm. The microfluidic devices are made of polydimethylsiloxane (PDMS) using standard soft lithography techniques using an SU8-2025 master mold patterned on a silicon wafer. Briefly, The PDMS elastomer base and curing agent were mixed with a ratio and 10:1, poured over the master mold, and then incubated in the oven at 80° C. for 2 hours. The PDMS devices are carefully peeled off the master mold after curing and pretreated with plasma cleaner before bonding with glass. Prior to cell culture, the device reservoirs were coated with 100 µg/mL poly-d-lysine (PDL) for an hour and rinsed with three changes of sterile DI H$_2$O. This was followed by baking at 80° C. in the oven for 48 hours to return hydrophobicity to the device and to increase the contact angle in the reservoirs to prevent leakage of the gel into the channel.

Tumor spheroid seeding is shown in FIGS. 5A to 5D. Dimensionally-uniform 100 µm patient-derived, Glioblastoma (N08) spheroids were formed in ultra-low attachment 96-well round-bottom plates (Corning) by seeding 500 GBM cells in each well and collecting them after 4 days of culture in vitro at 37° C., 5% CO$_2$, and 99% relative humidity. Each spheroid was encapsulated in 50 µL of hydrogel pre-mixture and added to the PDL-coated and baked reservoirs. The hydrogel pre-mix containing spheroids in reservoirs were photo crosslinked to form a hydrogel by exposure to UV light at 365 nm for 30-60 seconds. The hydrogels were rinsed twice with sterile HBSS and topped off with an equal volume of fresh glioblastoma cell culture media. Media was changed daily for the duration of the experiment.

Blood-tumor-barrier Establishment and Validation are shown in FIGS. 6A to 6F. For endothelialization, after hydrogel encapsulating spheroids in the reservoirs, the flow-channel was coated with 100 µg/mL collagen I (Vitrocol) and incubated in 37° C. for 2 hours. Any unpolymerized collagen I or residue was rinsed off with 1× sterile PBS and preconditioned with endothelial growth medium-2 (EGM-2) (Lonza). Human umbilical vascular endothelial cells (HUVECs; passage 3-6) were harvested with 0.05% trypsin and resuspended to a concentration of 1.0×107 cells/mL in fresh EGM-2 medium. A 10 uL volume of the cell suspension was introduced to the channel through the inlet and outlet. The devices were subsequently flipped 90 degrees every 5 minutes to ensure proper cell adherence on all channel surfaces. The inlet and outlet were filled with EGM-2 media and incubated at 37° C. and 5% CO2 over 48 hours with daily media changes in order to form a stable HUVEC monolayer.

Quantification. Endothelialization of the channel was validated 48 hours post-seeding by fixing and staining device channels with Phalloidin Texas Red (Invitrogen), an f-actin marker. Maximum intensity projections derived from 10× Z-stacks from each 15 specified locations were obtained with an inverted confocal microscope (Zeiss LSM 710). Endothelialization quantification was automated through MATLAB code that thresholds, binarizes, and calculates phalloidin-stained area over total image area. Endothelialization exceeding 65% was considered as indicative of a stable monolayer.

BTB Functionality. Blood-tumor barrier (BTB) functionality was assessed with a dextran permeability assay using 10 kDa FITC-dextran (Invitrogen) and 70 kDa TRITC-dextran (Invitrogen) four days after stable monolayer formation (6 days post-seeding). The dextrans were infused into the device at 1 µL/min at a concentration of 25 ug/mL in EGM-2 medium using a syringe pump (KD Scientific). The fluorescence intensities were recorded every minute over 4 hours using a live cell imaging platform focused at the channel/reservoir interface. Using the formulas shown below, permeability coefficients were calculated from the slope of fluorescence intensity plotted as a function of time. Endpoint staining with CD31 (endothelial cell marker) was performed to volumetrically (Imaris) correlate the degree of tube formation with dextran permeability.

$$\text{Permeability Coefficient} = P_D(um/\min) = \frac{A_{gel}}{w_{Monolayer}} \times \frac{\frac{dI}{dt_{gel}}}{(I_{lumen})_{t=0}}$$

$$\text{Area correction factor:} \frac{A_{gel}}{w_{Monolayer}} = \frac{158\mu m \times 250\mu m}{50\mu m} = 790\mu m$$

$$\text{Concentration Gradient:} \frac{dI}{dt} =$$

slope of fluorescence intensity over time in hydrogel ($I/\min$)

Change in dextran concentration over the endothelium=I_lumen=Average fluorescence intensity in endothelial space t"="0 (I) (time when dextran is introduced to channel).

Figure 7B:
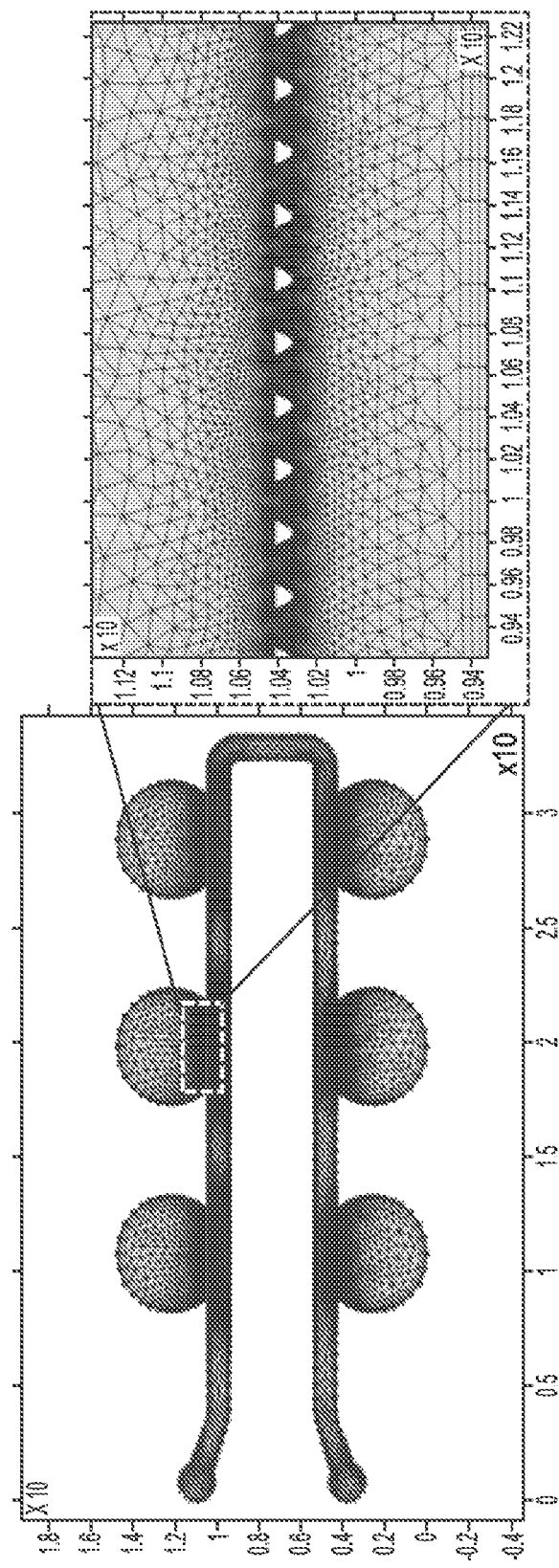
Figure 7B:
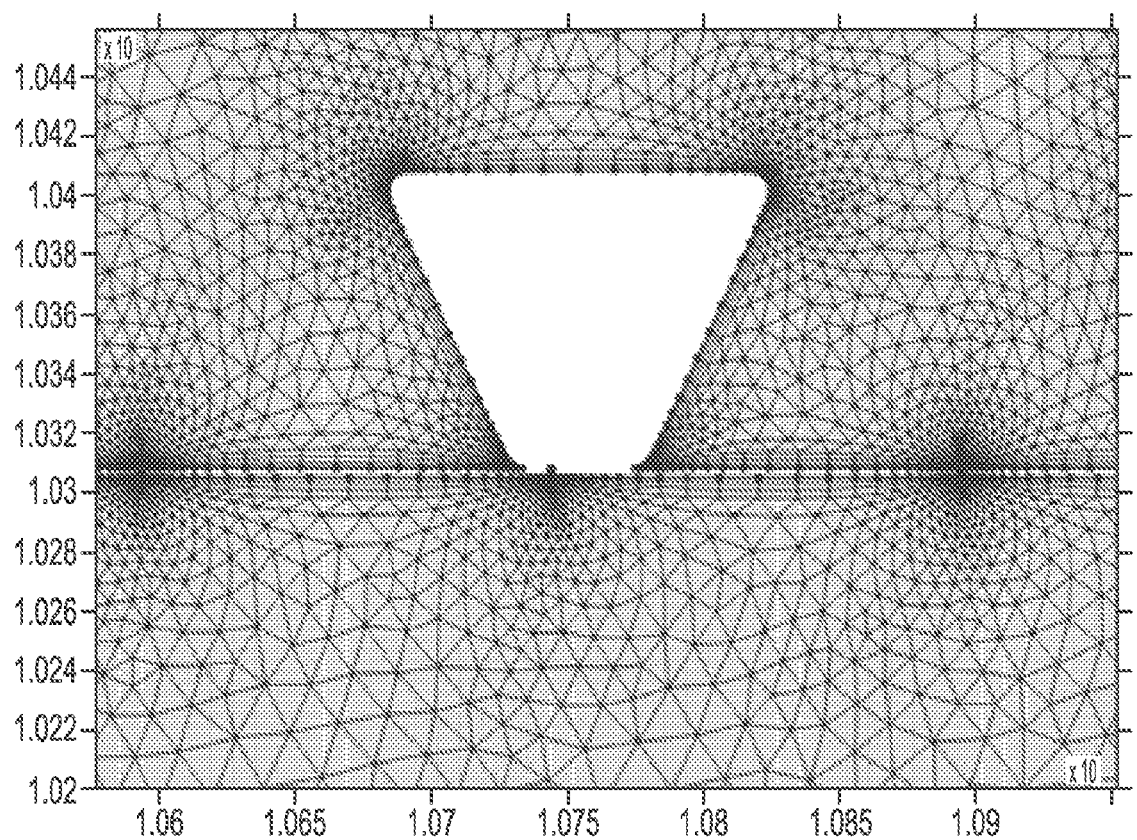
Figure 7B:
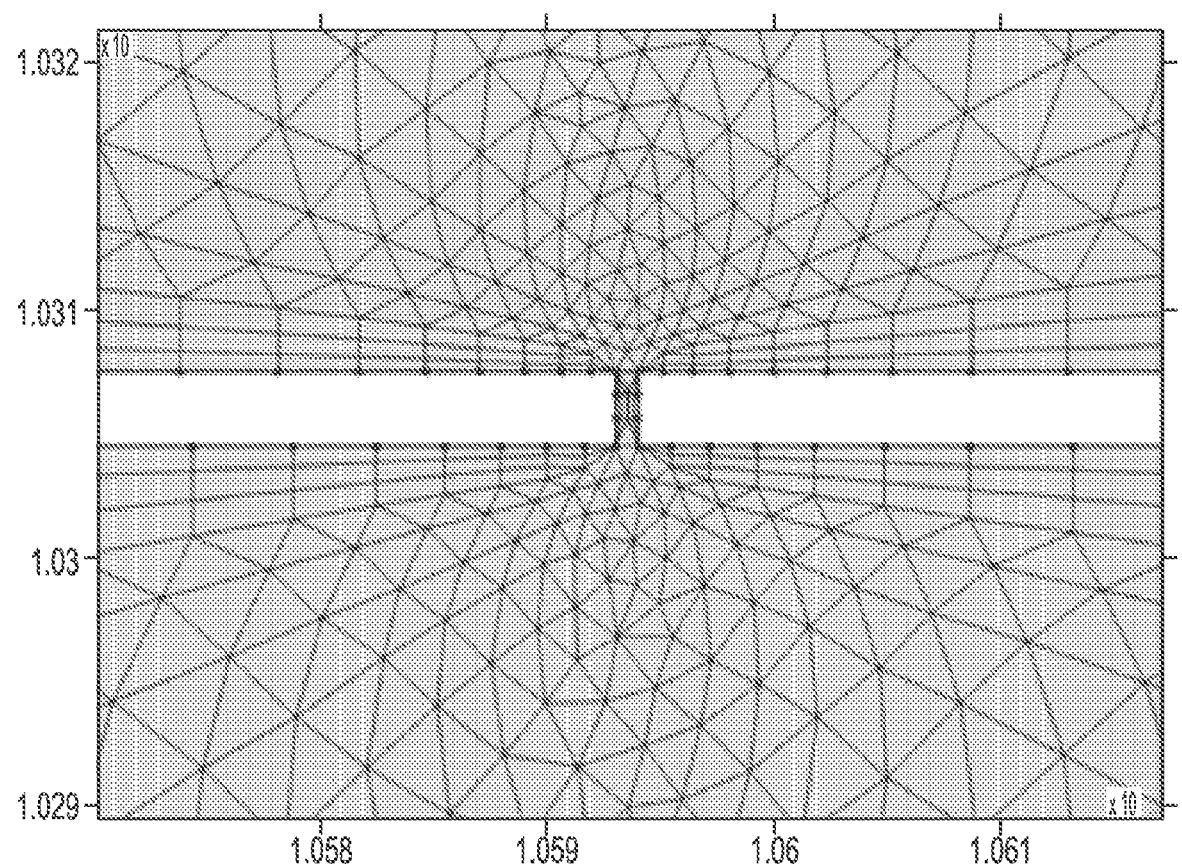
Figure 7C:
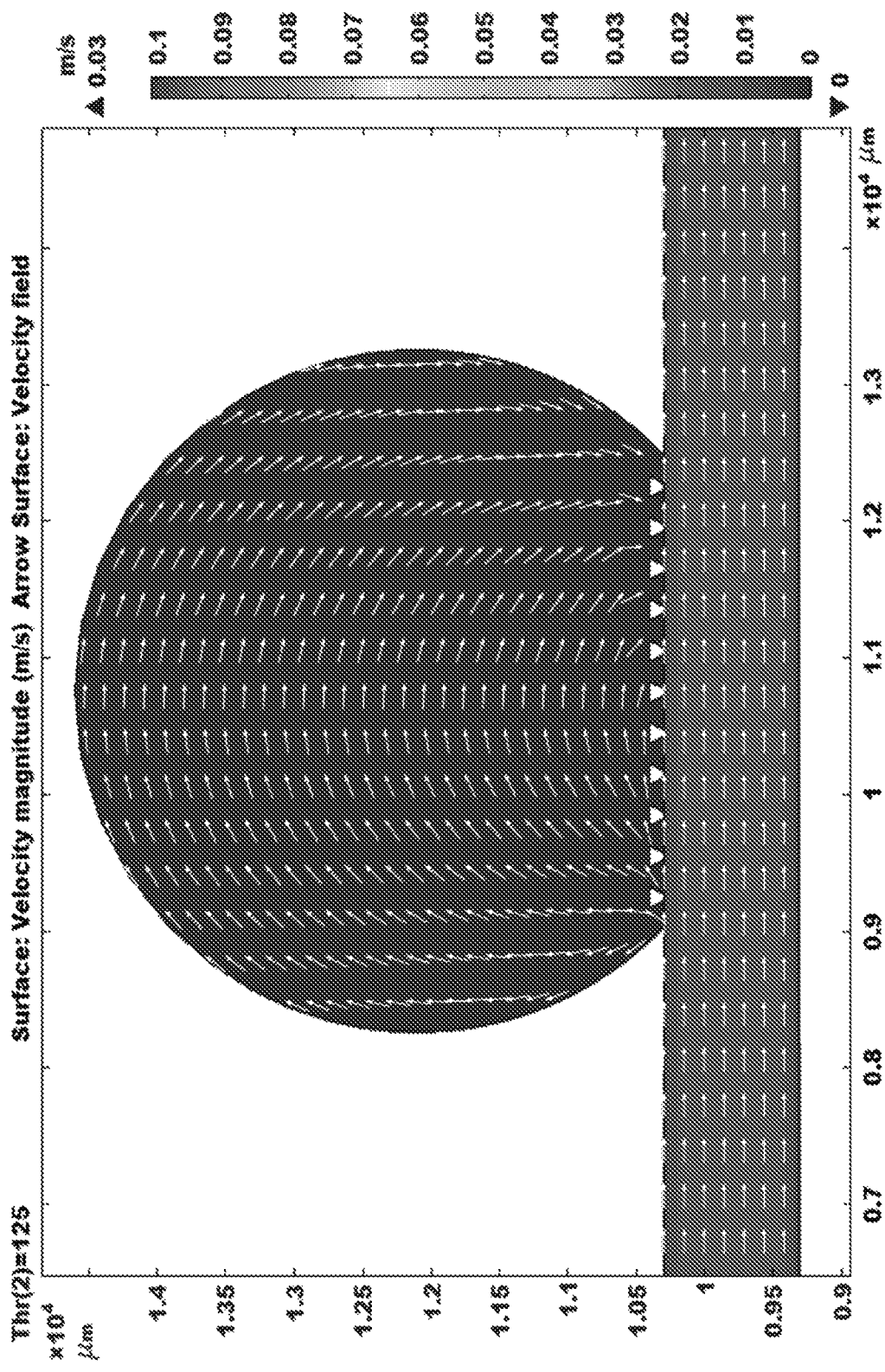
Figure 7C:
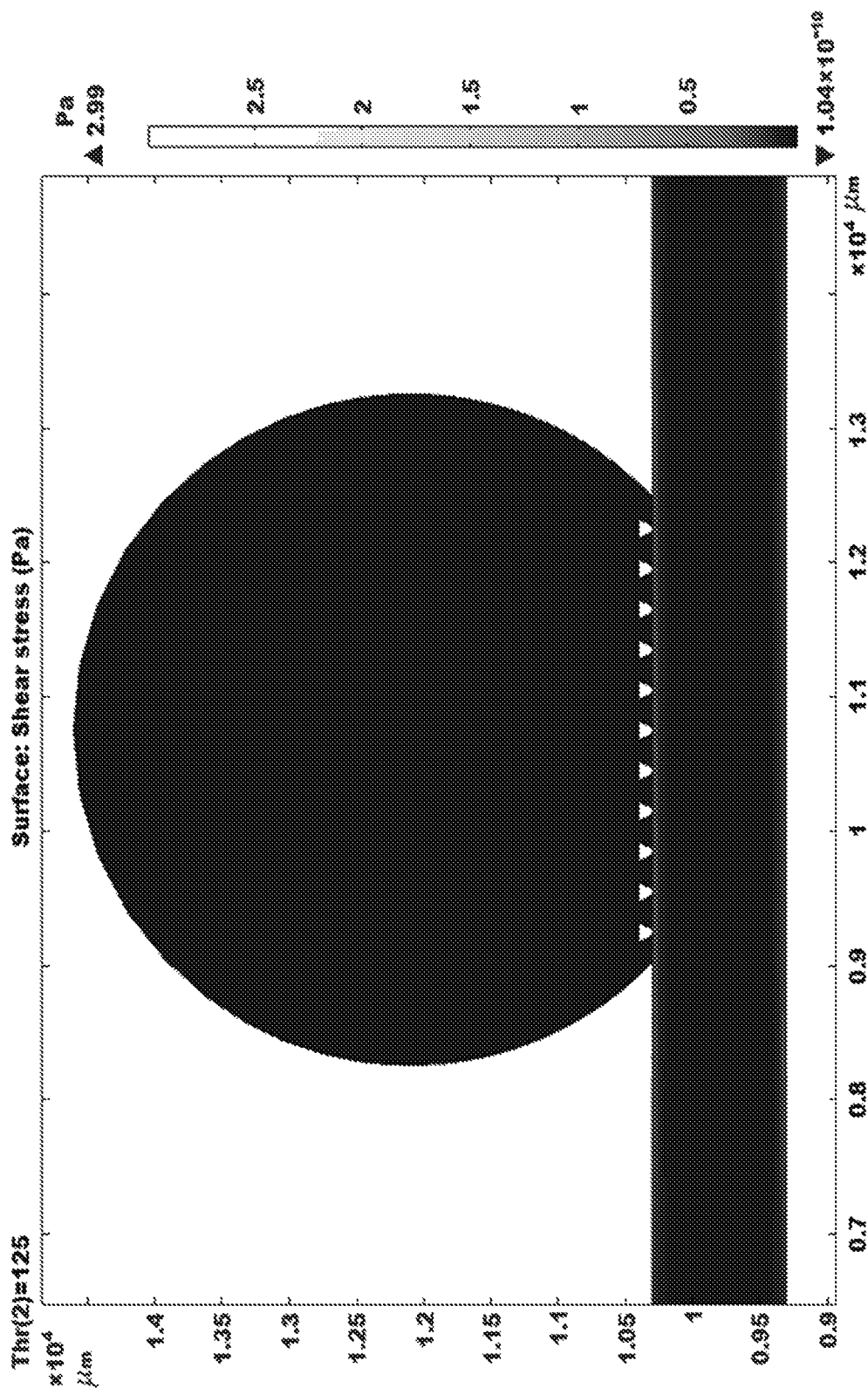
Figure 7C:
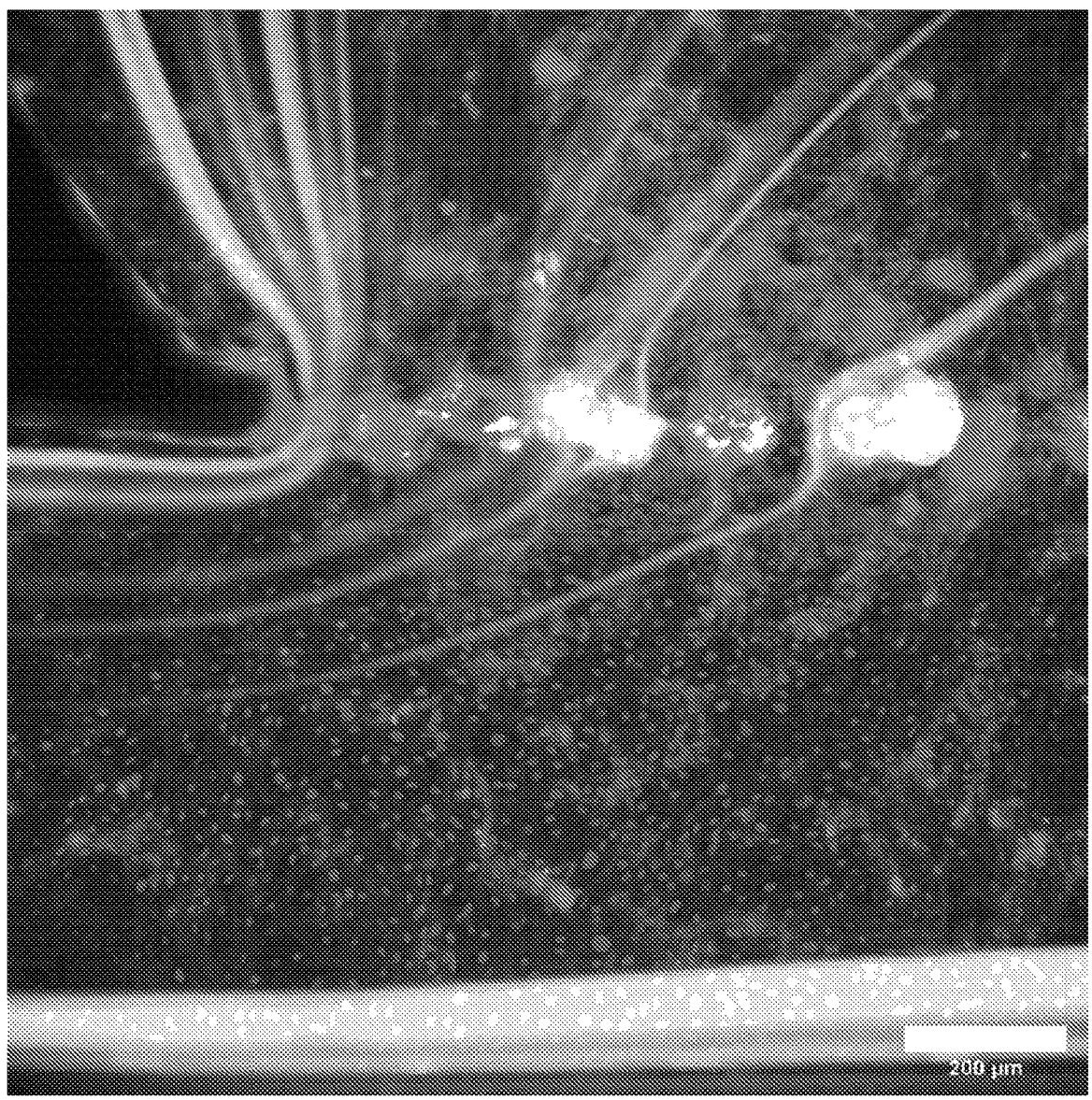

FIGS. 7A to 7C show finite element modeling of fluid flow. Three-dimensional finite element modeling was used to predict the effect of flow rate on cell stability and targeting throughout the device using COMSOL Multiphysics. The minimum mesh size of the device was 0.1 µm. The parameters used to create the mesh were based on the device dimensions, hydrogel porosity, HUVEC elastic modulus, and media density/viscosity and are shown in Table 1. The flow rates which induced shear stresses of at least 15 dyn/cm$^2$ were used for empirical testing, as this is found to be ideal to prevent HUVEC delamination and aid stable monolayer maintenance. Velocity profiles were used to assess the relative spatial effects of flow in perfusing through the gel and reaching the tumor spheroids.

TABLE 1

| Parameters | |
| --- | --- |
| Parameters | Value |
| 3% methacrylated chondroitin sulfate Gel in reservoirs | Porosity-40 um<br>Elastic Modulus (Stiffness)-100 Pa<br>Density-1.12 g/mL<br>Geometry-diameter: 4 mm; height: 150 um |
| PDMS | Elastic Modulus (Stiffness)-3 MPa<br>Density-965 kg/m$^3$<br>Poisson's Ratio (stretch)-0.5<br>Geometry-width: 1000 um; Height: 150 um |

TABLE 1-continued

| Parameters | Value |
| --- | --- |
| HUVEC Layer | Elastic Modulus (stiffness)-~15 kPa |
|  | Cell Thickness-~9.5 um |
|  | Poisson's Ratio-0.25 |
|  | Assume no pores |
| EGM-2 Media | Viscosity-0.0075 dyn/cm$^2$ |
|  | Density-1.0 g/ml |

Figure 8A:
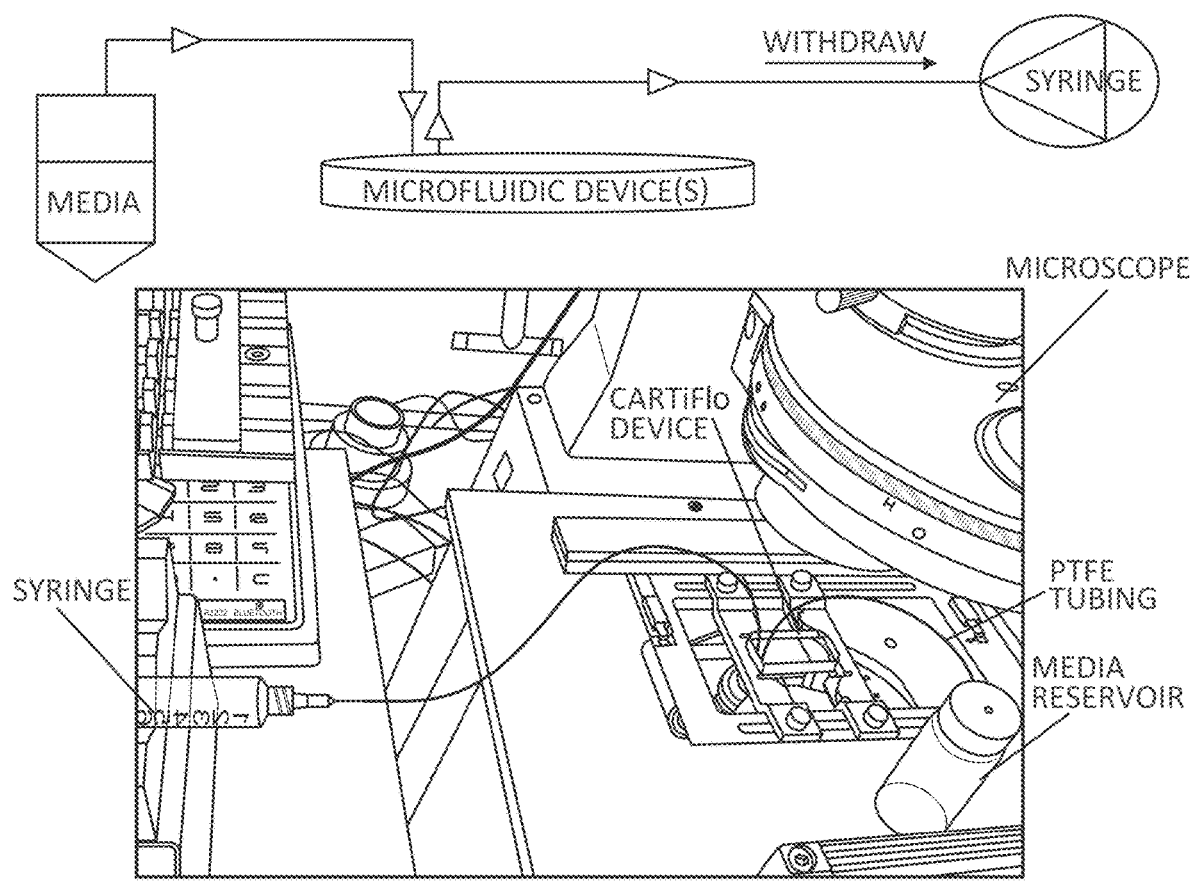
FIGS. 8A and 8B. Flow set up.
Figure 8B:
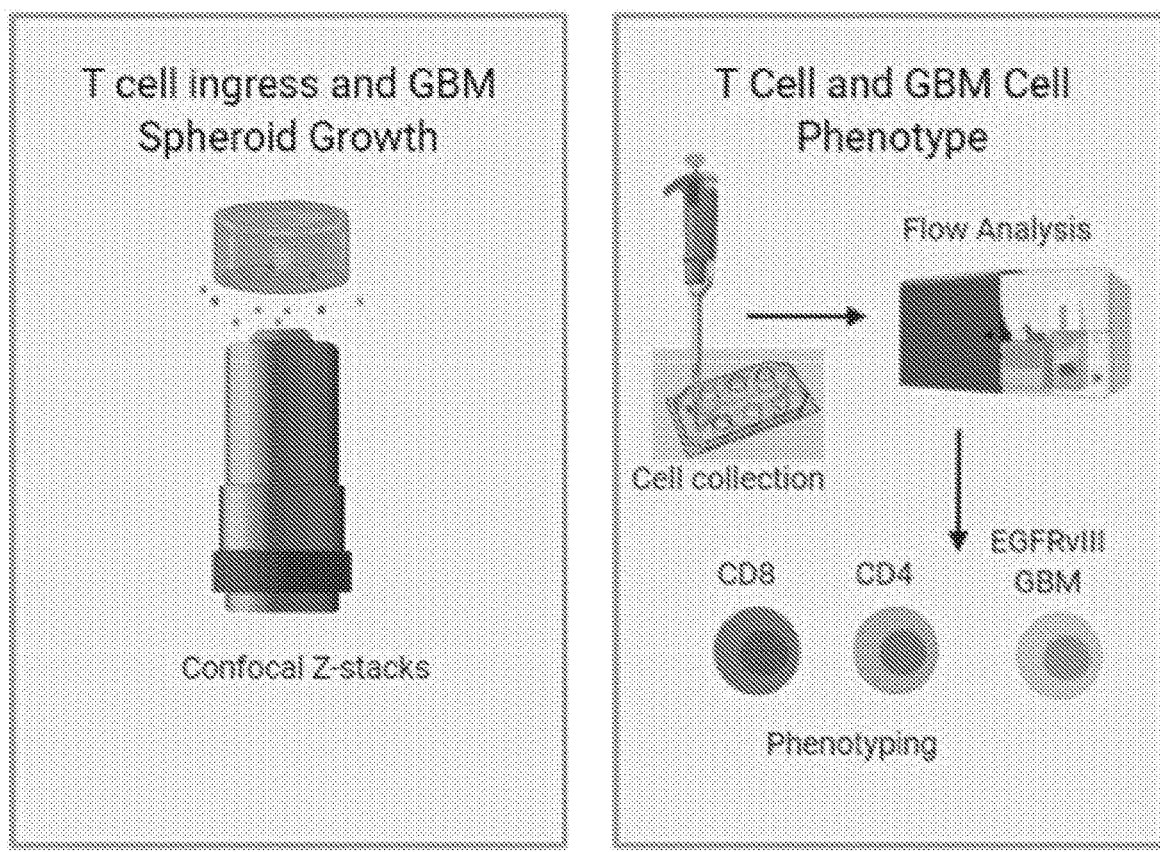

FIGS. 8A and 8B show flow setup. A continuous flow of aerated EGM-2 media containing cells and/or pharmacological agents can be facilitated using both an open- or closed-loop flow setup. This was established using 1 mm (outer diameter) PTFE tubing that connected a media reservoir to inlets of devices placed at the same level as the media reservoir, device outlets were connected to a 23 gauge needle affixed onto a 60 mL syringe. The syringe was positioned on a syringe pump (KD Scientific) that was set to withdraw media at flow rates of interest (50 µl/min or 125 µl/min) with 100% force. Since the HUVEC monolayer is stable for a period of 7 days in vitro (DIV), a time course of 7 days can be used for assessing therapeutic cell or drug potency assays.

Example 3

Figure 9A:
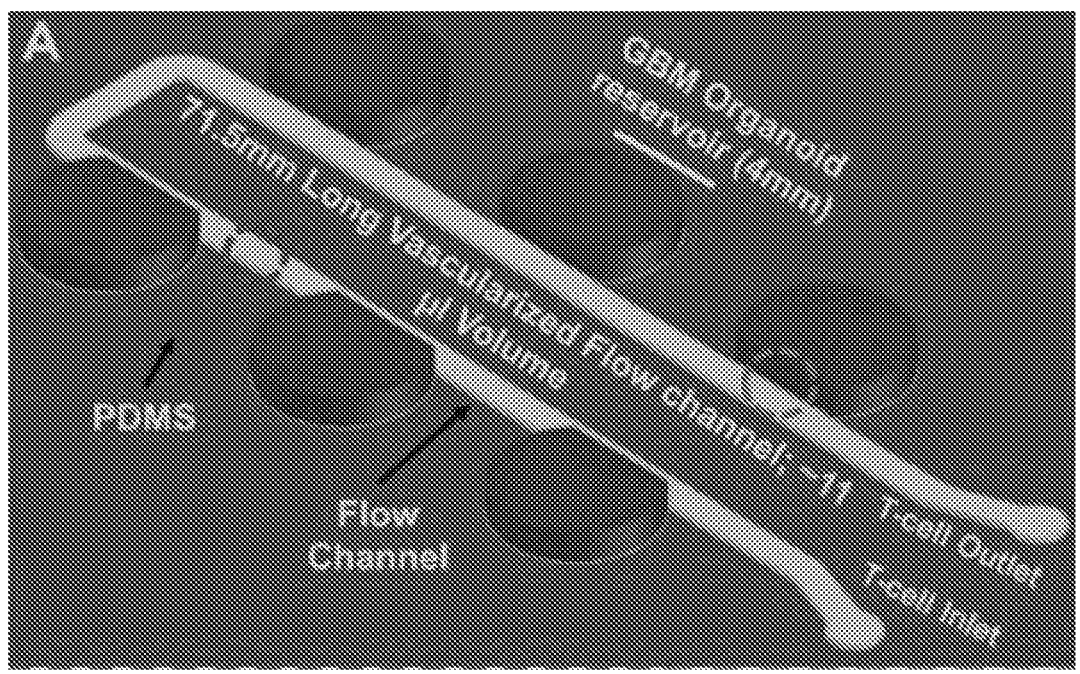
FIGS. 9A to 9C. CARTiFlo design attributes.
Figure 9B:
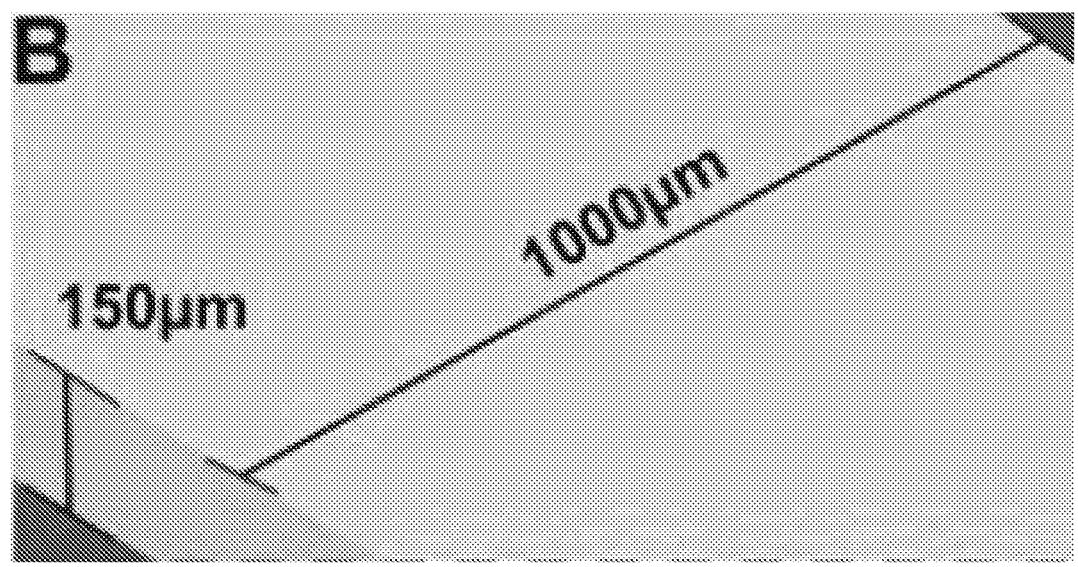
Figure 9C:
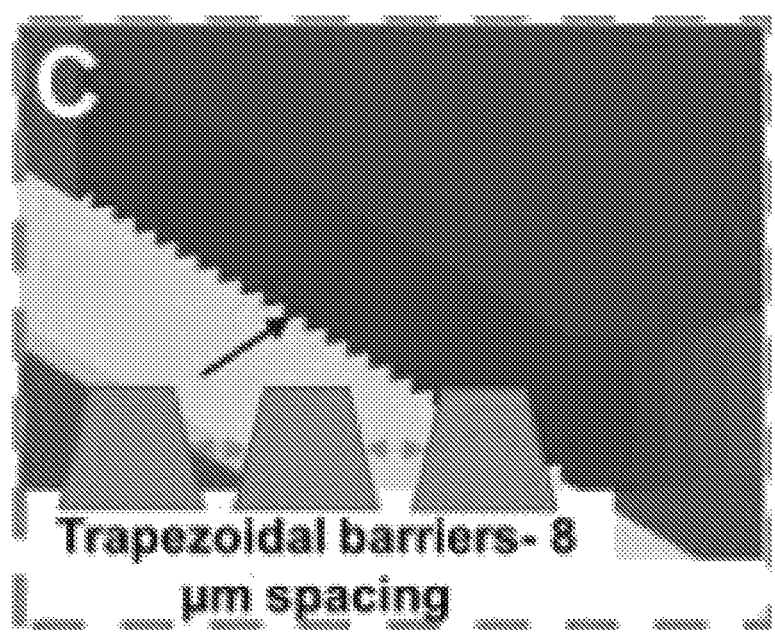

CARTiFlo—A Vascularized Flow-Based Microfluidic Platform to Investigate Tumor Microenvironment Induced Adaptive Changes in Glioblastoma This example fabricates and utilizes CARTiFlo, a novel vascularized flow-based microfluidic platform, to investigate T cell induced adaptive changes in patient-derived GBM organoids. This example will validate the functionality of this platform technology, and investigate the spatiotemporal dynamics of T cell induced immunosuppressive mechanisms and other adaptive changes in 3D extracellular matrix (ECM) encapsulated patient derived GBM organoids in the following three specific aims:

The fabrication of the CARTiFlo microfluidic device and the characterization of fluid flow-induced shear stress on the channel walls of the rectangular flow channel are shown in FIGS. 9A to 9C. COMSOL-based computational fluid dynamics simulations will be used in combination with experimental validation of different physiologically relevant flow rates.

Adaptive changes in patient derived GBM organoids cultured in tolerogenic 3D microenvironments will be characterized. Twenty primary human GBM biopsies will be characterized, as well as molecularly characterized GBM cells established in culture from neurosurgical human GBM resections. GBM organoid cultures will be established in tolerogenic sulfated chondroitin sulfate glycosaminoglycan (CS-GAG) and invasion dynamics and activation of immunosuppressive mechanisms to compared to organoids in unsulfated hyaluronic acid (HA) and bio-inert poly-ethylene glycol (PEG) matrix controls.

T-cell exposure induced activation of immunosuppression by GBM organoids will be investigated. 3D matrix encapsulated temozolomide (TMZ) resistant GBM organoids will be co-cultured, followed by T-cell flow after flow-channel endothelialization and culture over a period of 7 days in vitro. Phenotypic, apoptosis, proliferation and energy metabolism changes will be evaluated in naive and activated human T-cells and in CD133 and PD-L1 targeting CAR-T cells (ProMab, Inc.), as well exposure dependent adaptive changes of cell surface markers in 3D matrix encapsulated patient-derived GBM organoids using imaging cytometry and other molecular assessments.

This approach is novel because it bridges a fundamental gap in understanding the important mechanisms by which brain tumor cells spread and mediate immunosuppression. This approach can be extended to investigating similar adaptive resistance mechanisms in other solid tumors.

The GBM tumor microenvironment (TME) is complex and presents many obstacles to the successful translation of cellular immunotherapies. Chief among these are adaptive changes such as acquired resistance mechanisms (Uyttenhove et al., 2003, Nat Med; 9:1269-1274; Parsa et al., 2007, Nat Med; 13:84-88; and Liu et al., 2006, Mol Cancer; 5:67), antigen loss (O'Rourke et al., 2017, Sci Transl Med; 9(399): pii:eaaa0984; Parsa et al., 2007, Nat Med; 13:84-88; and Chowell et al., 2018, Science; 359:582-587), aberrant tumor ECM glycan expression and signaling (Chou et al., 2018, BMC Cancer; 18(1):105; Jaime-Ramirez et al., 2017, J Gene Med; 19(3); Kobayashi et al., 2013, PLoS One; 8:e54278; and Pellegatta et al., 2018, Sci Transl Med; 10(430): pii:eaao2731), and prevalence of a host of other cell-surface and secreted immunosuppressive molecules that GBM uses to avoid immune recognition (Nduom et al., 2015, Neuro Oncol; 17 Suppl 7:vii9-vii14). A better understanding of these mechanisms can lead to more targeted therapies for GBM.

Figure 10A:
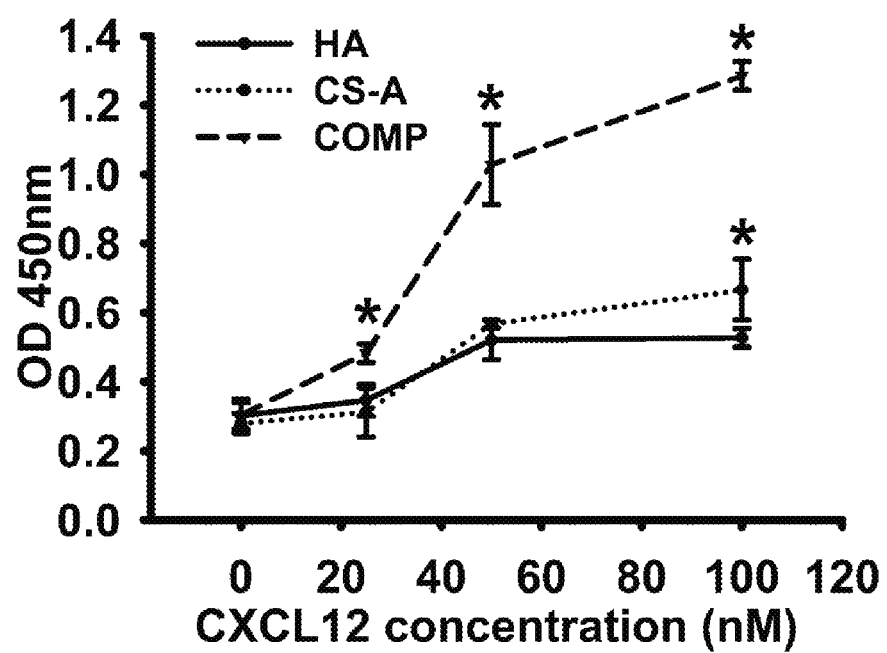
FIGS. 10A to 10F. Oversulfated tumor ECM mimicking CS-E matrices enhance CXCL12 binding and induce enhanced GBM cell invasion in glioma-on-chip assays.
Figure 10B:
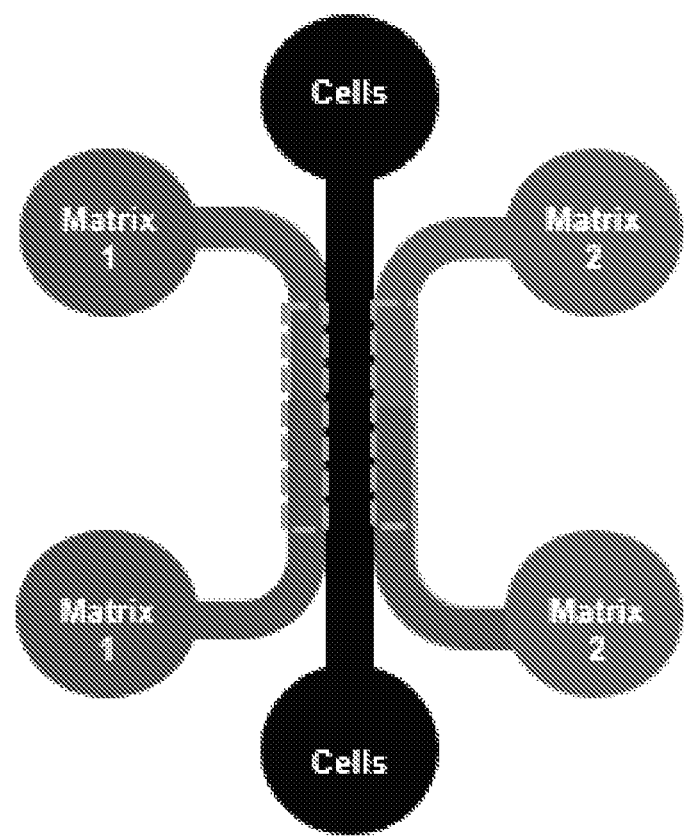
Figure 10C:
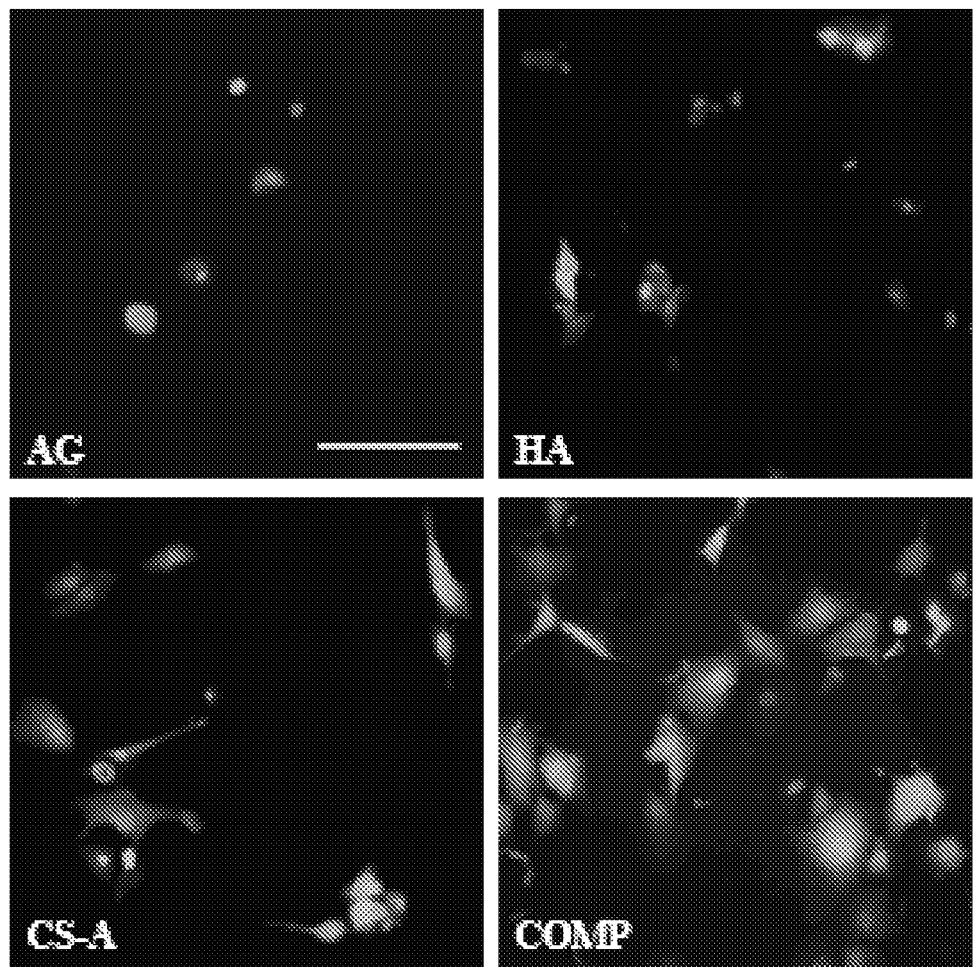
Figure 10D:
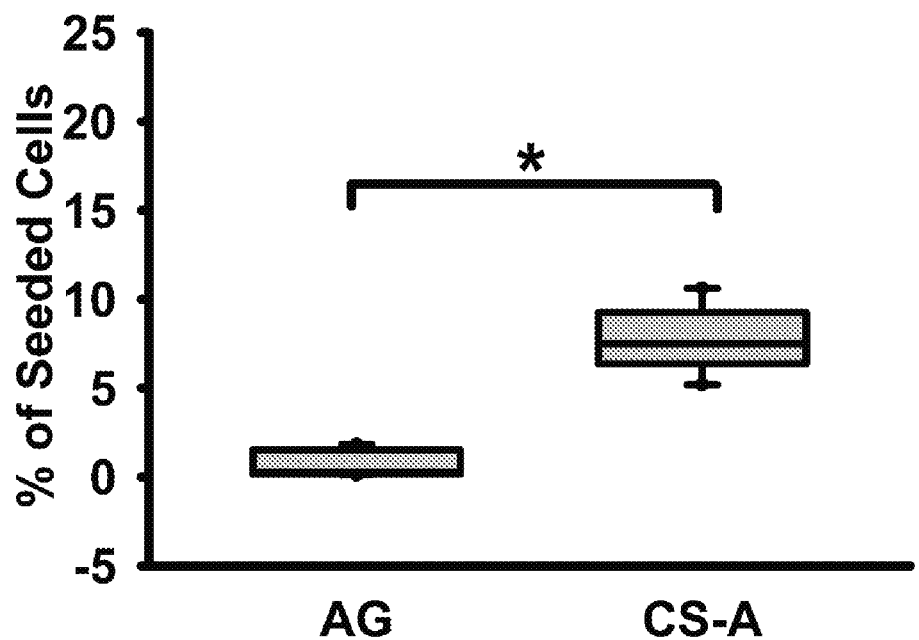
Figure 10E:
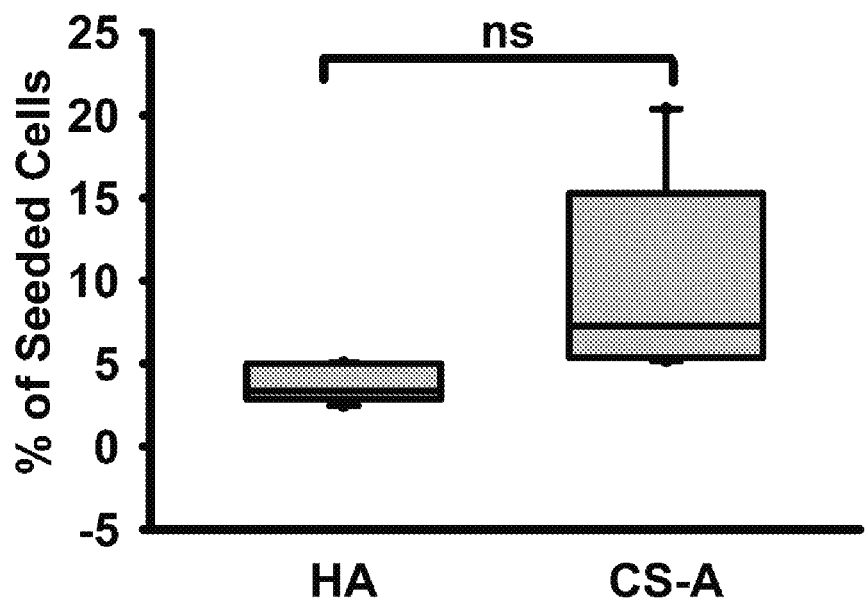
Figure 10F:
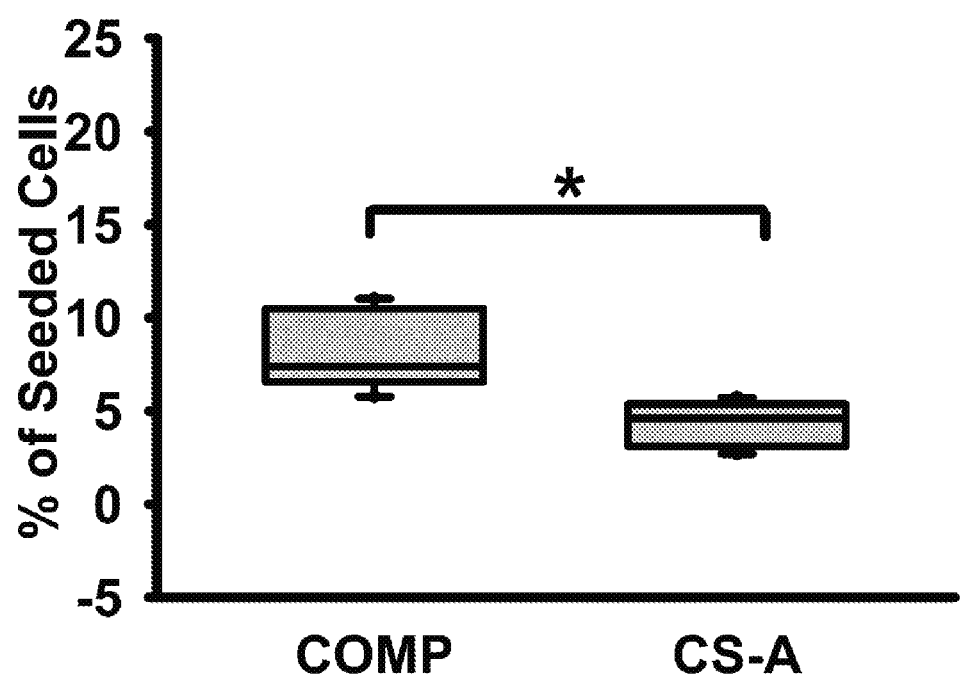

Suppression of T cell function is an important GBM adaptation. The direct immunosuppression of effector T-cells by GBM is broadly attributed to the enhanced expression of transcription factors and secreted factors that help create a tolerogenic microenvironment (Nduom et al., 2015, Neuro Oncol; 17 Suppl 7:vii9-vii14; Abou-Ghazal et al., 2008, Clin Cancer Res; 14:8228-8235; Crane et al., 2012, Neuro Oncol; 14:584-595; Fontana et al., 1984, J Immunol; 132:1837-1844; Frei et al., 2015, Oncotarget 6(8):5963-5977; Hishii et al., 1995, Neurosurgery; 37:1160-6; discussion 1166-7; Kuppner et al., 1990, J Neurosurg; 72:619-625; Nitta et al., 1994, Brain Res; 649: 122-128; Wrann et al., 1987, EMBO 6:1633-1636; and Yan et al., 2015, J Natl Cancer Inst; 107(8):djv137). It has been previously demonstrated that selectively upregulated glycans in the GBM ECM can enhance soluble factor binding (FIG. 10A) (International Application WO 2018/026784 (PCT/US2017/044845); Karumbaiah et al., 2015, Bioconjug Chem; 26:2336-2349; and Logun et al., 2016, J Mater Chem B; 4(36):6052-6064). In addition to secreted factors, the upregulation of CD95 and PD-L1 on the GBM cell surface is reported to inhibit T-cell activation and infiltration and induce T cell apoptosis (Weller et al., 1997, Cell Physiol Biochem; 7:282-288; Dong et al., 2002, Nat Med; 8:793-800; and Wintterle et al., 2003, Cancer Res; 63:7462-7467). The immunosuppressive response activated by GBM is mediated by expression of galectins and activation of mechanisms that impair T-cell metabolism (Le Mercier et al., 2010, Brain Pathol; 20:17-27; Patsoukis et al., 2015, Nat Commun; 6:6692; and Swamy et al., 2016, Nat Immunol; 17:712-720). Despite this evidence, the temporal effects of prolonged T-cell exposure on the induction of specific GBM adaptive changes responsible for T-cell immunosuppression have not been studied. This example will provide a closer investigation of spatiotemporal dynamics of T cell induced adaptive changes in GBM, assisting in the development of targeted therapies that will enhance the efficacy of cytotoxic drugs and immunotherapies against GBM.

Glycan composition changes and signaling in the tumor ECM augment GBM invasion. Tumor- and immune-cell specific alterations in glycan presentation and signaling have been implicated in the induction of immunosuppression in other solid tumors (Rodriguez et al., 2018, *Nat Rev Immunol;* 18:204-211; Kobayashi et al., 2013, *PLoS One;* 8:e54278; Pellegatta et al., 2018, *Sci Transl Med;* 10(430): pii:eaao2731; Birks et al., 2011, *Neuro Oncol;* 13:950-960; Roth et al., 2007, *Cancer Res;* 67:3540-3544; Shen et al., 2016, *Tumour Biol;* 37:4909-4918; Viapiano et al., 2005, *Cancer Res;* 65:6726-6733; Yeh et al., 2016, *Proc Natl Acad Sci USA;* 113:5592-5597; and Van Woensel et al., 2017, *Sci Rep;* 7:1217). Chondroitin sulfate proteoglycans (CSPGs) demonstrated that oversulfated CS-E matrices significantly enhanced binding of the chemotactic agent CXCL12 and GBM cell invasion when compared to other mono- and unsulfated GAGs32 (FIGS. 10A to 10F). The contextual and compositional relevance of oversulfated CS in regulating the maintenance and proliferation of resistant GBM stem cells (GSCs), and in promoting GBM progression has not been elucidated. The ability to engineer oversulfated such as the brain tumor specific CSPG4 (also called NG2) and their associated sulfated CS-GAGs are selectively upregulated in human GBM ECM and are prognostic indicators of enhanced invasiveness and poor survival (Jaime-Ramirez et al., 2017, *J Gene Med;* 19(3); Kobayashi et al., 2013, *PLoS One;* 8:e54278; Pellegatta et al., 2018, *Sci Transl Med;* 10(430): pii:eaao2731; Viapiano et al., 2005, *Cancer Res;* 65:6726-6733; Reinhard et al., 2016, *Int J Biochem Cell Biol;* 81:174-183; Sim et al., 2009, *J Biol Chem;* 284:26547-26556; Chekenya et al., 1999, *Int J Dev Neurosci;* 17:421-435; Goldbrunner et al., 1999, *Acta Neurochir (Wien);* 141, 295-305; discussion 304-295; and Svendsen et al., 2011, *Acta Neuropathol;* 122:495-510). However, little is known about the sulfated GAG composition of these and other GBM associated CSPGs. Using glioma-on-chip microfluidic devices, CS matrices that include tumor ECM specific sulfation patterns and facilitate their presentation in CARTiFlo devices make an ideal platform in which to investigate GSC maintenance and invasion dynamics.

Figure 11A:
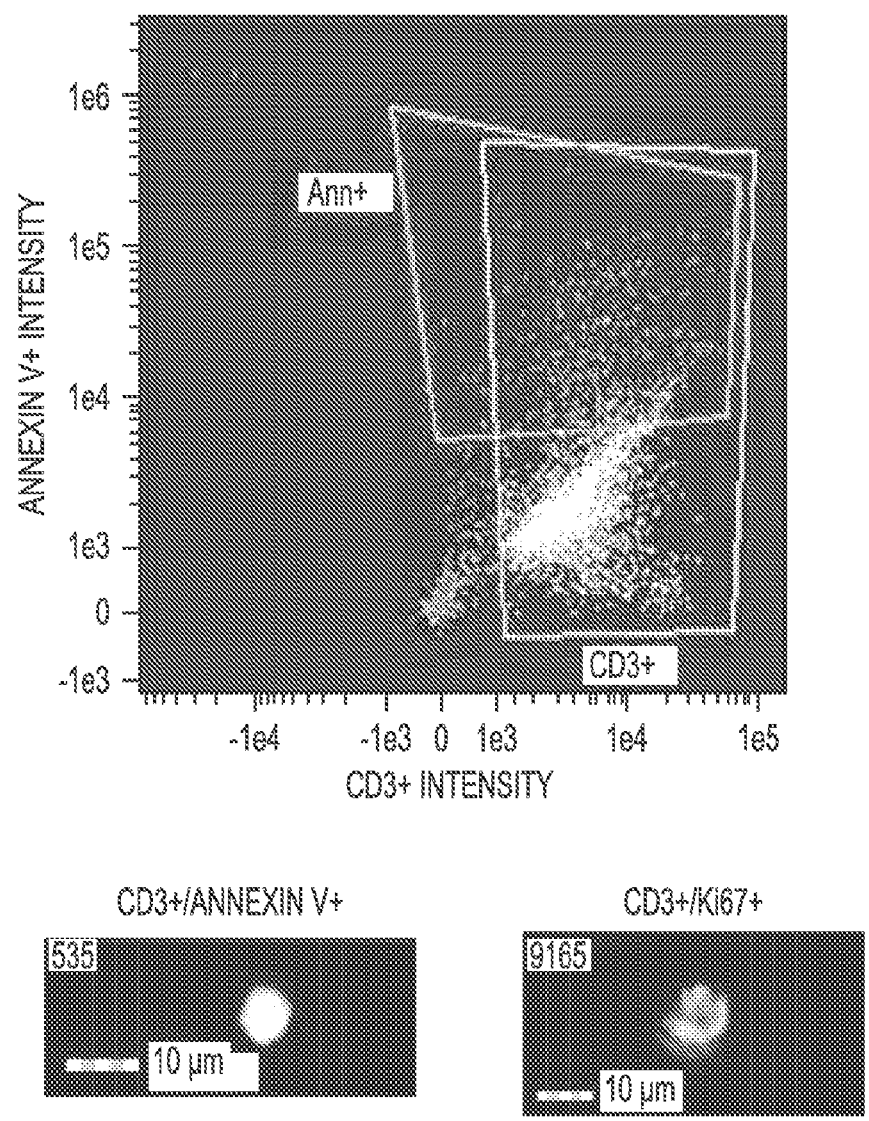
FIGS. 11A to 11C. Imaging cytometry reveals the reduced proliferation and enhanced apoptosis of activated T-cells co-cultured with patient-derived GSCs.
Figure 11B:
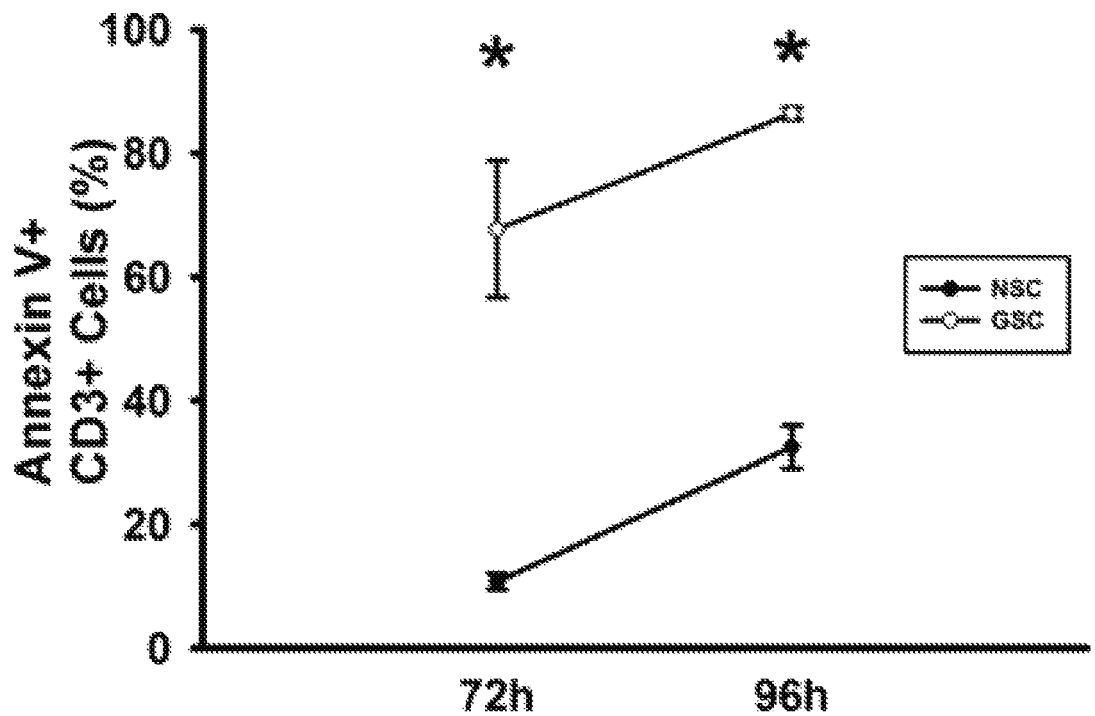
Figure 11C:
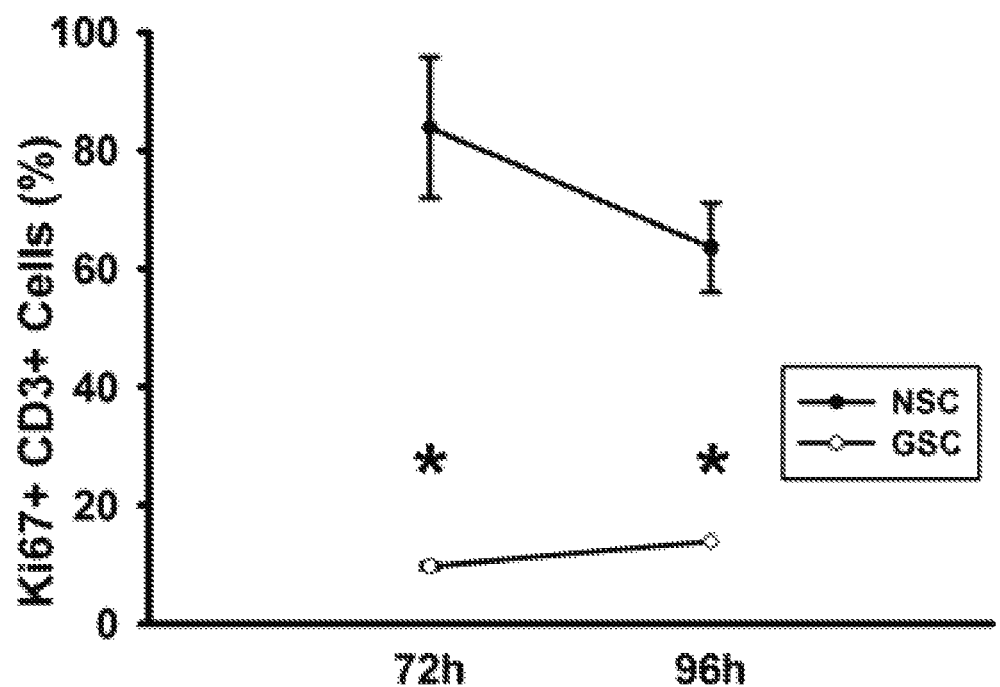

This approach is based on evidence suggesting:

(a) GSCs are key contributors to GBM invasion and adaptive resistance (Nduom et al., 2015, *Neuro Oncol;* 17 Suppl 7:vii9-vii14; Eramo et al., 2006, *Cell Death Differ;* 13:1238-1241; and Nduom et al., 2012, *Cancer J;* 18:100-106);

(b) GBM associated glycan signaling alterations contribute to T-cell apoptosis and immunosuppression (Chou et al., 2018, *BMC Cancer;* 18(1):105; Le Mercier et al., 2010, *Brain Pathol;* 20:17-27; and Perillo et al., 1995, *Nature;* 378:736-739) (FIGS. 11A to 11C); and (c) CS sulfotransferases that catalyze the sulfation of monosulfated CS-A to oversulfated CS-E are upregulated around human GBM19.

This example will take advantage of several innovative capabilities such as the ability to: 1) investigate T-cell interaction dependent changes in patient-derived GBM organoids in the novel CARTiFlo platform; 2) modulate CS-GAG sulfation to enhance enrichment of soluble tumorigenic factors and fabricate novel sulfated CS-GAG matrices that structurally and functionally mimic the GBM TME (Karumbaiah et al., 2015, *Bioconjug Chem;* 26:2336-2349; Logun et al., 2016, *J Mater Chem B;* 4:6052-6064; Betancur et al., 2017, *ACS Biomater Sci Eng;* 3:420-430; 3) antagonize CS-GAG interactions with GSCs using targeted small molecule inhibitors; and 4) investigate glycan composition and mechanisms by which GSCs can promote invasion and suppress T-cell efficacy.

Recent studies (Logun et al., 2016, *J Mater Chem B;* 4:6052-6064) have demonstrated that CS-GAG sulfation is a key trigger of glioma cell proliferation, migration, and invasion. The proposed studies extend upon these findings to further investigate 3D microenviroment and T-cell exposure induced adaptive changes in GBM.

Fabricate and Characterize CARTiFlo.

There are no "gold standard" in vitro tests to investigate T-cell potency and GBM mediated immunosuppressive mechanisms. A vascularized flow-based microfluidic device that facilitates realistic interactions of T-cells and therapeutic CAR T-cells with GBM organoids is novel and can accelerate the detection and therapeutic targeting of GBM adaptive mechanisms.

Fabrication of CARTiFlo. The CARTiFlo device depicted in FIG. 9 has a 71.5 mm long vascularized rectangular flow channel that is 1,000 µm wide and 150 µm in height. Along the flow channel there are 6 cylindrical GBM organoid reservoirs that are 4 mm diameter and 150 µm in height. The flow channel and reservoir are separated by trapezoidal barriers with 8 µm spacing. The trapezoidal barriers allow surface-tension assisted filling of cell-laden hydrogels in any one of reservoirs without cross contamination with the flow channel, while permitting continuous flow of T cells in the flow channel. The CARTiFlo devices will be fabricated through standard soft.

Figure 12A:
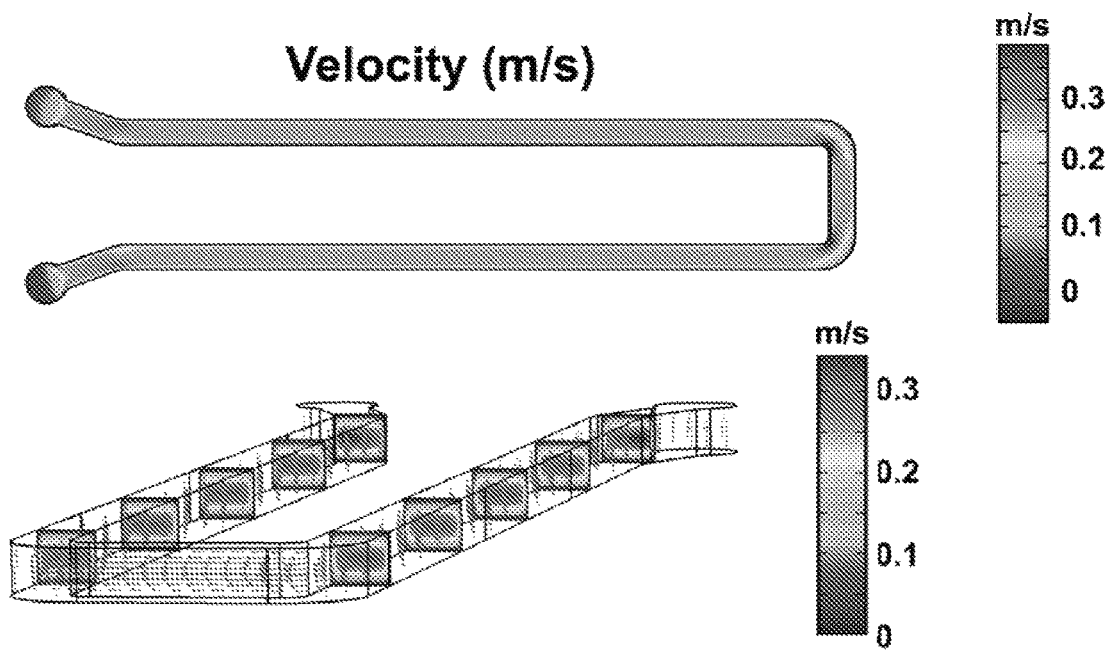
FIGS. 12A to 12C. Preliminary COMSOL simulations of shear stress in rectangular flow channel.
Figure 12B:
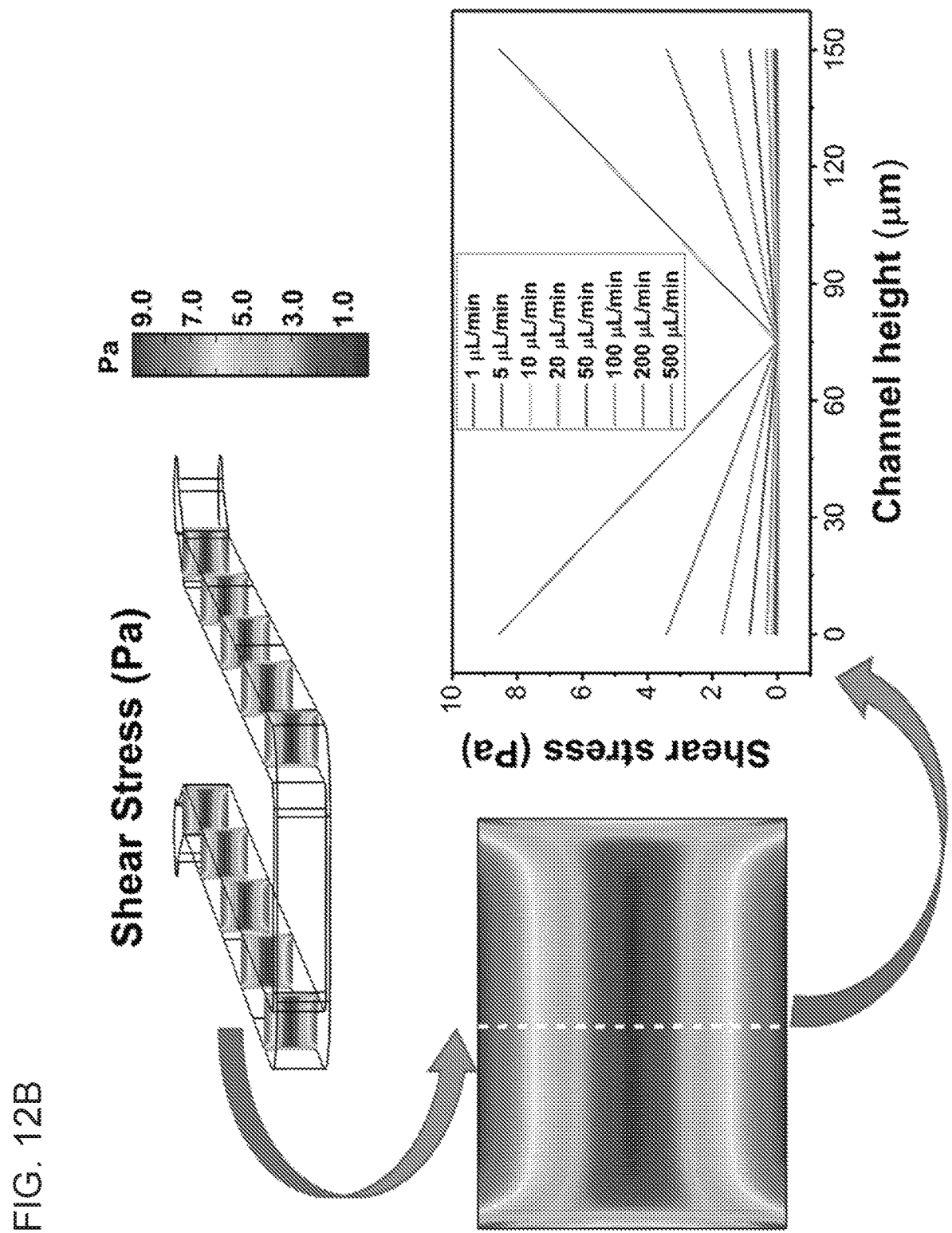
Figure 12C:
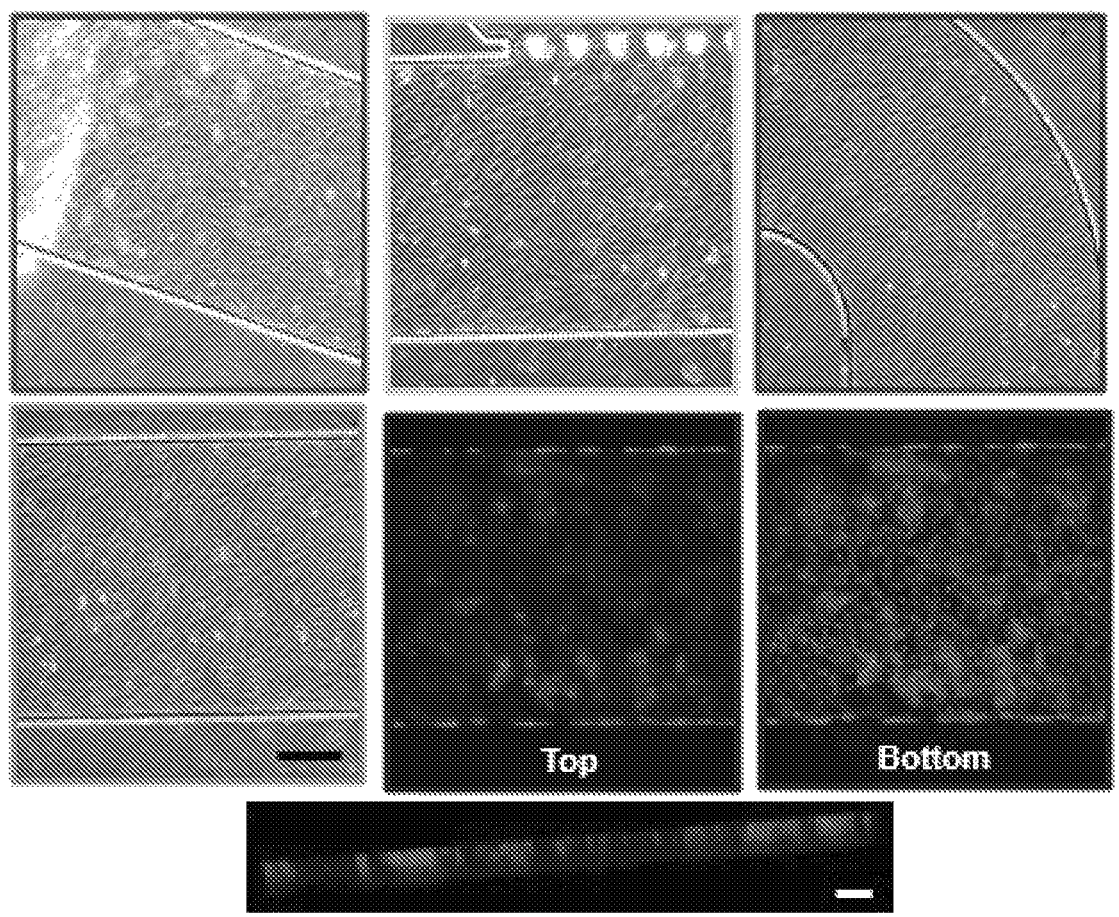

Characterization of velocity and shear stress. Preliminary COMSOL-based computational fluid dynamics characterization of velocity and corresponding shear stress was performed on channel walls and endothelial cells (FIGS. 12A-12C). These preliminary data were simulated under conditions of laminar flow, and using a flow rate of 500 µl/min, which is derived from the physiologically relevant blood flow rate in the brain and around brain tumors (Warmuth et al., 2003, *Radiology;* 228:523-532; and Ivanov et al., 1981, *Microvasc Res;* 22:143-155), and proportionately scaled down to area (FIG. 12A). At the physiologically relevant flow rate of 500 µl/min, the simulated maximum flow speed is ~0.3 m/s, which is in good agreement with reported blood speed in both arteries and veins (Wirtz et al., 2011, *Nat Rev Cancer;* 11:512-522). At this flow rate, the maximum shear stress is ~9 Pa in the flow channel, which is less than reported peak arterial shear stress experienced by cells in normal human vasculature of ~20 Pa57. As a result, 500 µl/min was chosen as a starting point for CARTiFlo studies described in this example, as endothelial cells should be resilient to these stresses during the on-chip residence times. Preliminary results indicated lower shear stress in the channel center with increasing shear stress along the channel top and bottom. The maximum shear stress is experienced at the channel top and bottom wall (FIG. 12B).

Endothelialization of CARTiFlo. Endothelialization and maintenance of the endothelial barrier is critical for the realistic assessment of T cell extravasation into the GBM organoids. In preliminary studies, the GBM cells (primary HUVEC) were filled after collagen I coating. Brightfield assessments of channel endothelialization at 24 h post-seeding indicated good HUVEC coverage that was maintained 72 h post-seeding as indicated by the phalloidin stained cells imaged at the top, bottom and along the channel walls of the CARTiFlo device (FIG. 12C). High cell seeding densities can lead to delamination of the endothelial cell layer due to excessive cell proliferation. Similarly, fluid flow-induced shear stress can also lead to cell layer delamination. This example will investigate the effects of cell seeding density and flow rate on endothelial wall integrity using a range of flow rates and cell seeding densities. Channel endothelialization will be quantified using custom Volocity (PerkinElmer) and MATLAB-based image processing tools previously reported (Karumbaiah et al., 2013, *Biomaterials;* 34:8061-8074; and Latchoumane et al., 2018, *Sci Rep;* 8:10957). Endothelial wall viability (Calcein AM/Propidium Iodide), proliferation (Ki-67+), and integrity using above described imaging methods will be evaluated over a period of 7 days in vitro (DIV). This time span is likely sufficient to observe T-cell immunosuppression and GBM changes detailed in subsequent aims. The achievement of >95% channel endothelization (with >99% coverage of reservoir barriers) and maintenance for a period of 7 DIV with continuous flow at or below 500 µl/min is expected.

Characterization of Adaptive Changes in Patient Derived GBM Organoids Cultured in Tolerogenic 3D Microenvironments.

Compositional changes in the tumor ECM have been reported to enhance GBM progression. However, GBM adaptive responses to compositionally relevant and tolerogenic ECM microenvironments have not been investigated. A better understanding of these mechanisms can help design effective therapeutic strategies to combat GBM invasion.

Analysis of ECM alterations in CS-GAG composition in human GBM tissue. A quantitative strong anion exchange (SAX) HPLC analysis will be performed of CS-GAG composition of human GBM tissue obtained from 30 male and 30 female patients using sensitive methods previously published (Logun et al., 2016, *J Mater Chem B;* 4:6052-6064; and Karumbaiah et al., 2011, *Glia;* 59:981-996). Caucasian, African, and African Americans donors will be included in the study due the higher GBM incidence reported in these populations when compared to others (Ostrom et al., 2018, *JAMA Oncol;* 4:1254-1262). Despite evidence suggesting higher GBM incidence in males when compared to females (Tamimi and Juweid, in Glioblastoma (ed S. De Vleeschouwer) (2017)), equal number of males and females will be included in this study. The quantification of extratumoral sulfated CS-GAGs in the TME will help identify commonalities and differences in GBM specific CS-GAGs across both genders, which could lead to patient-specific strategies for targeting GBM progression in these individuals. All results will be expressed as fold increase or decrease when compared to CS-GAG composition in fresh-frozen normal brain tissue controls (US Biomax. Inc). The detection of CS-GAG composition changes and oversulfated CS-GAG expression in >80% of these individuals with detection sensitivity of 10 pMol of sulfated CS-GAG/mg of protein is expected.

Characterize maintenance and proliferation of GBM organoids in 3D sulfated CS-GAG matrices. In vitro assays will be performed using organoids derived from a variety of GSC isolates that possess unique mutational differences, including GSC ID N12-115 (EGFR Gene amplification: negative; PTEN Deletion; positive; MGMT status: methylated), GSC ID N08-30 (EGFR Gene amplification: positive; PTEN Deletion; positive; MGMT status: methylated); and GSC ID N12-159 (EGFR Gene amplification: negative; PTEN Deletion; positive; MGMT status: unmethylated).

Figure 13A:
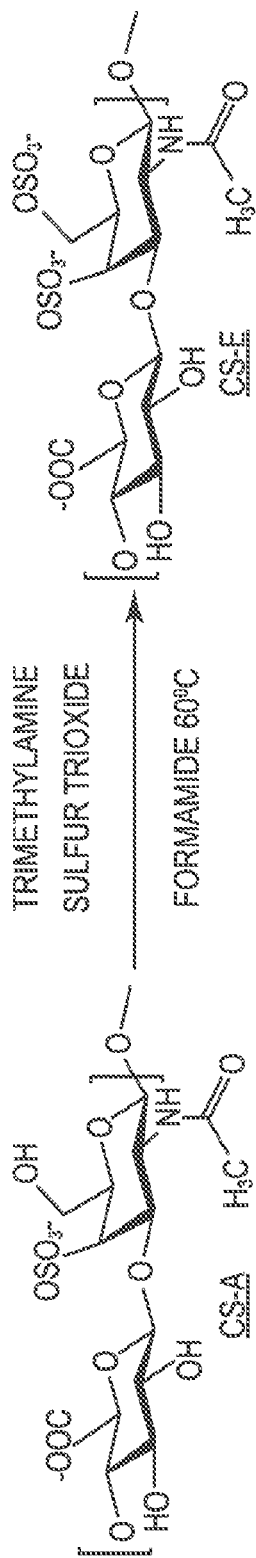
FIGS. 13A and 13B. Schematics of CS-E synthesis and fabrication of mono- and oversulfated CS-GAG matrices.
Figure 13B:
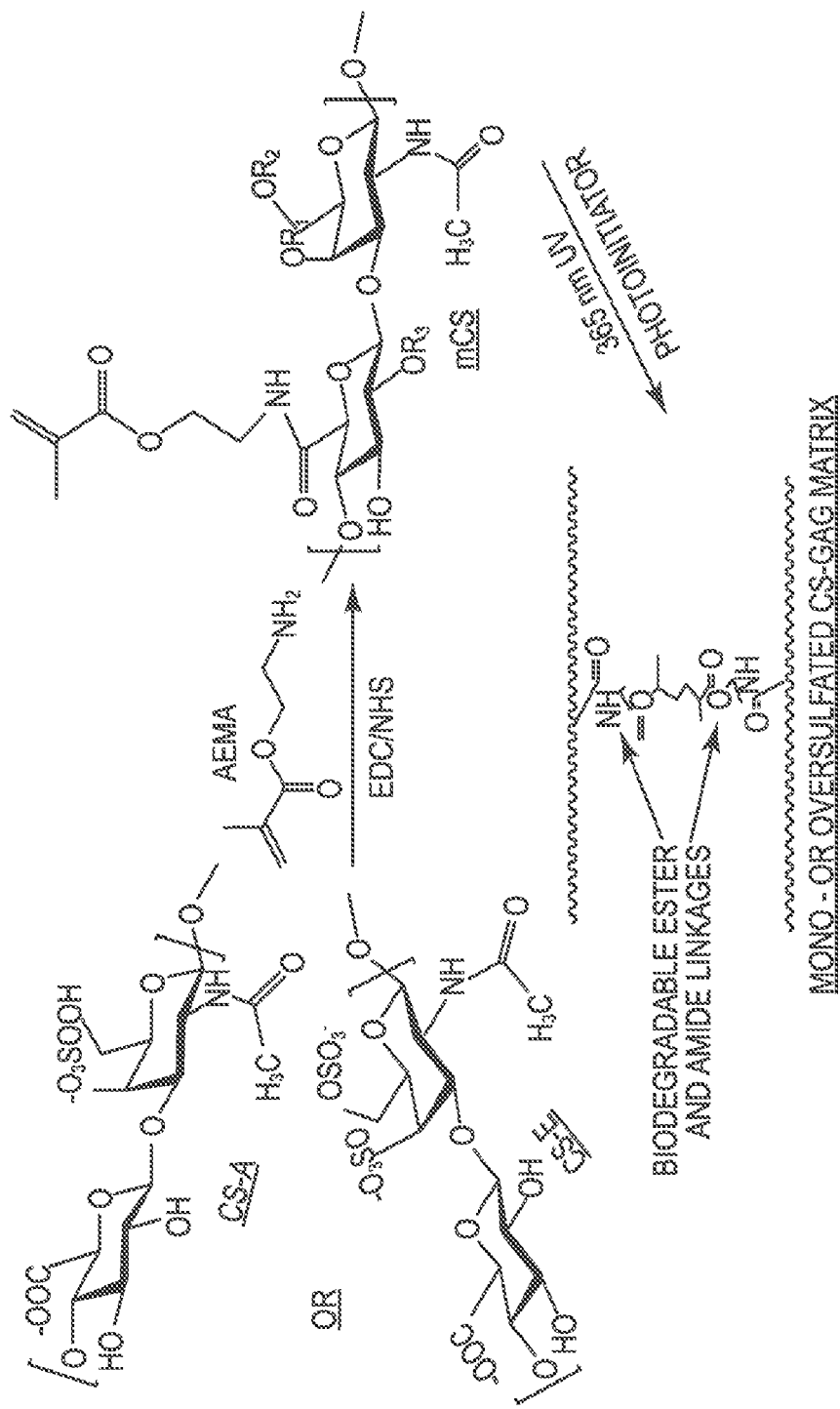

Five additional molecularly characterized patient derived GSCs will be obtained, isolated from high-grade tumors for these assays. In addition to their mutational status, their overexpression of cell surface antigens—EGFR, CD133, and NG2 will be investigated using imaging cytometry. The proliferation of GBM organoids in FGF2 binding CS-GAG matrices that are compositionally similar to the GBM ECM, and consisting of unique sulfation patterns will be performed using previously published methods and regioselective sulfonation techniques (Karumbaiah et al., 2015, *Bioconjug Chem;* 26:2336-2349; Logun et al., 2016, *J Mater Chem B;* 4:6052-6064; and Betancur et al., 2017, *ACS Biomater Sci Eng;* 3:420-430) (FIG. 13). At the experimental endpoint, undifferentiated GSCs will be identified using antibodies against nestin, Sox1, CD133, and CSPG4. GSC differentiation into astrocytes, and neurons will be evaluated using antibodies against GFAP, Olig-2, NeuN, and NF-200. Since sulfated GAGs are known to prolong FGF2 activity and potency (Damon et al., 1989, *J Cell Physiol;* 138:221-226), these assays will determine the extent to which CS-GAG matrices containing different sulfation patterns support GSC proliferation and maintenance when compared organoids encapsulated in synthetic PEG and unsulfated HA matrices. It is expected to see the greatest number of undifferentiated GSCs in FGF2 conditioned composite (COMP; 85% CS-A+ 15% CS-E) containing sulfated CS-GAG matrices when compared to controls. Since self-renewing GSCs also proliferate significantly more than non-self-renewing GSCs, it is expected that significantly greater total cellular protein and DNA from GSCs encapsulated in FGF2 bound CS-GAG matrices when compared to controls will be obtained.

Quantifying ECM microenvironment induced alterations in GSCs invasion and haptotaxis. The enhanced binding of CXCL12 to CS-E (FIG. 9A) and upregulation of CXCL12 and CXCR4 in GBM cells encapsulated in COMP matrices has been previously demonstrated (Logun et al., 2016, *J Mater Chem B;* 4:6052-6064). $1 \times 10^6$ GSCs will be seeded into three channel glioma-on-chip microfluidic devices containing synthetic PEG, unsulfated HA, or COMP matrices in order to investigate whether similar microenvironmental adaptations and haptotaxis mechanisms are prevalent in patient-derived GSCs. Unlike the matrix choice assays (FIG. 9), where two different 3D matrices are presented simultaneously in adjacent channels, each microfluidic device in this assay will receive only one type of 3D matrix, with wells in one channel loaded with media containing 10 ng/ml of the chemokine CXCL12 (R&D Systems), and the wells of the adjacent hydrogel containing channel receiving media only. CXCL12 mediated cellular haptotaxis will be quantified using live-cell imaging over a 6 h period using published methods (Logun et al., 2016, *J Mater Chem B;* 4:6052-6064). Cell-tracking and differences in cell migration velocity and rate will be quantified using custom MATLAB scripts (Logun et al., 2016, *J Mater Chem B;* 4:6052-6064).

Evaluation of the function blocking effects surfen on GSC infiltration into CS-GAG matrices. Surfen is a small molecule inhibitor of sulfated GAGs64. Separate matrix choice assays will screen for surfen (20 µM) mediated blockade of GSC invasion into COMP matrices. Matrix encapsulated GSCs will be immunocytochemically stained using phalloidin, anti-vinculin, and anti-FAK antibodies to assess cell migration, and using anti-Ki67 antibodies to assess cell proliferation.

Investigate T-cell exposure induced activation of immunosuppression by GBM organoids. CAR-T cells have been remarkably successful in treating patients with B cell malignancies. However, their limited success against GBM is attributed to several adaptations in the GBM microenvironement. The detailed investigation of the temporal dynamics of these immunosuppression mechanisms can lead to the identification of novel druggable and cellular immunotherapy targets to better target GBM.

Imaging cytometry of patient-derived GSCs and T-cells. Baseline biomarker expression will be characterized in naive and activated human T-cells (ProMab Inc.) and in patient-derived GSCs using a well characterized panel of biomarkers used in imaging cytometry. Phenotypic markers for T-cells will include CD3, CD4, CD8, CD69, CD25, Foxp3, Ki67, CD57, PD-1, CTLA-4, Annexin V, and RL2. Phenotypic markers for GBM cells will include CD133/1, CD95, NG2, PD-L1, and Sox-1. Imaging cytometry combines the attributes of conventional flow cytometry and microscopy to yield a better phenotype characterization of the cell-surface and sub-cellular antigens. An ImageStream (MKII, Millipore Sigma) imaging cytometry system will be used to conduct high-resolution analyses of T-effector cells (CD4+), cytotoxic T-lymphocytes (CD8+), T-regulatory cells (CD25+, CD4+, and FoxP3+), T-cell exhaustion and senescence (CD57+), and co-stimulatory receptors (PD-1, CTLA4). This technique will also be used to characterize GBM cell markers. Cells will be labeled with pre-conjugated antibodies against the above biomarkers as well as with labeled isotype controls before imaging cytometry analysis. Focused cells will be gated based on circularity (area/aspect ratio) and plotted according to frequency versus signal intensity, or darkfield intensity versus brightfield diameter.

TMZ resistant GBM organoids. Since TMZ resistance is a hallmark GBM adaptation (Johannessen and Bjerkvig, 2012, *Expert Rev Anticancer Ther;* 12:635-642; and Lee, 2016, *Genes Dis;* 3:198-210), TMZ resistant GBM organoids will be used in T-cell exposure assays. TMZ resistant organoids will be generated by seeding approximately $4 \times 10^4$ cells in each well of 96 well aggrewell plates (StemCell) for 96 h and cultured in media containing 10 µM microcrystalline TMZ. Cell viability will be quantified using a live/dead imaging kit (ThermoFisher) and plotted. TMZ resistant GBM organoids will be maintained in TMZ containing media for use in T-cell exposure assays in the CARTiFlo device. Since high MGMT expression is correlated with the reversal of cytotoxic effects of alkylating chemotherapeutics such as TMZ68, the expression of MGMT mRNA and MGMT protein in drug resistant GBM organoids when compared to control GSCs will be validated using quantitative real-time PCR (qRT-PCR) and immunoblot assays (Happold et al., 2018, *J Neurochem;* 144:780-790).

Figure 14:
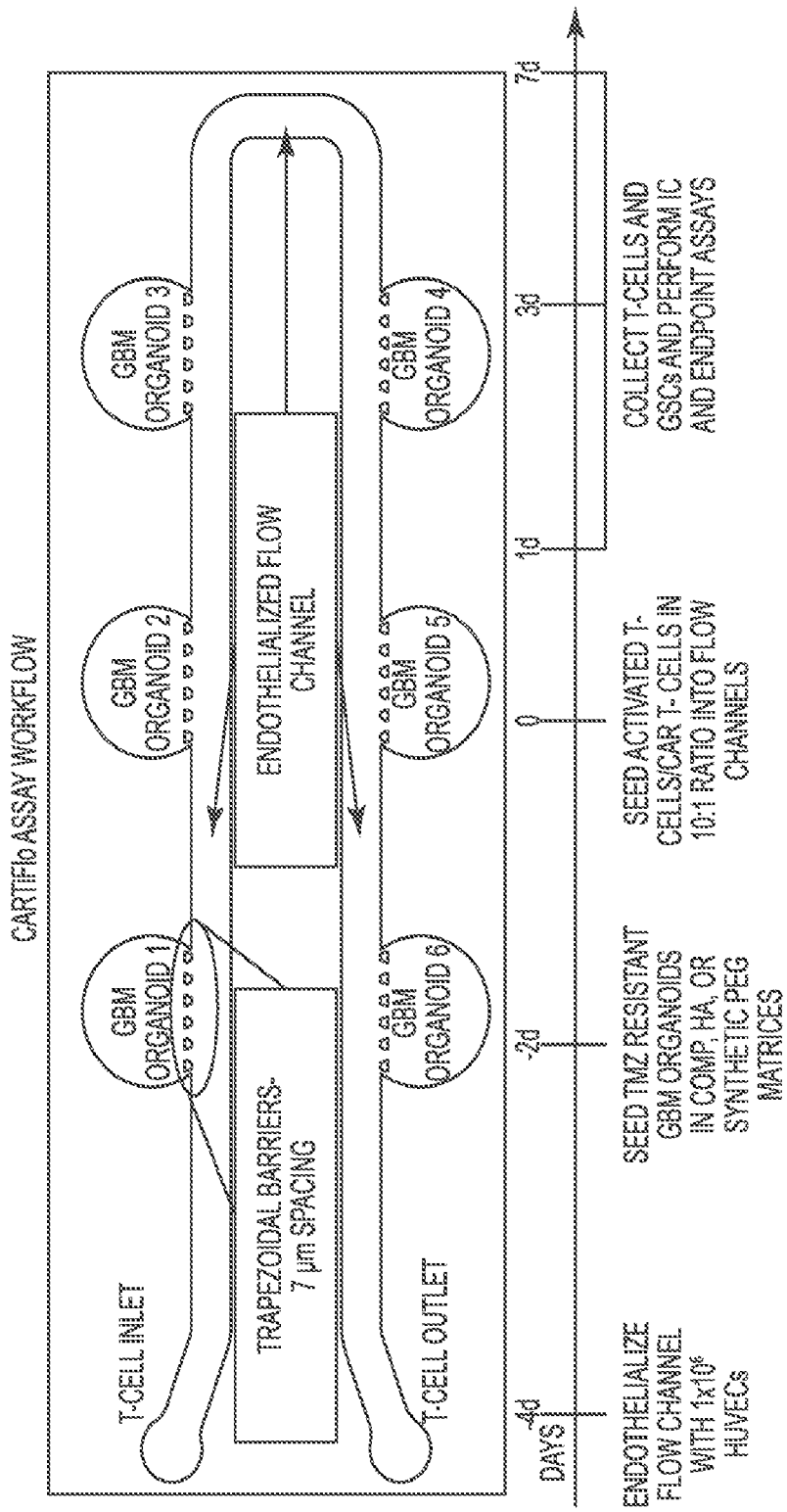
FIG. 14. Schematic of CARTiFlo assays and time course. The device recapitulates the GBM microenvironment and facilitates monitoring of immunosuppression of T-cells GBM antigen loss.

Investigating GBM organoid mediated immunosuppression of T-cells. The effects of TMZ resistant GBM organoid exposure on T-cell apoptosis, exhaustion, and energy metabolism will be investigated. A single uniform sized GBM organoid will be encapsulated in 100 µl COMP, HA, or PEG matrices in individual wells of separate CARTiFlo devices (FIG. 14). Either activated human T-cells or CAR T-cells stably expresssing CD133 and PD-L1 receptors (ProMab) will be introduced to the flow channel at optimized flow rates of 0.5 ml/min or less and allowed to continuously flow in a closed-circuit. The flow tubing will be attached to a valve fitted with a 20 µm mesh filter allowing for media exchange without loss of cells. T-cells will be collected at 3 DIV and 7 DIV time-points for imaging cytometry analysis for T-cell apoptosis (Annexin V+), exhaustion (reduced Ki67+ and upregulation of T-regs), and senescence (CD57). Since tumor presentation of PD-L1 and PD-1 ligation on the T-cell surface has been reported to result in inhibition of glycolysis and T-cell differentiation (Patsoukis et al., 2015, *Nat Commun;* 6:6692), whether greater sequestration of glucose and glutamine by GSCs results in energy deprivation in T-cells will be investigated. Since the higher conversion of glucose and glutamine to uridine diphosphate N-acetylglucosamine (UDP-GlcNAc) in activated T-cells is dependent on the enzyme O-GlcNAc glycosyltransferase (OGT), intracellular levels of OGT transcripts will be investigates using qRT-PCR analysis and evaluate protein O-GlcNAcylation using the O-GlcNAc specific RL2 antibody in imaging cytometry analyses and immunoblotting assays (Swamy et al., 2016, *Nat Immunol;* 17:712-720). Antigen loss of CD133, PD-L1 and NG2+ will be also be evaluated in dissociated GBM cells retrieved from the hydrogel wells. It is expected that results will demonstrates that >60% of T-cells undergoing immunosuppression at 3 DIV, an increase to >80% at 7 DIV, and a proportionate increase in CD95 and PD-L1 on GBM organoids.

Gene and protein expression of T-cell and GBM biomarkers. In order to distinguish between differences in mRNA and protein biomarker expression profiles, total RNA and protein will be extracted from TMZ resistant GBM spheroids, T-cells, and CAR-T cells. Gene and protein expression of T-cell and GBM biomarkers in cells obtained from CARTiFlo co-culture assays will be compared to individual non-co-culture controls using qRT-PCR and immunoblotting methods previously described (Logun et al., 2016, *J Mater Chem B;* 4:6052-6064). Biomarkers for T-cells will include CD3, CD4, CD8, CD69, CD25, Foxp3, Ki67, CD57, PD-1, CTLA-4, Annexin V, and RL2. Biomarkers for GBM cells will include CD133/1, CD95, NG2, PD-L1, and Sox-1.

Pairwise comparisons of data and performance measures will be performed using t-tests or using analysis of variance (ANOVA) with appropriate post-hoc tests when more than two groups are involved. If the data do not conform to the assumptions for parametric tests and if the data are not transformable, the data will be performed by accepted methods and the use of non-parametric alternatives. Multivariate regression analysis and principal component analyses will be employed to determine relationships if any between compositional, immunocytochemical and molecular analyses. Adequate precautions will be taken to ensure blinding of data collectors and unbiased quantification of immunocytochemical staining groups. When blinding is not possible, adequate measures will be taken to ensure equal treatment of groups.

The novel CARTiFlo device of the present invention replicates the brain tumor microenvironment and will provide novel insights into the as yet unidentified mechanisms by which tumor associated glycans promote the spread of invasive brain tumors and help identify the temporal dynamics of tumor induced reprograming of immune cells. The identification of these mechanisms could further improve the efficacy of standard-of-care chemo- and radiation therapies, and novel immunotherapies in the future. Additional studies will be performed to further validate these findings in animal models of GBM.

Example 4

Tissue on a Chip Platforms for CAR-T Potency

This example demonstrates that the platform technologies described herein will provide pathophysiological relevant T cell potency assays. This example shows the cross flow of T-cells and fluorescent microbeads/dextrans from the flow channel into the reservoir to assess permeability of the endothelial blood-tumor barrier mimic to these molecules. It also shows the tumor spheroid presentation in hydrogels and 3D volume quantification of this response to activated T-cells/CAR T cells as a measure of assessing T-cell targeting potency.

Figure 15A:
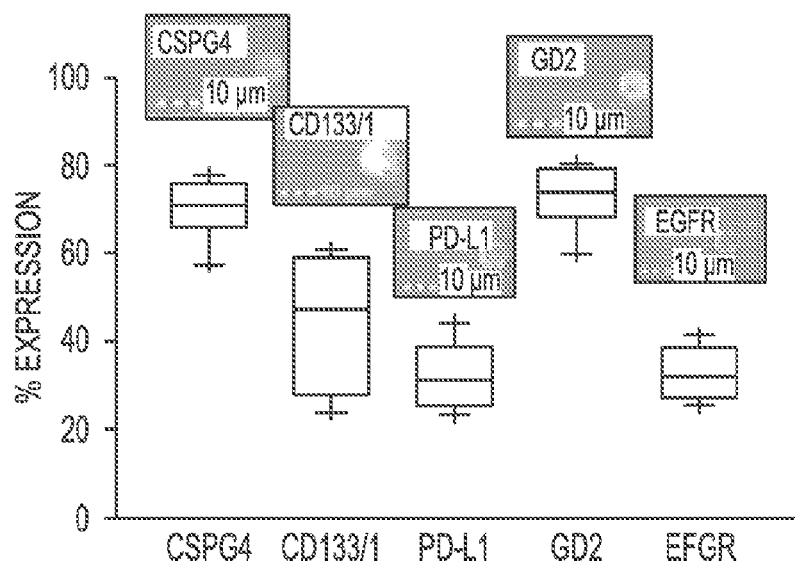
FIGS. 15A-15C. An overview of a vascularized glioblastoma on a chip assay.
Figure 15B:
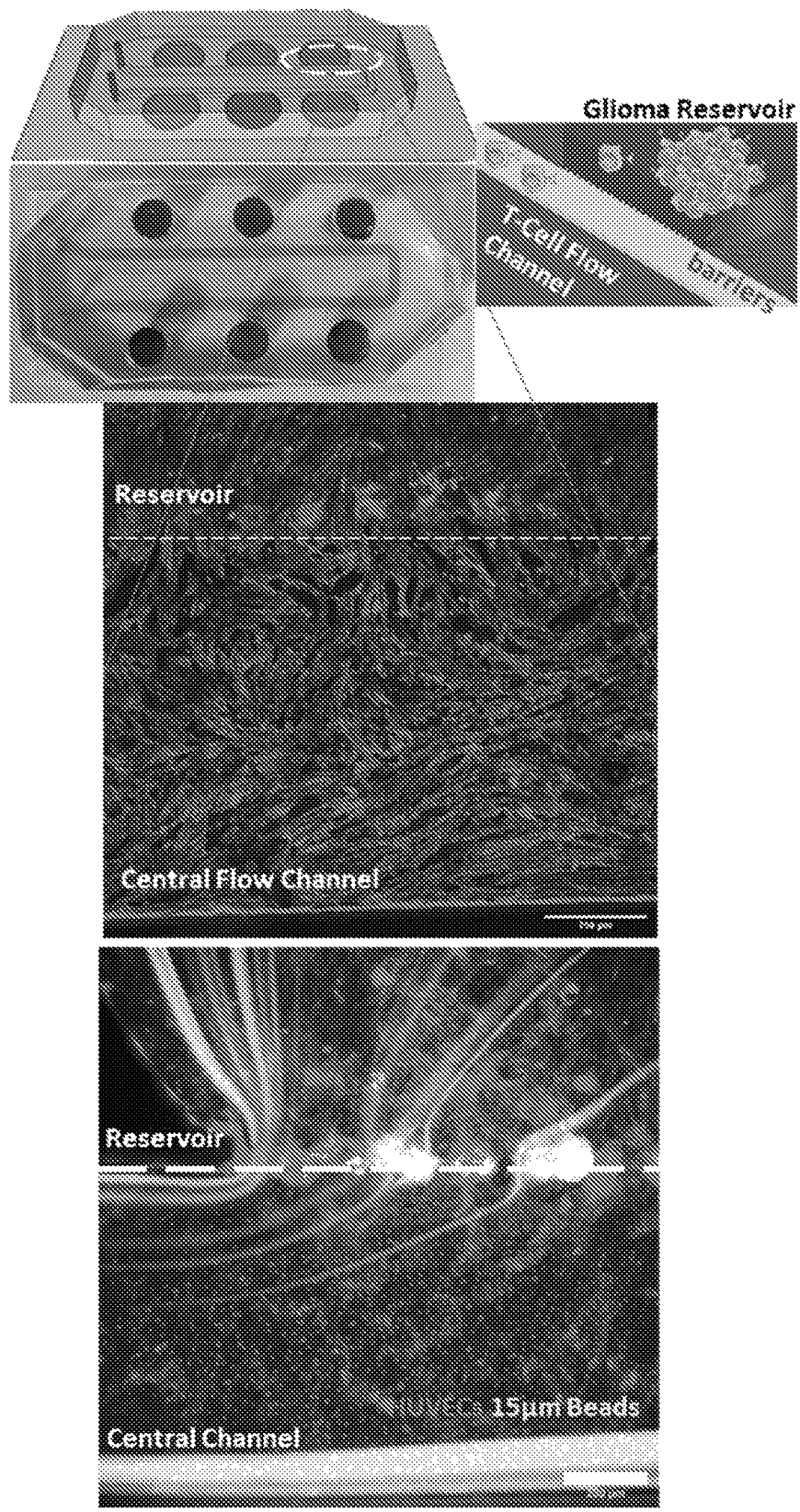
Figure 15C:
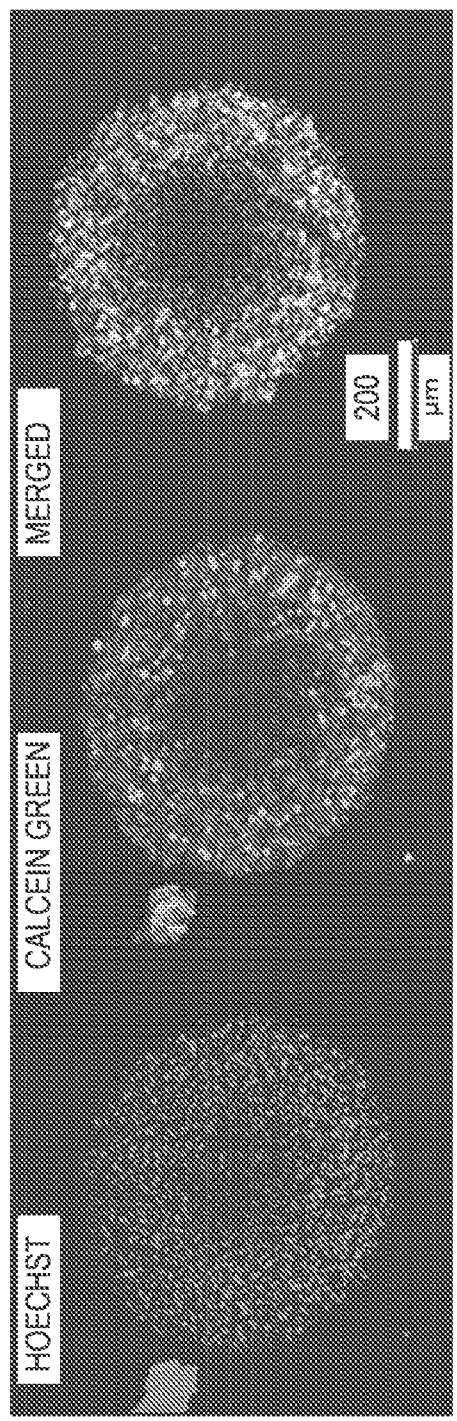
Figure 15C:
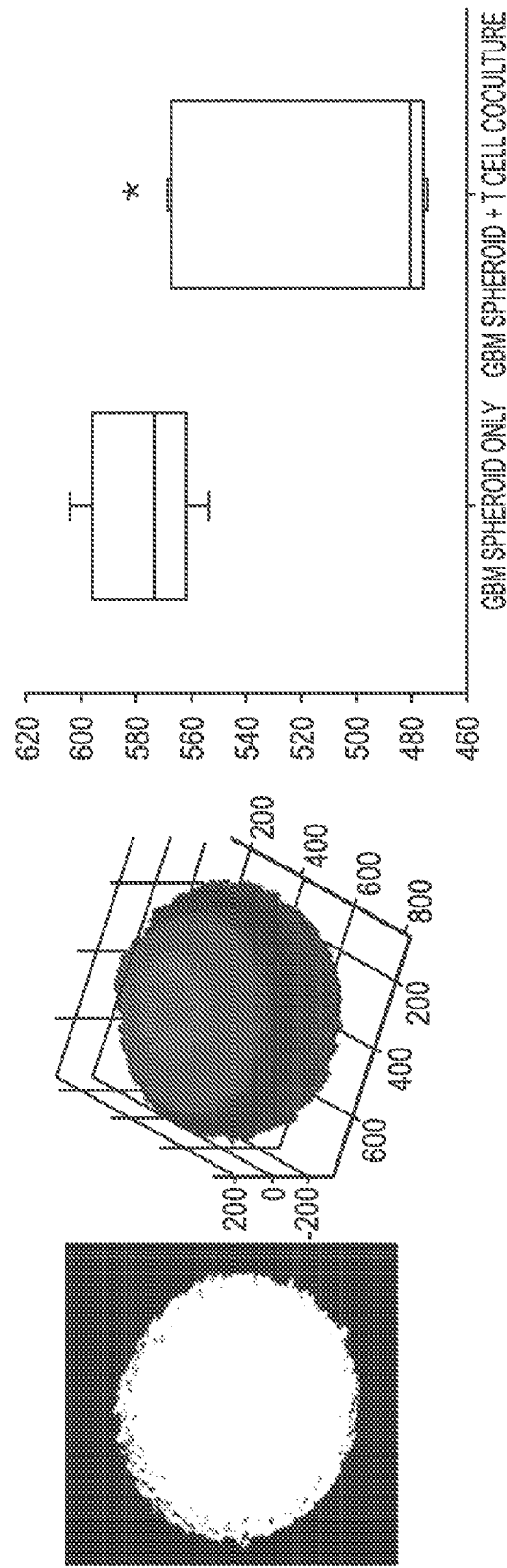

FIGS. 15A to 15C present an overview of the present invention, a vascularized glioblastoma on a chip assay which can serve as a patient-specific on-chip T cell potency model. This glioblastoma model with a central vascular channel surrounded by tumors can be used to test therapeutic potency of T cells, either as a monotherapy or as combination therapies. This glioblastoma model can be used for the rapid development of a rapid, label-free, metabolic imaging-based T cell potency assay that can be integrated with on-chip assay platforms. Imaging cytometry quantification of CAR antigens on patient derived GSCs, including neurosphere ID N08030, was performed. GSCs exposed to activated T-cells were significantly smaller that untreated GSCs after 7 DIV. Results of binary mask and 3D volume reconstruction are shown.

Advantages of the present invention, a vascularized glioblastoma on a chip assay, include: non-destructive, live cell imaging; reagent-free assay; 2 photon microscopy reduces scatter, allows imaging of live tissues in 3D (e.g., chips); visualization of longitudinal changes at the single cell level; and resultant metabolic fingerprint" resolves a high degree of heterogeneity.

Example 5

Growth of GBM Spheroids and HUVEC Cells in 3D Hydrogels

Figure 16A:
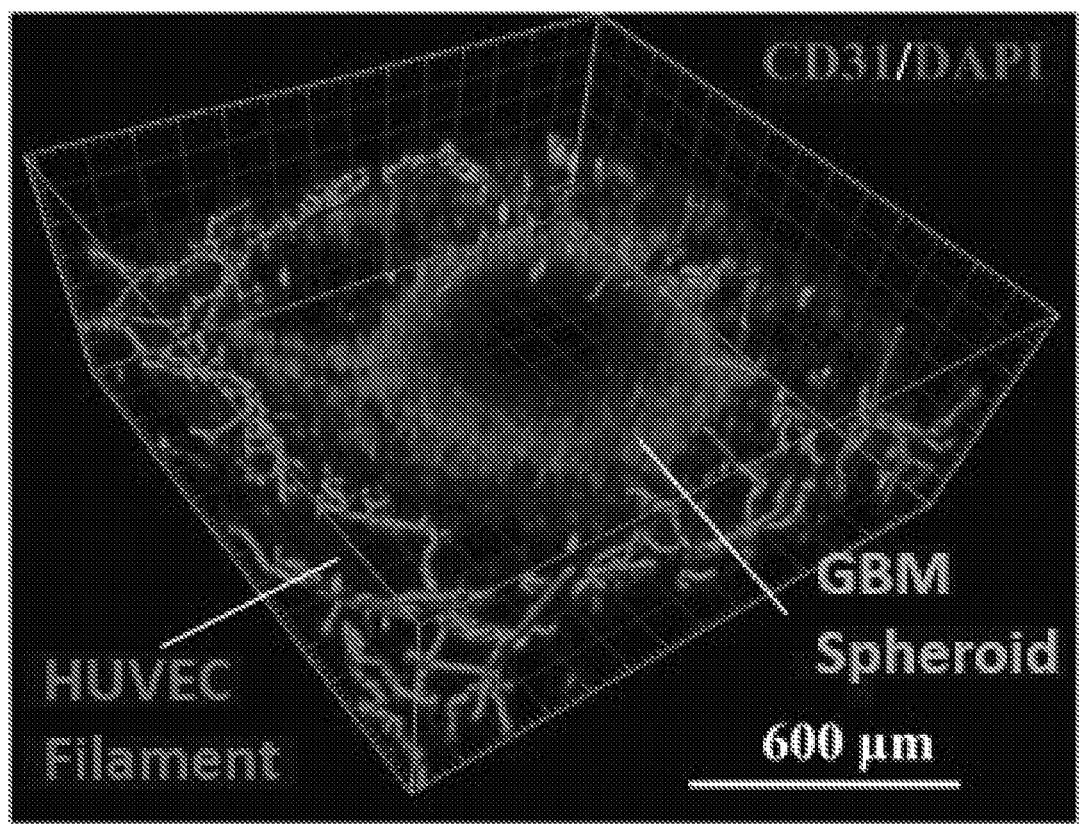
FIGS. 16A to 16C. Endothelial cell growth in fibrin gel over 4 days with patient-derived N08 GBM spheroids results in increased CD31 labeled filament volume and length relative to endothelial cells grown further away or not at all form the spheroid.
Figure 16B:
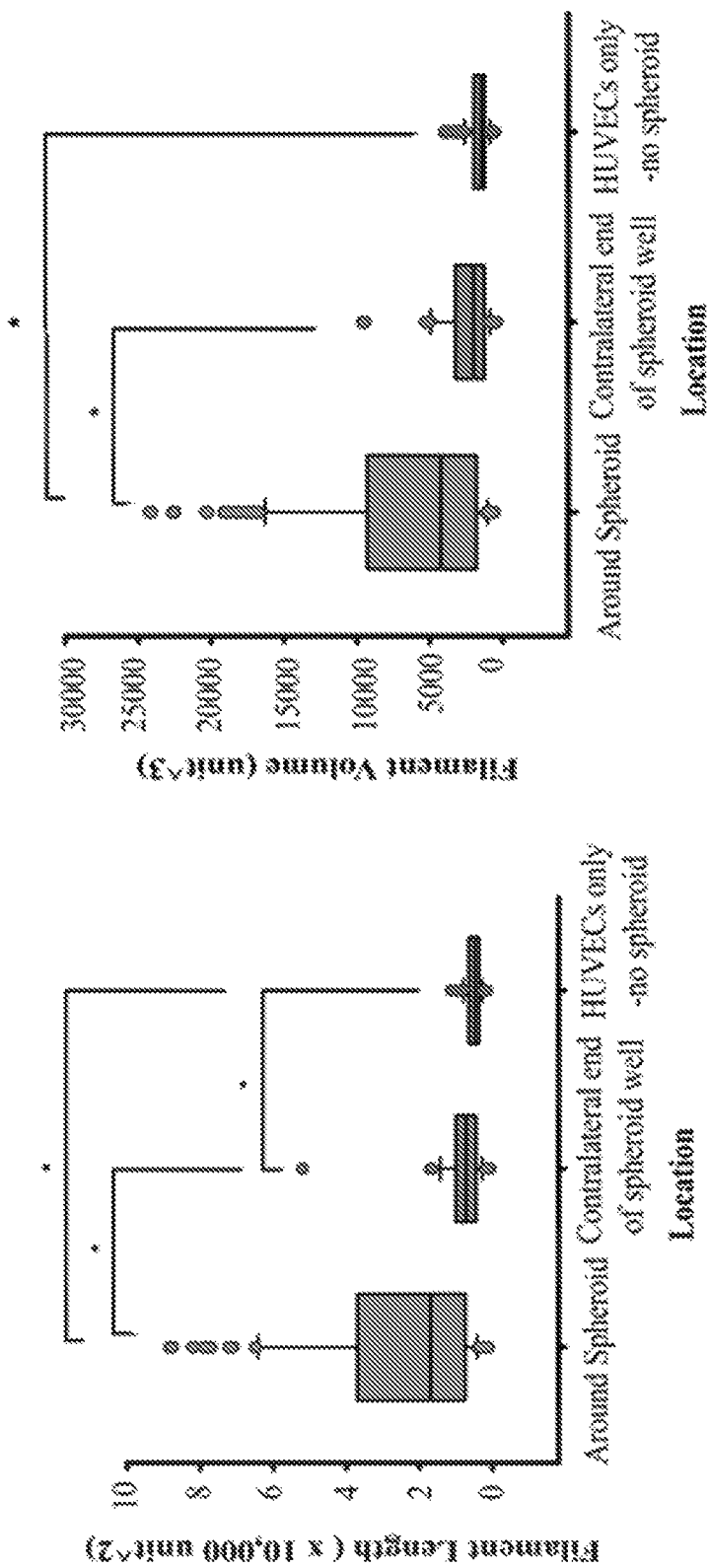
Figure 16C:
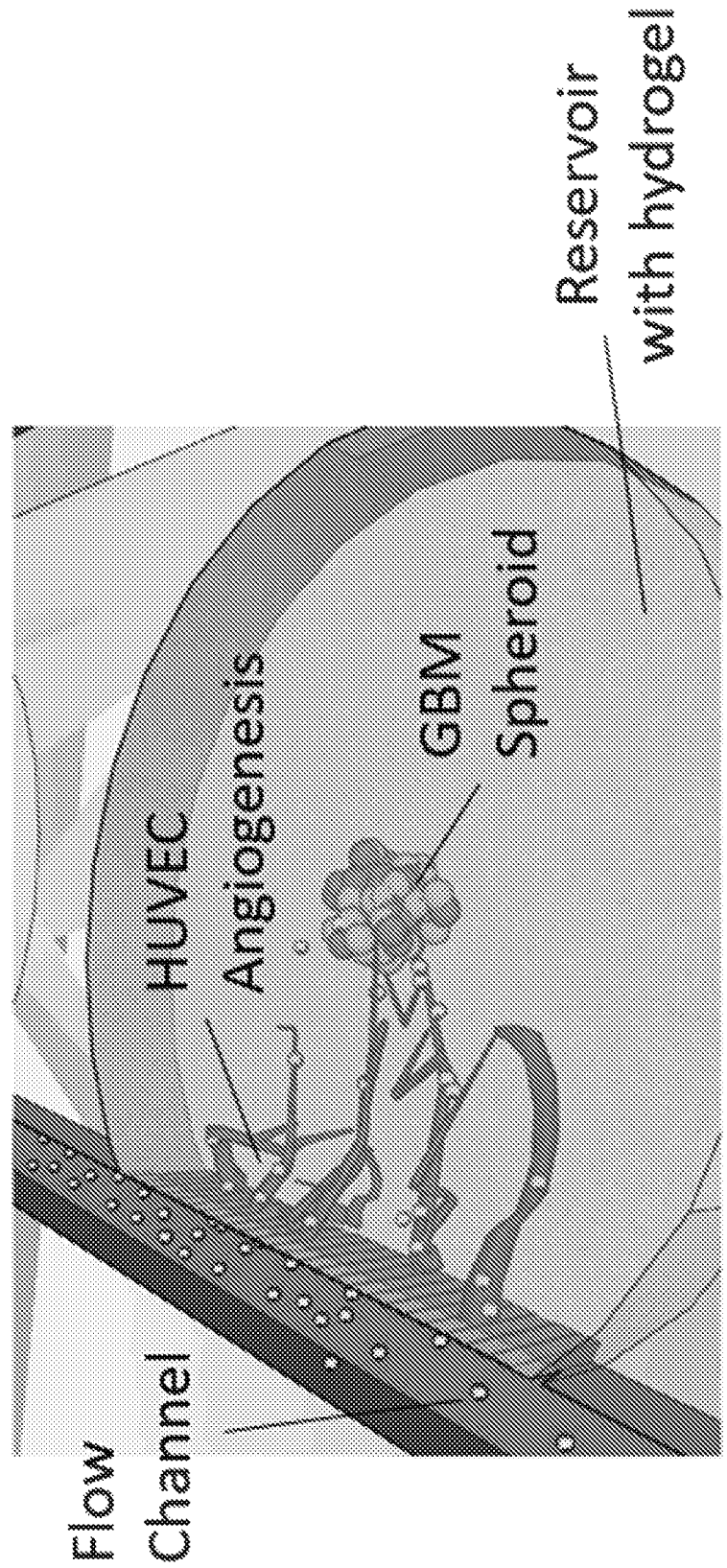

Following procedures described in more detail in Examples 1-4, data presenting GBM spheroids and HUVEC cells in 3D hydrogels has been generated and quantified. As shown in FIGS. 16A-16C, endothelial cell growth in fibrin gel over 4 days with patient-derived N08 GBM spheroids results in increased CD31 labeled filament volume and length relative to endothelial cells grown further away or not at all from the spheroid. FIG. 16A is a filament reconstruction conducted through Imaris software from z stacks of confocal (LSM 710) images to demonstrate differences in vesicular growth of HUVECs in 3D fibrin hydrogels. DAPI stains nuclei of all cells and CD31 stains endothelial cells and cellular processes. FIG. 16B graphs filament volume and length quantified from Imaris filament tracing analysis of confocal images of ROIs of HUVECs around a GBM spheroid, in the contralateral end of the well with the spheroid, and in a well containing only HUVECs in gel. Significance is measured using ANOVA on ranks and comparison is made with Dunn's method. FIG. 16C is a schematic of the GBM spheroid-initiated angiogenesis promoting tube formation from the flow-channel into the hydrogel-filled reservoir to facilitate T cell access to GBM spheroid.

The complete disclosure of all patents, patent applications, and publications, and electronically available material (including, for instance, nucleotide sequence submissions in, e.g., GenBank and RefSeq, and amino acid sequence submissions in, e.g., SwissProt, PIR, PRF, PDB, and translations from annotated coding regions in GenBank and RefSeq) cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A microfluidic assay device, the device comprising:
a flow channel configured to receive a monolayer of endothelial cells; the flow channel comprising an inlet and outlet;
one or more reservoirs distributed along the flow channel, each reservoir in fluid communication with the flow channel along an interface; and
a plurality of barriers arranged along the interface of the flow channel with each reservoir;
the plurality of barriers configured to provide a semipermeable interface and/or to provide for cell migration across the interface;
wherein the inlet and outlet of the flow channel are positioned on the same side of the device;
wherein the plurality of barriers arranged along the interface of the flow channel with each reservoir comprise a trapezoidal shape; and
wherein the interface of the flow channel with each reservoir comprises 22 trapezoidal barriers, each trapezoidal barrier about 100 micrometers (μm) in width, about 150 μm in length of the longest base, and about 50 μm in length of the shortest base, and wherein each of the trapezoidal barriers is spaced about 7 micrometers (7 μm) from a nearest other trapezoidal barrier.

2. The microfluidic assay device according to claim 1, the flow channel comprising a length of about 7 centimeters (cm).

3. The microfluidic assay device according to claim 1, the flow channel comprising a width of about 1000 micrometers (1000 μm).

4. The microfluidic assay device according to claim 1, the flow channel comprising a height of about 150 micrometers (150 μm).

5. The microfluidic assay device according to claim 1, wherein the inlet and/or outlet of the flow channel comprise a diameter of about 1 millimeter (1 mm).

6. The microfluidic assay device according to claim 1, the one or more reservoirs comprising a diameter of about 5 millimeters (5 mm).

7. The microfluidic assay device according to claim 1, comprising six reservoirs evenly spaced along the flow channel.

8. The microfluidic assay device according to claim 1:
wherein the flow channel, one or more reservoirs, and/or plurality of barriers are coated with fibronectin;
wherein the microfluidic assay device comprises poly-dimethyl-siloxane (PDMS);
wherein one or more reservoirs is configured to receive a hydrogel;
wherein the device is sterilized; and/or
wherein the flow channel comprises endothelial cells.

9. The microfluidic assay device according to claim 8, wherein the flow channel comprises a confluent monolayer of endothelial cells.

10. The microfluidic assay device according to claim 8, wherein the endothelial cells comprise human umbilical vein endothelial cells (HUVEC).

11. The microfluidic assay device according to claim 1, the one or more reservoirs comprising a glioblastoma multiforme (GBM) biopsy sample or a GBM spheroid.

12. The microfluidic assay device according to claim 11, wherein the glioblastoma multiforme (GBM) biopsy sample or a GBM spheroid within the one or more reservoirs is encapsulated within hydrogel.

13. A method of evaluating interaction between tumor cells and immune cells, the method comprising:

providing a confluent monolayer of endothelial cells within the flow channel of the microfluidic assay device of claim 1;

placing a suspension of tumor cells in one or more of the reservoirs of said microfluidic assay device;

incubating to allow cell-cell interaction; and assaying the interaction between tumor cells and immune cells.

14. The method of claim 13, wherein the tumor cells comprise glioblastoma multiforme (GBM) tumor cells and/or wherein the immune cells comprise T cells or CAR-T cells.

15. The method of claim 13, wherein assaying the interaction between tumor cells and immune cells comprises assaying T-cell activation.

16. Then method of claim 15, wherein assaying T cell activation is assayed by optical metabolic imaging.

17. A microfluidic assay device, the device comprising:

a flow channel configured to receive a monolayer of endothelial cells, the flow channel comprising an inlet and outlet;

one or more reservoirs distributed along the flow channel, each reservoir in fluid communication with the flow channel along an interface; and a plurality of barriers arranged along the interface of the flow channel with each reservoir;

wherein the plurality of barriers configured to provide a semipermeable interface and/or to provide for cell migration across the interface;

wherein the inlet and outlet of the flow channel are positioned on the same side of the device;

wherein the flow channel comprises a length of about 7 centimeters (cm);

wherein the flow channel comprises a width of about 1000 micrometers (μm);

wherein the flow channel comprises a height of about 150 micrometers (μm);

wherein the inlet and/or outlet of the flow channel comprise a diameter of about 1 millimeter (1 mm);

wherein the one or more reservoirs comprises a diameter of about 5 millimeters (mm);

wherein the plurality of barriers arranged along the interface of the flow channel with each reservoir comprise a trapezoidal shape;

wherein the interface of the flow channel with each reservoir comprises 22 trapezoidal barriers, each trapezoidal barrier about 100 micrometers (μm) in width, about 150 μm in length of the longest base, and about 50 μm in length of the shortest bases; and wherein each of the trapezoidal barriers is spaced about 7 micrometers (μm) from a nearest other trapezoidal barrier.

18. The microfluidic assay device according to claim 17, comprising six reservoirs evenly spaced along the flow channel.

19. The microfluidic assay device according to claim 17:

wherein the flow channel, one or more reservoirs, and/or plurality of barriers are coated with fibronectin;

wherein the microfluidic assay device comprises poly-di-methyl-siloxane (PDMS);

wherein one or more reservoirs is configured to receive a hydrogel;

wherein the device is sterilized; and/or wherein the flow channel comprises endothelial cells.

20. The microfluidic assay device according to claim 19, wherein the flow channel comprises a confluent monolayer of endothelial cells.

21. The microfluidic assay device according to claim 19, wherein the endothelial cells comprise human umbilical vein endothelial cells (HUVEC).

22. The microfluidic assay device according to claim 17, the one or more reservoirs comprising a glioblastoma multiforme (GBM) biopsy sample or a GBM spheroid.

23. The microfluidic assay device according to claim 22, wherein the glioblastoma multiforme (GBM) biopsy sample or a GBM spheroid within the one or more reservoirs is encapsulated within hydrogel.

24. A method of evaluating interaction between tumor cells and immune cells, the method comprising:

providing a confluent monolayer of endothelial cells within the flow channel of the microfluidic assay device of claim 17;

placing a suspension of tumor cells in one or more of the reservoirs of said microfluidic assay device;

incubating to allow cell-cell interaction; and assaying the interaction between tumor cells and immune cells.

25. The method of claim 24, wherein the tumor cells comprise glioblastoma multiforme (GBM) tumor cells and/or wherein the immune cells comprise T cells or CAR-T cells.

26. The method of claim 24, wherein assaying the interaction between tumor cells and immune cells comprises assaying T-cell activation.

27. Then method of claim 26, wherein assaying T cell activation is assayed by optical metabolic imaging.

\* \* \* \* \*